(12) United States Patent
Wittenstein et al.

(10) Patent No.: US 9,021,583 B2
(45) Date of Patent: Apr. 28, 2015

(54) SYSTEM AND METHOD FOR NETWORK SECURITY INCLUDING DETECTION OF MAN-IN-THE-BROWSER ATTACKS

(75) Inventors: Andreas Wittenstein, Woodacre, CA (US); Michael Eynon, Mountain View, CA (US); James Lioyd, San Francisco, CA (US); Laura Mather, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 358 days.

(21) Appl. No.: 13/014,668

(22) Filed: Jan. 26, 2011

(65) Prior Publication Data

US 2011/0185421 A1    Jul. 28, 2011

Related U.S. Application Data

(60) Provisional application No. 61/298,300, filed on Jan. 26, 2010.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |
| *G06F 21/55* | (2013.01) |

(52) U.S. Cl.
CPC .......... *H04L 63/1425* (2013.01); *G06F 21/552* (2013.01); *H04L 63/1416* (2013.01); *G06F 21/554* (2013.01)

(58) Field of Classification Search
CPC ... G06F 21/554; G06F 21/566; G06F 21/316; G06F 21/552; H04L 63/1425; H04L 63/1416
USPC ...................... 726/2–5, 22–25; 713/182–185, 713/187–188
See application file for complete search history.

(56) References Cited

U.S. PATENT DOCUMENTS

| | | | |
|---|---|---|---|
| 7,165,051 B2 * | 1/2007 | Ronning et al. ................ | 705/64 |
| 8,230,512 B1 * | 7/2012 | Njemanze ........................ | 726/25 |
| 2002/0138443 A1 * | 9/2002 | Schran et al. ................... | 705/64 |
| 2003/0123491 A1 * | 7/2003 | Couillard ....................... | 370/508 |
| 2004/0249757 A1 | 12/2004 | Walmsley et al. | |
| 2005/0008148 A1 * | 1/2005 | Jacobson ........................ | 380/26 |
| 2007/0255821 A1 * | 11/2007 | Ge et al. ........................ | 709/224 |

(Continued)

FOREIGN PATENT DOCUMENTS

WO    2008041915 A2    4/2008

OTHER PUBLICATIONS

International Search Report/Written Opinion. PCT/US2011/22578; Applicant: Silver Tail Systems, Inc. (Mar. 30, 2011).

Primary Examiner — Jeffrey D Popham
Assistant Examiner — Forrest Carey
(74) Attorney, Agent, or Firm — BainwoodHuang

(57) ABSTRACT

A method is performed in a network security system implemented in a computer or electronic device that is coupled to secured online resources for detecting unauthorized accesses of those secured online resources. The method includes monitoring a user activity session. It is determined whether the user activity session is indicative of a hidden session by an attacker, where the determination includes comparing the user activity session to an average user activity session.

18 Claims, 28 Drawing Sheets

(56) References Cited

U.S. PATENT DOCUMENTS

| | | |
|---|---|---|
| 2008/0066165 A1 | 3/2008 | Rosenoer |
| 2008/0222706 A1 | 9/2008 | Renaud et al. |
| 2009/0216592 A1* | 8/2009 | Zhang .............................. 705/7 |
| 2009/0241174 A1* | 9/2009 | Rajan et al. ....................... 726/5 |

* cited by examiner

SYSTEM AND METHOD FOR NETWORK SECURITY INCLUDING DETECTION OF MAN-IN-THE-BROWSER ATTACKS

CROSS-REFERENCE TO RELATED APPLICATION

This application claims priority to U.S. Provisional Patent Application Ser. No. 61/298,300, filed Jan. 26, 2010, entitled "System and Method for Network Security Including Detection of Man-In-The Browser Attacks".

FIELD OF THE INVENTION

The present invention relates generally to networks and security boundaries and in particular to defenses against breaches activated in client browser systems.

BACKGROUND OF THE INVENTION

There are many different entities: financial, business, government, charity, educational, individual, etc. that may choose to have online presences implemented by computer systems coupled to a network or computer program code running on systems of others that are connected to the network. Since these online systems can be used to provide information, accept and forward information, facilitate transactions, and/or allow access to online resources, those entities have an interest in securing those systems so that authorized activities are allowed, while unauthorized activities are prevented. Internet and other online facilities are commonly used for financial, business, private and other transactions preferably kept secure.

In a simple example, a bank may choose to provide its customers with online access to banking details and a facility to initiate transactions, such as funds transfers. Some illegitimate actions that unauthorized individuals or computer systems may wish to perform might be expected, such as improperly accessing the banking details, initiating unauthorized transactions, or modifying online resources for their own goals rather than those of the operator of the resources such as, defacing an online presence; stealing money, goods or information; sabotage, or performing other illegitimate actions. Other illegitimate actions might be unexpected.

As explained herein, a common approach to providing this online presence is via a "website". While users may consider a website a "place", it is often a logical place only, in that it is referenced by a URI, while its actual location is not important and may indeed be distributed over multiple data centers or even virtual data centers in computing clouds. More precisely, a website is typically the user interface aspects of an entity's network presence.

For example, a retailer might set up a server that has thereon software that can receive requests from a network and respond to those requests by returning content, accepting inputs and/or performing some actions in response to requests. Some of that content returned can be in the form of web pages viewable by client devices in response to requests for those web pages from those client devices. Client devices might include computers, telephones, smart handheld devices, other computing devices, etc. These client devices might be used by the retailer's customers, potential customers, visitors, suppliers, or partners.

Some web pages are static and pre-generated in advance of a request, such as a page explaining a company's history, while others are dynamic and generated on the fly, such as a web page showing a user's current shopping cart contents or a page generated for a product that a user just requested. Thus, the server might have access to data systems usable for generating web pages and other content (video, music, etc.). The server might comprise multiple machines at different locations on the network, perhaps serving different sets of pages or not. Thus, the term "website" can refer to the client-side view of a collection of servers, content, operations and the like, while end users might view a website as a collection of pages operated by an entity with a consistent approach that can be viewed in various aspects. As used herein, "website" might refer to the content, the servers, the operators of the servers, and/or the interaction with client devices, etc., depending on context.

As website developers have devised defensive methods to detect and thwart attacks, the attackers have in turn devised ways around those defenses, in a co-evolving cycle of increasing sophistication.

Many methods have been devised to steal legitimate users' identities for website abuses. A common method is called "phishing", wherein an email sent under the guise of a trustworthy entity elicits personal information from unwitting recipients, typically by luring potential victims to a fraudulent website that requests identifying personal information such as usernames, passwords, account numbers, ATM PINs, etc. This stolen information is then used by impostors, either manually or robotically, to log in to the victims' accounts on the genuine websites in order to steal money, send forged emails, or perpetrate other illicit activity.

To combat such impostors, many website operators have developed more-sophisticated access-control methods that require secondary authentication information that simple phishing schemes cannot easily obtain. For example, when a website suspects that an account is being used by a third party, the website may verify that the user is indeed the owner of the account by demanding randomly chosen additional access credentials such as place of birth, mother's maiden name, or the answer to one of a set of questions preselected by the legitimate account-owner.

In response to the deployment of secondary authentication techniques, fraudsters have developed what is called a "man-in-the-middle attack", in which a phisher lures a victim to a counterfeit website mimicking the appearance and behavior of the target site, on the one hand intercepting the victim's input and relaying it to the real website, while on the other hand intercepting the real website's output and relaying it back to the user through the bogus site. Thus, man-in-the-middle attacks permit fraudsters to gain entry into privileged sites by duping authorized users of the site into responding to all authorization challenges posed by the privileged sites, thus evading all direct authorization protocols. Despite the name "man in the middle", the entire process, including any illicit activity perpetrated from within the burgled account, may be performed fully automatically, without the need for human intervention.

To combat man-in-the-middle attacks, many websites are programmed to look at structural identifying information, such as the users' Internet Protocol addresses and inferred geographic locations, "cookies" (site-generated tokens passed back and forth between site and client), user-agent identifiers, and request timestamps—information over which the fraudster ordinarily has no direct control. This ancillary information allows a website to detect suspicious users who, despite meeting all explicit authorization challenges, are evidently not using the same browsers on the same computers in the same locations as they usually do, indicating that they may be victims of man-in-the-middle attacks.

Now that websites are examining structural session information to distinguish impostors from legitimate users, fraudsters have developed an even more sophisticated method of assault, called a "man-in-the-browser attack", using malicious software surreptitiously installed on potential victims' own computers. Many mechanisms have been devised for getting the malware installed, including attachments to phishing emails, downloads from phishing sites, and self-propagating viruses and worms; any of which may be disguised within Trojan horses that apparently or actually perform desirable functions, or may be downloaded afterwards through a back door via a bootstrapping mechanism.

This malware, typically in the form of a browser plug-in (hence the name), lurks in the background until it recognizes that the potential victim has successfully signed in to a targeted website, thus eluding all direct authorization protocols. It then uses the victim's own browser on the victim's own computer in accordance with the user's own schedule to perpetrate fraud while the victim is also interacting with the website, thereby also eluding all structural authentication clues. Again, although some implementations provide for real-time human intervention, nevertheless the entire process, including any illicit activity perpetrated from within the hijacked account, may be performed fully automatically, despite the name "man" in the browser. The malware can elude detection by the user by performing its transactions invisibly, for example in an off-screen window, or, as in a man-in-the-middle attack, by intercepting the communications between the real user and the website, and spoofing the view presented to the user.

Since man-in-the-browser attacks, like man-in-the-middle attacks and other phishing attacks, cause substantial harm to websites and to the websites' legitimate users through direct financial and material theft as well as through sabotage, defamation, and other forms of damage, it is crucial for websites to have an effective means for detecting such attacks in order to take remedial actions against them.

At present, however, no methods exist for websites to detect man-in-the-browser attacks.

SUMMARY OF THE INVENTION

In embodiments of a network security system according to aspects of the present invention, user sessions with a website are analyzed to determine whether the user activity patterns suggest a fraudulent agent is operating in part as the user and to take appropriate remedial actions. It may be that a plurality of sessions appear to be concurrently accessing the same user account on the website, even if those sessions share the same structural identifying parameters such as IP address, computer system, and browser or other Internet application, and such will be detected. Even if structural parameters are characteristic of a legitimate user of the account, the fraudulent agent might be detected. Even if sessions co-occur within a single sign-in session at a time and of a duration characteristic of that user, the fraudulent agent might be detected. Thus, impostors can be detected by their concurrent attacks operating elsewhere in the world for detecting intercessory attacks by impostors hijacking legitimate users' sessions from counterfeit man-in-the-middle websites, as well as detecting man-in-the-browser attacks by impostors hijacking legitimate users' sessions from within their own browsers or other Internet applications on their own computers.

The following detailed description together with the accompanying drawings will provide a better understanding of the nature and advantages of the present invention.

Figure 1:
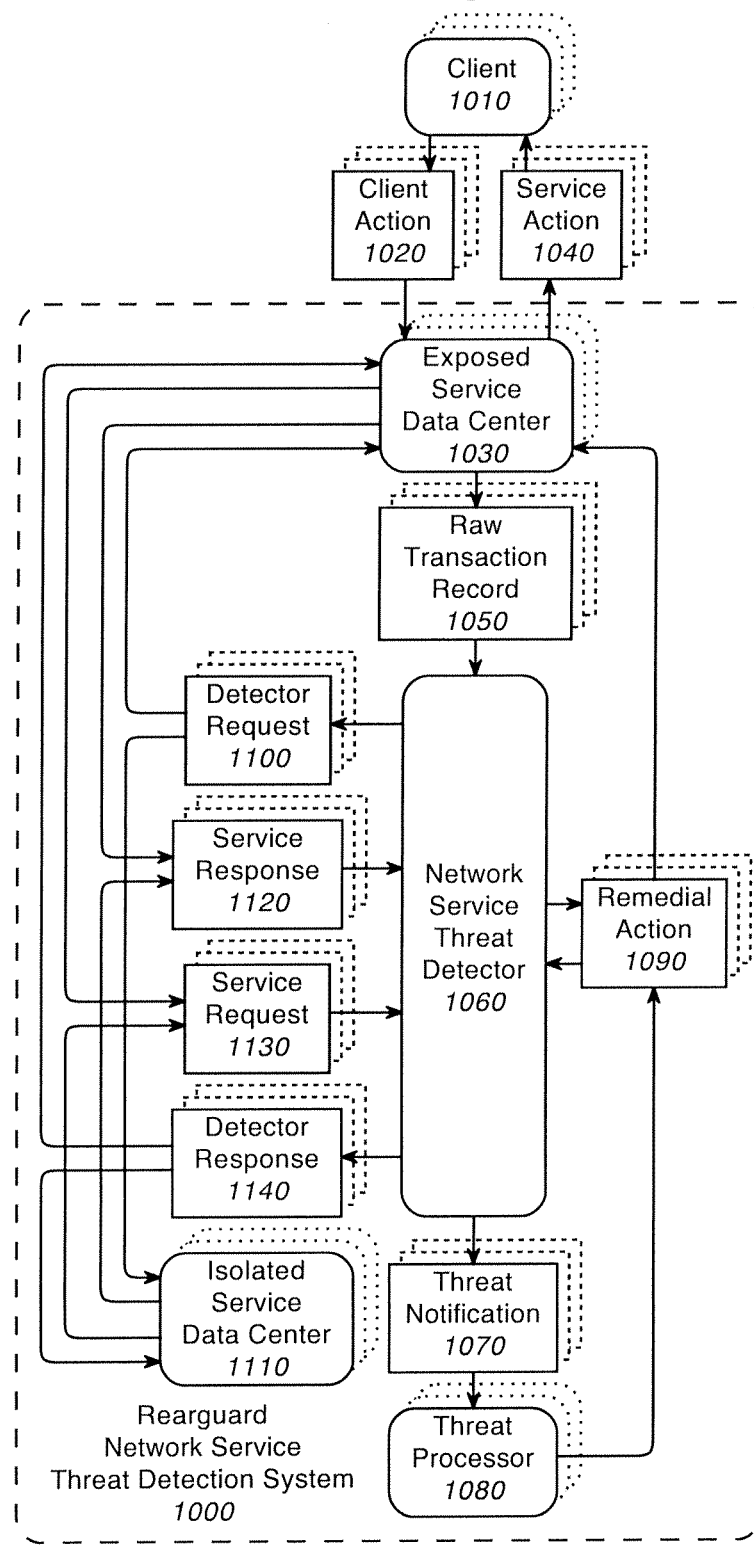
FIG. 1 is a top-level information-flow diagram of a rearguard network-service threat detection system according to aspects of the present invention.

Individual elements of the embodiments are numbered consistently across these figures.

DETAILED DESCRIPTION OF THE INVENTION

This description presents a system and method for determining when there is a man-in-the-browser attack on a website among other things. In an exemplary embodiment of the invention, man-in-the-browser attacks on a website are detected by comparing the current user's session with the average user session.

The inventive system operates upon an incoming stream of input data generated by actions on a website. Example actions on a website generally correspond to hyperlink clicks by the user of the website. These clicks can be performed by a human or by an automated computer program. Automated computer programs can work by simulating website clicks or by working through the application programming interface of the website.

Examples of actions taken on websites include entering data into forms on the website, and clicks to go to other pages of the websites. Examples of entering data into forms on websites include entering a user name and password on a website to sign in to the website; filling out an email form to send email to another user of the website; and entering personal information to register for an account on the website.

As described in further detail below, each website action can comprise multiple parameters as defined by information corresponding to the action on the website that can be seen by the processors and computers related to a webserver, a firewall, or other device that processes website traffic and additional information provided by the website or third parties. Examples of parameters associated with website actions include IP addresses, including those of proxies used in the process of sending traffic to the website, browser header information, operating system information, information about other programs installed on the user's machine, information about the clock and other settings on the user's machine, cookies, referring URLs, usernames, parameters associated with a post to the website, and other information associated with the user's action on the website.

Several aspects of the current user session are compared with the average user session to detect man-in-the-browser attacks using a pre-stored data set representing the average parameter values across all user sessions during the data-collection period. This is compared to the average time between clicks for an average session. Next, the order in which website pages are viewed in the current session is compared with the order in which website pages are viewed in an average session for each page that is accessed. Finally, the time between clicks for each individual page in the user's session is compared to the average time between clicks for the average user session for that page. Additional tests might be used instead of, or as well as, those cited above.

The above comparisons are combined to generate a score that indicates the likelihood that the current session is a man-in-the-browser attack. The score is used to determine whether or not an alert should be generated to notify the appropriate parties, including the website administrator, the website alert processing system, and other associated website parties.

Top-level information-flow diagram FIG. 1 illustrates one way that the invention disclosed herein may be integrated with the data center or data centers 1030 employed by a service: as a rearguard threat detection system 1000.

A service data center 1030, the system which operates a website or other network service, may be configured in a number of different ways, depending largely on the size of the business: for example as a single virtual server shared with other services, a dedicated physical server, all or part of a server farm, or a virtual server farm in a computing cloud. A service data center receives client actions 1020 from clients 1010 of the service, who in turn receive service actions 1040 such as webpages, webpage updates, email messages, text messages, telephone calls, or other information back from the service data centers. Typical client actions 1020 correspond to hyperlink clicks or other interactions with a website such as entering form data or uploading images or other resources by clients 1010 of the website, who can be human or computer automata. Automated computer programs can work by simulating website clicks, by using the service's application programming interface, if any, or by using some other protocol.

For each client action and service action, the responding service data center 1030 relays a raw transaction record 1050 to threat detector 1060. A transaction record describes the parameters of the transaction between the client and the server, containing parameters of corresponding client action 1020 and server response 1040 needed for threat detection. In their rawest form, these transaction records can be simply copies of the low-level packets or datagrams for all network traffic between the exposed data centers and the websites clients, which the network service threat detector independently reassembles into complete transaction records.

The network-service threat detector 1060 and other components may likewise be located onsite, offsite, or in a cloud computing center. In the preferred embodiment, the entire network-service threat detection system 1000 is collocated with service data center 1030 to facilitate security and real-time response. Very large Internet businesses employ multiple geographically dispersed data centers 1030, in which case a single threat detection system 1000 may serve one or multiple data centers.

Network service threat detector 1060 analyzes logged transactions 1050 for suspicious behavior characteristic of man-in-the-browser ("MiB") attacks and other types of attacks, and issues threat notifications 1070 accordingly to service threat processors 1080, including the service administrator, the service's alert processing system, and other associated service parties, as appropriate. If the service is not configured to provide all the transaction information needed by the detector in the stream of raw transaction records 1050 pushed to the detector, then the detector may issue requests 1100 to pull additional information 1120 as needed from the client-facing data centers 1030 or from internal service data centers 1110, which are installed at some services where they are shielded from the Internet for reasons of security or efficiency. Additionally, for services that can make other use of information produced by the detector, the detector may send information 1140 to the service data centers 1030 or 1110, either unsolicited or in response to requests 1130 from the detector 1060. Network service threat detector 1060 is described in more detail under FIG. 3.

Threat processors 1080 review threat notifications 1070, possibly in conjunction with additional information provided by other tools (not shown), and issue corresponding remedial actions 1090 to client-facing data centers 1030.

Remedial actions 1090 may also be fed back to the MiB detector 1060, permitting the detector to respond on its own to subsequent matching threats, without incurring the delay entailed by encumbering the threat processors. Threat remediations 1090 include immediately thwarting hijacked clients from accessing the service as a whole or sensitive portions thereof, by blocking them, delaying them, diverting them to harmless webpages, or spoofing sensitive information; warning the victims that their systems have been infected, either through independent channels such as telephone or paper mail, or through changes to account information that would go unrecognized by the hijackers but compel the victims to contact the business through other channels such as by telephone; reversing or blocking the fraudulent transactions; monitoring and tracking the compromised accounts; and forwarding incriminating evidence to the appropriate authorities for further investigation and prosecution, or other actions.

In the preferred embodiment, rearguard network-service threat detection system 1000 is capable of detecting and remedying attacks on a service in substantially real time.

Figure 2:
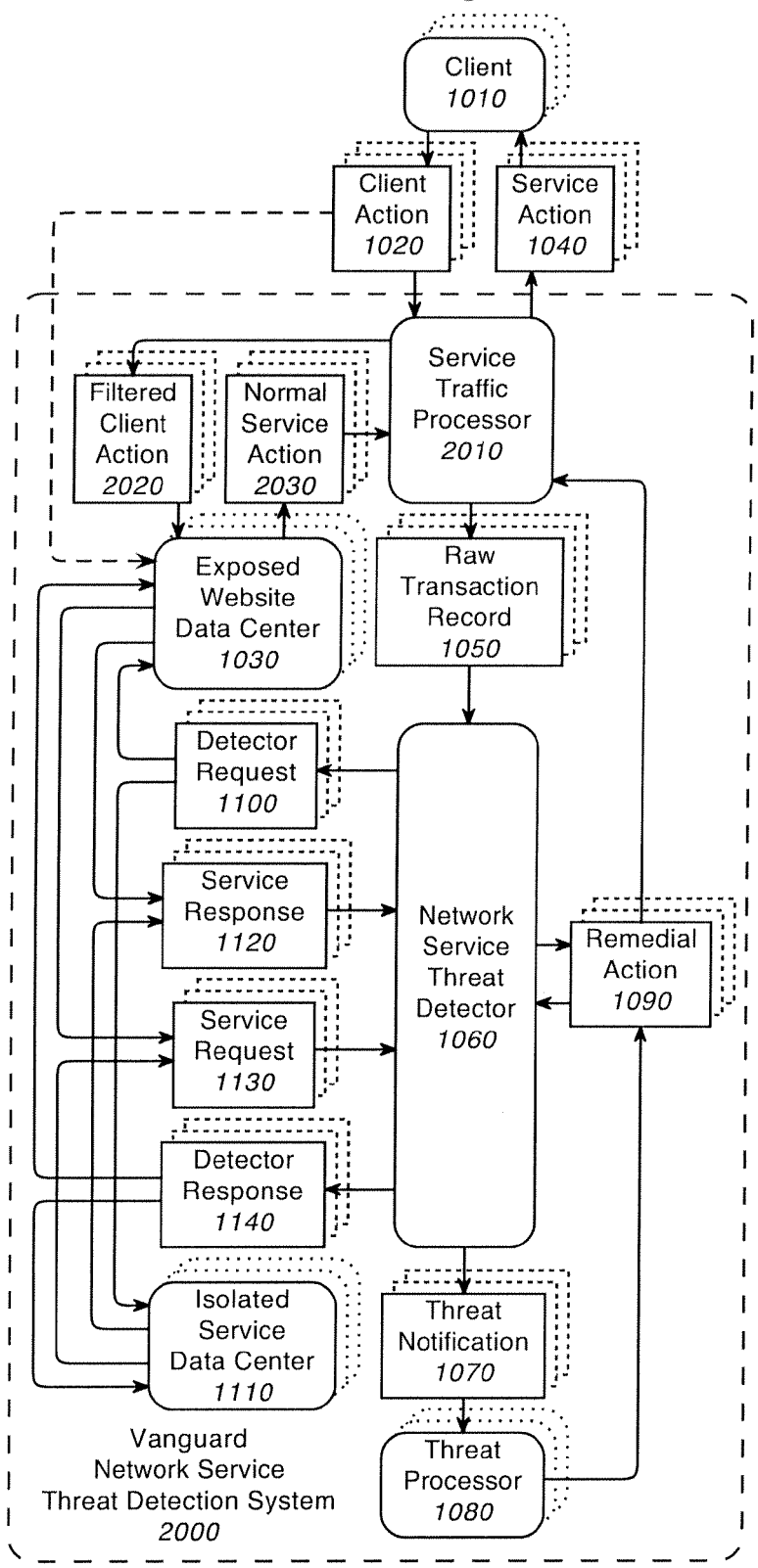
FIG. 2 is a top-level information-flow diagram of a vanguard network-service threat detection system according to aspects of the present invention.

Top-level information-flow diagram FIG. 2 illustrates an alternate way to integrate with a service's data center(s): as a vanguard network-service threat detection system 2000.

In this configuration, service traffic processor 2010 is introduced as a proxy to intercept client actions 1020 in order to output transaction records 1050 to threat detector 1060; and to intercept normal website actions 2030 output by website data centers 1030 in order to substitute remedial actions 1090 provided by the MiB detector 1060 or website threat processors 1080, as appropriate. As with the other components, website traffic processor may be onsite, offsite, or in a cloud computing center. For generating transaction records, website traffic processor 2010 has direct access to all the information in the HTTP request headers from client actions 1020 and in the HTTP response headers from the website actions 2030 or 1090. It also has access, through its own clock, to the exact times that the client actions were received and the website actions 1040 were transmitted, which it inserts in the transaction records, thus obviating the need for server synchronization during session reconstruction (See FIG. 5) other than for conciliation with information exchanged internally with website data centers 1030 and 1110 through service responses 1120 to detector requests 1100 and detector responses 1140 to service requests 1130.

In the preferred embodiment of the vanguard MIB detection system, to avoid superfluous generation of normal website actions 2030 replaced by remedial actions 1090, exposed data centers 1030 receive client actions 1020 only as filtered client actions 2020 from website traffic processor 2010, which either withholds remediated client actions from the website data centers, or flags them as remediated before passing them on to the data centers to log without responding.

In an alternative embodiment, for example if the website needs to log all client actions accurately but is not set up to refrain from responding to remediated client actions, client actions 1020 are either passed through website traffic processor 2010 unfiltered, or copied directly (dashed arrow) to the website data centers, to be filtered by the website traffic processor only on output 2030.

In another alternative embodiment, if it is more convenient for certain actions or other information to be communicated internally, particularly if the vanguard MiB detector is collocated with the data centers, MiB detector 1060 may issue a detector request 1100 and receive a service response 1120 directly from isolated service data center 1110 or exposed website data centers 1030, or provide a service request 1130 directly to the data centers.

A vanguard MiB detection configuration 2000 is preferable for websites that are not designed to produce the real-time transaction parameter records 1050 needed by the MiB detector, that are not designed to implement the remedial actions 1090 desired to deal with MiB attacks in real time, or that prefer to have the MiB detection and remediation handled offsite before offensive client actions have a chance to reach the website. Vanguard MiB detection also offers the advantages of more-accurate and more-precise timestamps and tighter bounds on client response time estimates, as explained in connection with FIG. 6.

In the preferred embodiment, MiB detection system 2000 is capable of detecting and remedying MiB attacks on a website in substantially real time.

Figure 3:
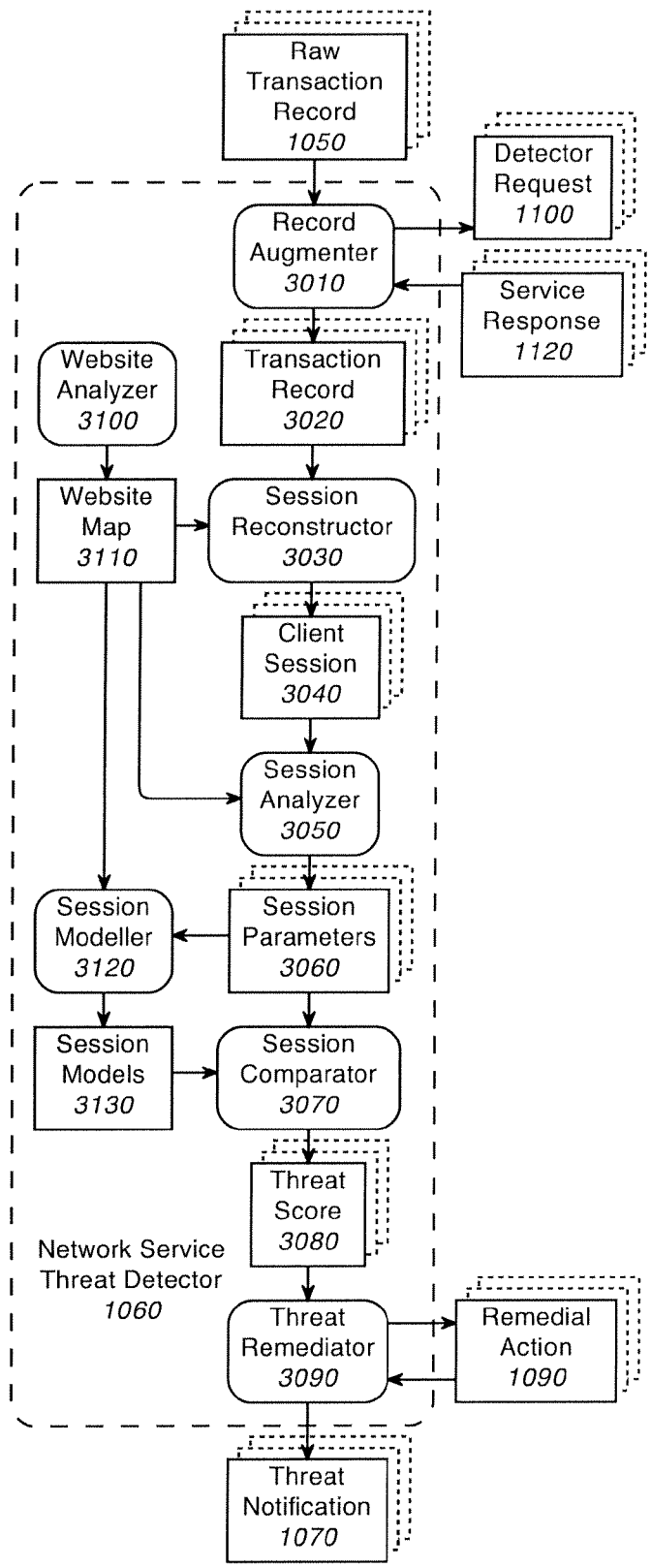
FIG. 3 is a high-level information-flow diagram of the network-service threat detector in FIG. 1 or FIG. 2.

As depicted in high-level information-flow diagram FIG. 3, man-in-the-browser detector 1060 inputs raw transaction parameter records 1050 streaming in from the website data center(s), applies a number of processing steps, and outputs threat notification alerts 1070 to website threat processors.

In the first detection step, if the input transaction records 1050 do not contain all the transaction information needed by the threat detector, as is often the case for rearguard detection systems 1000 (See FIG. 1), then record augmenter 3010 obtains as much of the missing information as possible through service responses 1120 by querying the data center(s) with detector requests 1100. As a result, record augmenter 3010 produces augmented transaction records 3020.

Figure 4:
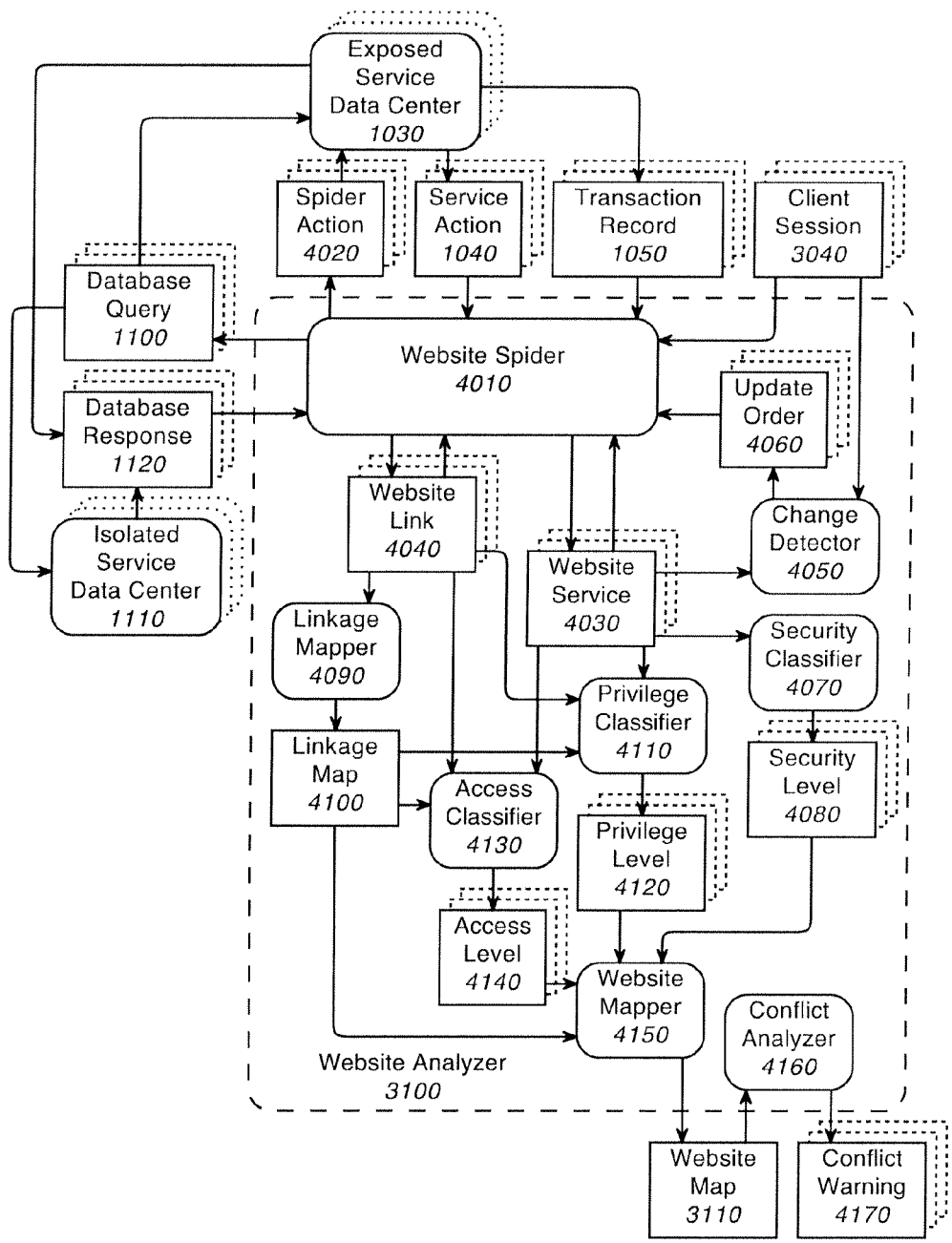
FIG. 4 is an information-flow diagram of the website analyzer in FIG. 3.
Figure 5:
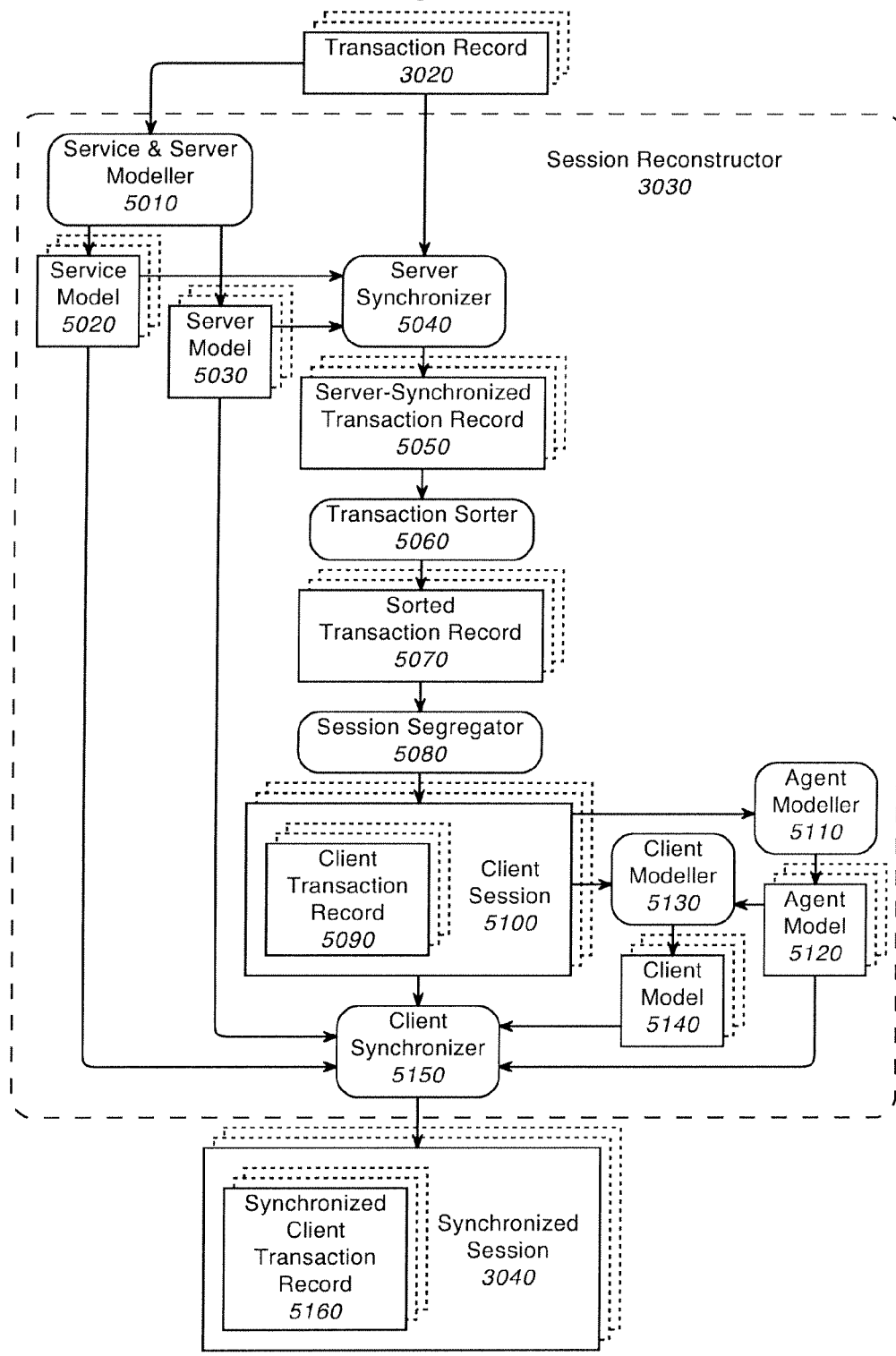
FIG. 5 is an information-flow diagram of the session reconstructor in FIG. 3.

Next, the augmented transaction records 3020 are analyzed by session reconstructor 3030 to separate them into individual client sessions 3040, as further described under FIG. 5. The session reconstructor may be assisted in its analysis by use of a website map 3110 generated and maintained by website analyzer 3100, as further described under FIG. 4.

Figure 11:
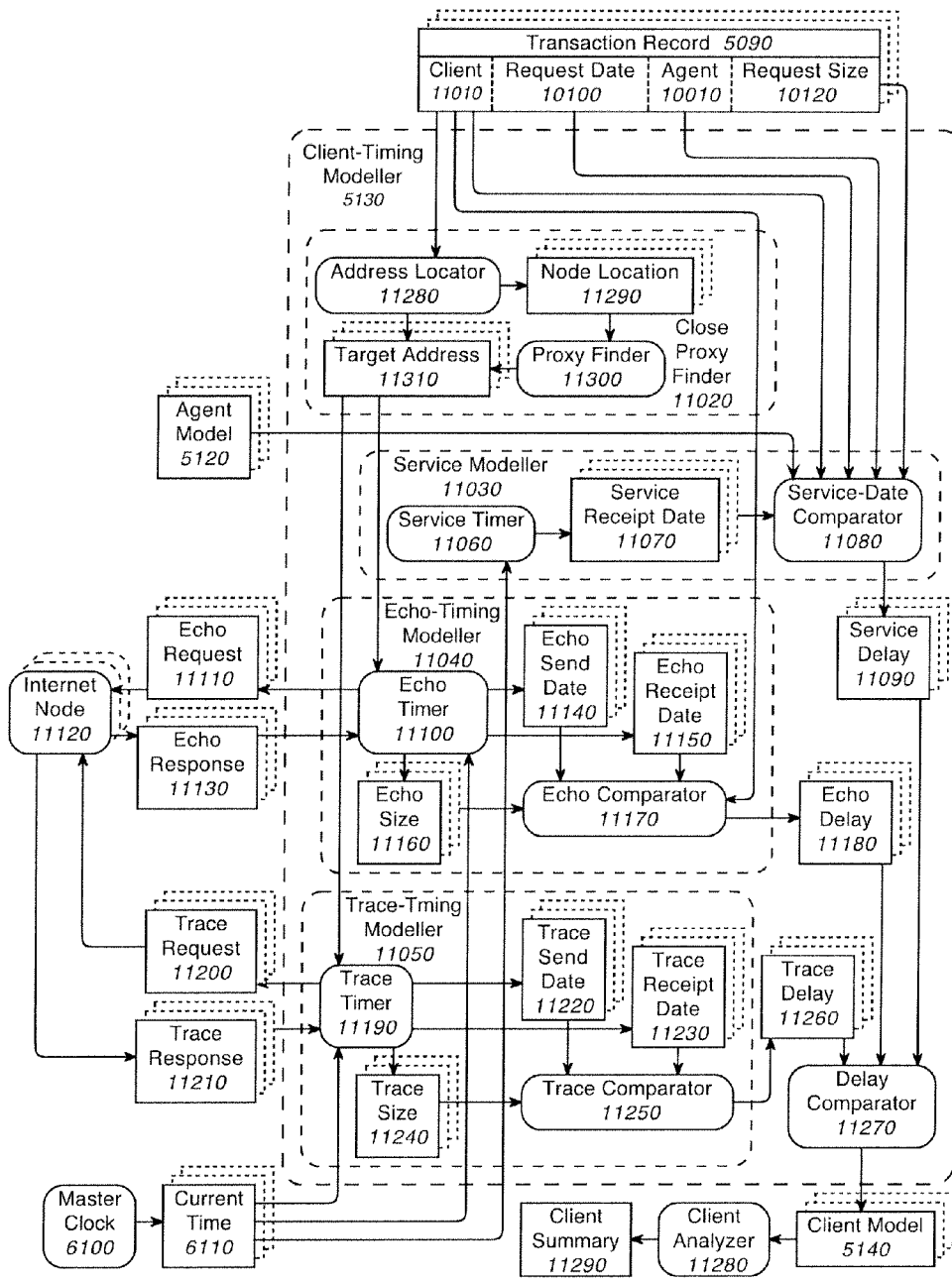
FIG. 11 is an information-flow diagram of the client timing modeler for FIG. 5.

Session analyzer 3050 then analyzes the client sessions for features characteristic of MiB attacks or similar website attacks, and for each input session can output a record of session threat parameters 3060, as further described under FIG. 11. The session analyzer may also make use of information from the website map.

Next, session comparator 3070 compares current session-parameters 3060 against a set of session models 3130 derived by session modeler 3120 from aggregate current and prior session-parameters records, and for each current client session outputs a threat-score record 3080. The session modeler may use the website map in its analysis. The session comparator is described further in connection with FIG. 18, and the session modeler in connection with FIG. 17.

Finally, for each client session, threat remediator 3090 analyzes the threat score record 3080 and, as warranted, outputs threat notification 1070 for further analysis and remediation by website threat processors 1080 (See FIG. 1). If directed to do so, the threat remediator may also output remedial action 1090 to client-facing website data center 1030 (See FIG. 1) or to website traffic processor 2010 (See FIG. 2).

As depicted in information-flow diagram FIG. 4, website analyzer 3100 for use in network-service threat detector 1060 (See FIG. 3) analyzes the logical structure of the website and outputs a website map 3110 detailing the intrinsic linkages 4100 among the webpages, as well as the intrinsic access level 4140, intrinsic privilege level 4120, and intrinsic security level 4080 of each region of the website. Website spider 4010 assembles a complete list of all pages and other services 4030 provided by the website and of all internal hyperlinks 4040 among the pages and other media of the website, by examining intrinsic hyperlinks on various pages, and following each link that leads to a new target, thus building up the lists of services and links as it goes.

Like ordinary website spiders of the prior art, website spider 4010 is launched at the website root and traverses the website by issuing client actions 4020—via simulated website clicks or, if available, the website's application programming interface—to the client-facing website 1030, and analyzing website action responses 1040 for all traceable links. In case the website contains disjoint regions or regions not directly reachable by external spidering, the spider is also launched at unlisted services appearing in the Request URLs and Referrer URLs in client sessions 3040. In addition, links untraceable by external spidering, such as deliberately disguised CGI POST methods, website spider 4010 traces in parallel internally via transaction records 1050. Where possible, website spider 4010 also traverses the website by accessing the services and links directly through database queries 1100 to website data center 1110 or 1030.

To distinguish the uniform resource locators (URLs) of genuinely new services from merely synonymous URLs of known services, the URL resolver (not shown) employed by website spider 4010 and change detector 4050 is augmented to resolve not only the URLs supplied and received by external spidering from client actions 4020 and website actions 1040, respectively, but also the URLs and equivalent identifiers provided by the website data centers in the responses 1120 to database queries 1100 and in the transaction records 1050 in the client session records 3040. To resolve URL aliases, spider 4010 not only compares service contents as in prior art spiders, but first correlates URLs presented externally in website actions 1040 with internal URIs given in transaction records 1060, synchronizing the two by, for example, including a sequence number in the User-Agent field of its requests.

Change detector 4050 monitors client sessions 3040 for the appearance of new services not in the list of website services 4030, as well as periodically checking for changes to already listed services, and issues update orders 4060 to the website spider accordingly.

Security classifier 4070 examines each web service 4030, and outputs security level 4080 classifying the service according to whether its contents are ever transmitted as plaintext, or always transmitted in encrypted form via a secure protocol such as TLS or SSL, as recognizable by the "https://" secure protocol name in the services' URLs, as opposed to "http://", or by the HTTP Upgrade header.

Linkage mapper 4090 compiles the lists of services 4030 and links 4040 into a coherent map 4100 of the website's intrinsic linkage structure.

Privilege classifier 4110 examines website links 4040 for checkpoints requiring passwords or higher levels of authentication, and uses this information to partition linkage map 4100 into regions according to the echelon of privilege 4120 required to access the services 4030 within each region.

Access classifier 4130 examines each web service and assigns it an access level 4140, ranging from an innocuous static "wall" providing no access to personal or proprietary information; through an unsafe "window" permitting inherently risky transactions that a malicious agent could exploit to indirectly damage the interests of the client or the site's owner, such as viewing personal or proprietary information and using it at other times or in other places; to a dangerous "door" permitting inherently dangerous transactions that a malicious agent could exploit to directly damage the interests of the client or the site's owner, such as removing or transferring goods or money; creating, deleting, or changing information such as account ownership or shipping addresses; and in general effecting changes on the webserver or elsewhere outside the client's browser. Windows are typically indicated by HTTP GET and HEAD methods, while doors are typically indicated by HTTP POST, PUT, and DELETE methods.

Website mapper 4150 compiles website linkage map 4100, access level data 4140, privilege level data 4120, and security level data 4080 into a single integrated website directed-graph map 3110 for use by session reconstructor 3030 and session modeler 3120 (See FIG. 3) to determine whether an observed transition coincides with an intrinsic website link; by session comparator 3070 (FIG. 3) to weight session threat scores according to intrinsic threat values of the services and transitions involved; and by website threat processors 1080 and other website personnel to visualize and explore the threat terrain of their website; and by the website developers to improve the intrinsic security of their website.

The website map includes a service index and a link index for quick random access by service and link.

Website map 3110 is also intended for use by other operations personnel, for example to determine whether all current regions of the website are properly connected, and whether abandoned or experimental regions are properly disconnected; for development research, for example to determine whether certain common pathways should be replaced with more-efficient ones, and whether certain uncommon ones should be removed; and for marketing research, for example to explore how various services can be accessed or promoted.

Conflict analyzer 4160 uses website map 3110 to analyze the structural integrity of the website, and outputs conflict warnings 4170 for any structural security flaws in the website, ranked by priority, in order to thwart certain types of threats of which the website security personnel are presumably not yet aware and which fraudsters may already be exploiting. In particular, private information should never be sent in the clear, and risky actions should never be accessible to clients without the requisite clearance, so services containing windows and especially doors should be both privileged and secure. The conflict analyzer can also issue warnings 4170 for broken links, as well as for orphaned regions of the website, whose unmaintained status may pose security risks.

As depicted in information-flow diagram FIG. 5, session reconstructor 3030, for use in network-service threat detector 1060 (See FIG. 3), compiles the augmented transaction records 3020 from the website data center(s) into synchronized individual client sessions 3040 by synchronizing and sorting the records and segregating them into sessions.

The transaction synchronization phases, comprising service timing and server timing modeling 5010, server synchronization 5040, agent timing modeling 5110, client timing modeling 5130, and client synchronization 5150, serve to bound as accurately and tightly as possibly the client response delay: the interval from the instant the client received and was able to respond to website action 1040 (See FIG. 1), to the instant the client responded by issuing client action 1020. Only by knowing the precise client response delay can anomalous client response delays be accurately detected.

Transaction records typically provide two sets of timestamps: server timestamps and client timestamps, which for HTTP services are respectively supplied in the HTTP Response Date headers of the website actions 1040 and in the HTTP Request Date headers of the client actions 1020. These timestamps by themselves, even if both the request timestamps and the response timestamps were reliably present and accurate, are fundamentally inadequate for fixing the client response interval, because neither the response nor the request is instantaneous in its production, transmission, reception, and interpretation. Although websites concerned about security can be presumed to provide some sort of response timestamps, the client request timestamps are only optionally present. Moreover, many websites do not properly synchronize the clocks among their servers; the phase of the response marked by the server's response timestamp is undefined; and some provide a timestamp indicating when the transaction was logged in place of the server response time.

Clients' clocks are likewise often inaccurate, and are in fact intentionally misadjusted by users to help disguise their locations, including by some benign users for privacy; and request timestamps, when present, may be deliberately forged by MiB malware and other attackers to help evade detection. Thus, it is useful to have an accurate estimation of the client response interval from statistical information and models about the timing characteristics of the servers, services, clients, and agents.

In vanguard deployment, the service traffic processor 2010 (See FIG. 2) records the times when it begins and finishes relaying each service request from each client to the website servers and the times when it begins and finishes relaying each corresponding response from the server back to the client, and can thus accurately estimate the client response interval for each transaction from transaction-specific timing information. In a rearguard deployment, however, the session reconstructor estimates the client response interval from more general statistics.

For website operators willing to modify their websites or have their websites modified, a client-side timing mechanism can be embedded in the website's services, which explicitly measures the time interval between service receipt and user response, and reports that time interval back directly to the website. For HTML pages, for example, the timer can be implemented as a Javascript Date( ) object created on load and set to the load date, and then, when a hyperlink on the page is clicked, either the load time or the elapsed time since loading is appended to the target URL or to the payload of the HTTP request.

In a vanguard deployment, with permission, the service traffic processor embeds this mechanism in the website services on the fly. Otherwise, having the website developers add this mechanism in a normal development cycle may take many months. In any case, since client-side timing information can be spoofed by an MiB attacker and other attackers, the session reconstructor still should corroborate it with independently derived server-side information.

In the first session-reconstruction step, server synchronizer 5040 corrects for discrepant clock settings among active servers at the website during the data-collection period and compensates for the indeterminacy of the phase of service represented by the servers' date timestamps recorded in input transaction records 3020, in order to accurately estimate the server's receive date, send date, and sent date for each input transaction record, augmenting the transaction record with these dates to output corresponding server-synchronized output transaction record 5050. The server synchronizer bases the server clock correction and phase compensation on service-specific timing models 5020 and server-specific service timing models 5030 generated and maintained by service-timing and server-timing modeler 5010 for each service and each server, respectively, appearing in the input transaction records. The server modeler is described in greater detail under FIG. 6, and the server synchronizer under FIG. 8.

Next, transaction sorter 5060 sorts all the synchronized transaction records 5050 from the data-collection period in chronological order, either by synchronized receive date, send date, or sent date, outputting sorted transaction records 5070. In the preferred embodiment, the transaction records are sorted by the synchronized receive date, which tends to have the least variance of these three date estimates.

Session segregator 5080 teases apart the sorted transaction records 5070 into records belonging to individual clients, on the basis of such identifying characteristics as the account number, cookie, authentication, URL session ID, email address, and IP address, outputting each individual client's set of sorted transaction records as an individual client session 5100. The session segregator is discussed at length under FIG. 9.

Finally, client synchronizer 5150 corrects for errant clock settings among all active clients using the website during the data-collection period, compensates for the indeterminacy of the phase of request represented by the user agents' date timestamps recorded in the input transaction records, adjusts for transmission time between each client and server in each direction, and adjusts for the user-agents' service load time, in order to accurately estimate the client's load date and click date, augmenting the transaction records in client sessions 5100 with these dates to output corresponding client-synchronized output transaction records in synchronized client sessions 3040. The client synchronizer bases the client clock correction, phase compensation, transmission delays, and load time on client-specific client-timing models 5140 generated and maintained by client timing modeler 5130, by agent-specific agent-timing models generated and maintained by agent timing modeler 5110, as well as on server models 5030 and service models 5020. The agent modeler is described further under FIG. 10. The client modeler is detailed under FIG. 11.

At many websites, the accuracy of the timestamps is untrustworthy because each transaction may be received and transmitted by a different server, and the servers may not be properly synchronized, so that their clocks and hence their timestamps disagree significantly and gradually drift apart. This problem may be especially pronounced when different transactions within the same client session may even be served by data centers geographically distant from one another.

A further error, typically constant across all servers particular to a website, is due to the indeterminacy of the server phase denoted by a server timestamp: Many web services take a substantial interval of time to assemble and transmit, and the timestamp could refer to any instant during that interval. In fact, the precise meaning of the Date header in the server response is even officially undefined—although the HTTP specification recommends that the date represent the moment just before the entity is generated, it allows for the date to be generated at any time during the message origination.

Therefore, depending on the website, the timestamp may denote when the server received and enqueued the HTTP request, when it dequeued the request and began serving the service, when it finished serving the service, when it recorded the received or fulfilled request in a database, or anything in between.

Figure 6:
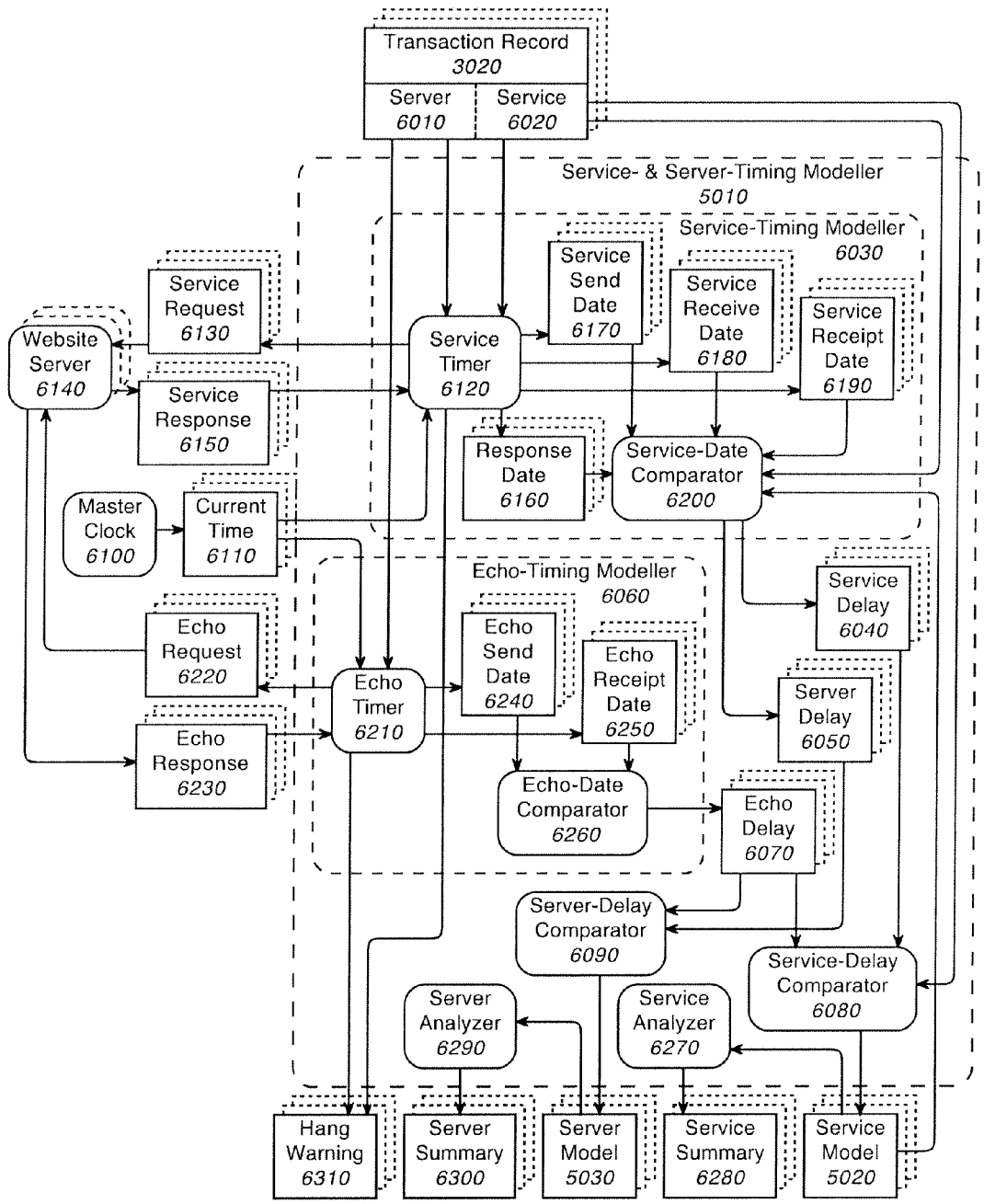
FIG. 6 is an information-flow diagram of the service & server timing modeler in FIG. 5.

As depicted in information-flow diagram FIG. 6, service-timing and server-timing modeler 5010, for use in session reconstructor 3030 (See FIG. 5), estimates and tracks the service timing characteristics 5020 for each service 6020 provided by the website during the data-collection period, and the server timing characteristics 5030 for each client-facing server 6140 in use at the website during the data-collection period, by using service- and server-delay modeler 6030 to measure and model the server's service delay statistics 6040 and server delay statistics 6050 for each service provided by that server during the data-collection period; using echo modeler 6060 to measure and model the server's echo delay statics 6070; using service-delay comparator 6080 to compare the service-delay and echo-delay models; and using the server-delay comparator 6090 to compare the server-delay and echo-delay models.

Service- and server modeler 5010 inputs transaction records 3020 during the data-collection period and extracts the server identifier 6010 to obtain a list of all exposed servers active during the data-collection period, which it provides to service- and server-modeler 6030 and echo modeler 6060; and extracts the service identifier 6020 to obtain a list of all services provided by each server during the data-collection period, which it provides to the service- and server-modeler. For the current Internet addressing schemes, the server identifier consists of the server's IPv6 or IPv4 address and port number in the TCP or UDP packet-header, the port number being necessary for website servers in a private network behind a proxy; and the service identifier consists of the service's URL.

During the data-collection period, service- and server-timing modeler 6030 uses service- and server-timer 6120 to measure the timing characteristics of each active server 6140 identified by server identifier 6010 for each of that server's active services 6020, and uses service- and server-date comparator 6200 to model the statistical distribution of the server's service timing characteristics.

Specifically, in a rearguard deployment, for each active server and each of that server's active services, the service- and server-timer sends a statistically significant number of requests 6130 for that service to that server, and outputs the date timestamp 6160 specified by the server in the service response 6150—in the server's Response Date header in the case of HTTP transactions. The moment the service timer sends a service request, it outputs service-request send date timestamp 6170; the moment it begins to receive corresponding service response 6150, it outputs service-response receive date timestamp 6180; and the moment it has finished receiving the service response, it outputs service-response date timestamp 6190; each of these times being given by master clock 6100 as respective current time 6110. In a vanguard deployment, instead of issuing a statistically significant number of instances of each service request, the server timer can simply pass the filtered client actions 2020 to the servers, and receive the corresponding normal service actions 2030, thus providing an accurate fix for each actual client transaction without the need for additional samples.

Service- and server-date comparator 6200 models the distribution of the difference between service-receipt date 6190 and service-send date 6170 for each service 6020, outputting the models as service delay models 6040. The service-date comparator also models the distribution of the difference between nominal response date 6160 and each of service-send date 6170, service-receive date 6180, and service-receipt date 6190 for each server 6010 as a function of the service 6020, outputting the models as server delay models 6050. The service-date comparator is detailed under FIG. 7.

Also during the data-collection period, echo-timing modeler 6060 uses echo timer 6210 to measure the null-service timing characteristics of each active server 6140, and uses echo date comparator 6260 to model the statistical distribution of the null-service timing characteristics. Specifically, echo timer 6210 issues a statistically significant number of echo requests 6220, also known as ping requests, to each active website server 6140, outputting echo send date timestamp 6240 the moment it sends the echo request, and outputting echo receipt date timestamp 6250 the moment it has received the echo response 6230 back from the server, each timestamp being given by the respective current time 6110 as specified by master clock 6100.

For each timed echo, echo date comparator 6260 calculates the difference between echo receipt time 6250 and corresponding echo send time 6240, and outputs a model of the distribution of the result as echo delay model 6070. In the simplest embodiment, the server-specific echo delay model for each direction comprises half the mean roundtrip echo time. The preferred embodiment also takes into account any known speed and bandwidth asymmetries in the transmission rate of the Internet connection on either end, by partitioning the roundtrip echo time into two portions inversely proportional to the throughput in that direction.

Finally, for each active service 6020, delay comparator 6080 compares the service roundtrip delay 6040 with the echo roundtrip delay 6070, outputting the difference between the models as intrinsic service duration in service model 5020.

In an alternative embodiment, the server timing is modeled in terms of service length in bytes, rather than in terms of intrinsic service duration.

For each active exposed website server 6140, server delay comparator 6080 also compares the server's service delay distribution 6050 with the server's echo delay distribution 6070, outputting the difference between the models as server timing model 5030. In the simplest embodiment, the server timing model comprises three affine functions of the intrinsic service duration, each with an additive bias parameter and a multiplicative rate parameter. Specifically, the server receive function, used by server synchronizer 5040 to estimate when the server received a service request, is calculated as the difference between the service request delay function and the echo request delay function; the server send function, used to estimate when the server started to send a response, is calculated as the difference between the service send function and the echo send function; and the server sent function, used to estimate when the server finished sending a response, is calculated as the difference between the service sent function and the echo send function.

In an alternative embodiment, instead of creating server-independent service-delay models 6040 separate from server-delay models 6050, server service-date comparator 6200 generates a separate server-delay model for each active service for each active server providing that service. The simplest combined service-and-server-delay model then gives the service-request, service-respond, and service-response delays as constant functions specific to both the service and the server, computed as the observed mean of each respective difference. In this case, service-delay comparator 6080 and server-delay comparator 6090 are likewise combined into a single service-and-server-delay comparator that correspondingly outputs a separate timing model for each active service for each active server providing that service.

If either the service timer 6120 or the echo timer 6210 finds that a server fails to respond or finish responding to a request within a reasonable amount of time, typically within a few seconds or a small multiple of the average response time for that server or that service request, then it excludes that measurement from the statistics and issues a warning 6310 to website administrators that the server is not responding as quickly as expected.

Service timing models 5020 and server timing models 5030 are updated by service-delay comparator 6080 and server-delay, comparator 6090 periodically, frequently enough to track the drift among server clocks, as well as after power outages, daylight-savings-time clock shifts, and other exceptional events that might affect the server clock settings or alter the proxy's port numbers for individual servers. In the preferred embodiment, the server timer updates the server timing models frequently enough to accurately track server congestion. In an alternative embodiment, the service delay models 6050 and the echo delay models 6070, and thereby the server models 5030, explicitly take website congestion into account, as thresholded affine functions of the server load.

In one embodiment, the service models 5020 and server models 5030 and the underlying service delay models 6040, server delay models 6050, and echo delay models 6070 are computed in independent batches, for example for successive data-collection intervals such as once per hour for the preceding hour. In the preferred embodiment, these models are continually updated with a sliding window in shorter overlapping increments, even, in the limit, as each new transaction record is collected and as each old transaction ages beyond the time window.

In addition to their use for website threat detection, the service timing models 5020 can be analyzed by service analyzer 6270 and presented as service summaries 6280 for operations research, for example to determine whether the resources devoted to particular services or types of services should be adjusted; for development research, for example to determine whether certain services should be replaced with more efficient ones; and for marketing research, for example to determine how various services are being used.

Similarly, in addition to their use for website threat detection, the server timing models 5030 are analyzed by server analyzer 6290 and presented as server summaries 6300 for operations research, for example for load-balancing or to determine whether certain servers or types of servers are performing up to expectations.

Figure 7:
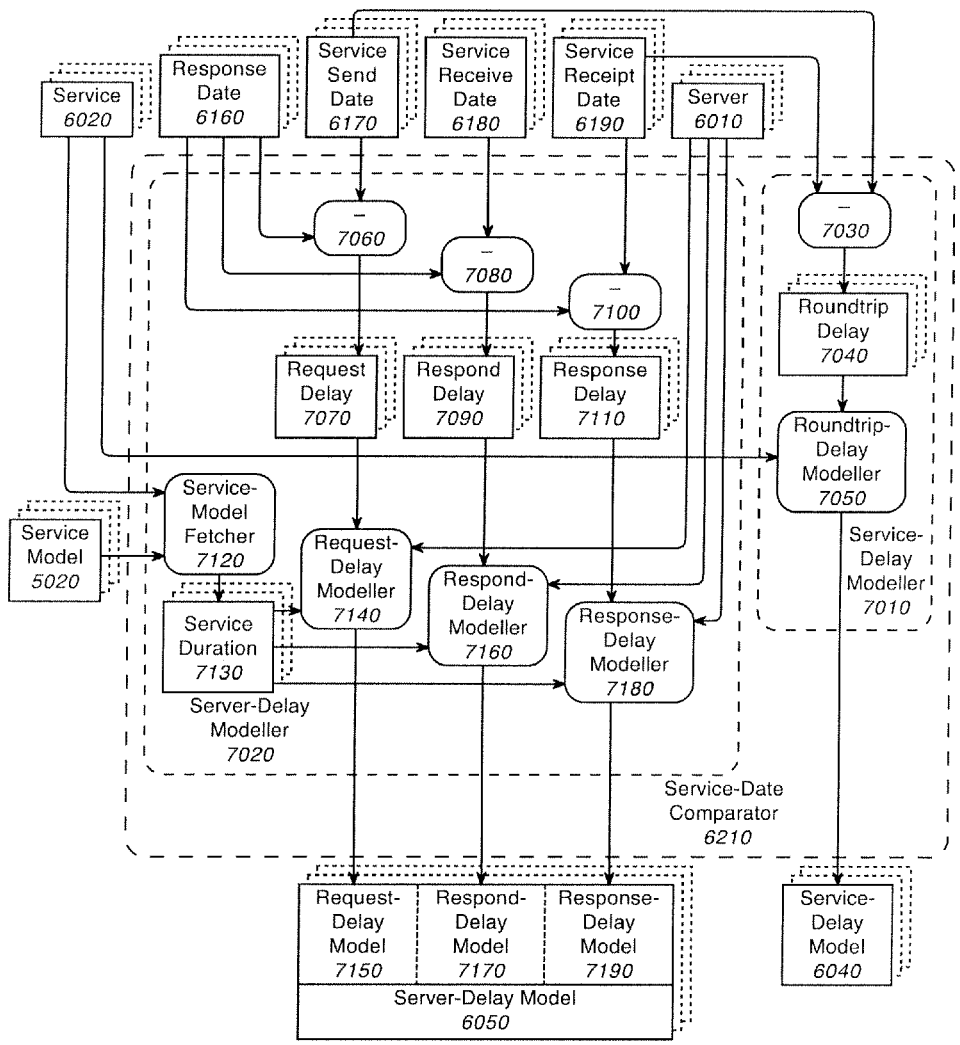
FIG. 7 is an information-flow diagram of the service-date comparator in FIG. 6.

As depicted in information-flow diagram FIG. 7, the server service-date comparator 6200, used by service- and -server modeler 5010 (See FIG. 6) models the service delay 6040 using service-delay modeler 7010, and models the server delay 6050 using server-delay modeler 7020.

For each timed service transaction, the server service-delay modeler calculates the difference 7030 between the service-receipt date 6010 and the corresponding service-send date 6170, outputting the result as service round-trip delay 7040. Roundtrip-delay modeler 7050 computes a server-independent model of the distribution of this difference for each service 6020, outputting the result as service-delay model 6040. In the simplest embodiment, the service-delay model comprises a service-specific constant function, computed as the mean round-trip time across all active servers, which is the least-squares best fit value. In the preferred embodiment, the model for each service takes caching into account by decomposing the round-trip data into cached versus uncached distributions, where caching is determined by re-requesting the same service from the same server in quick succession.

Similarly, for each timed service transaction, the server-delay modeler 7020 uses differencer 7060 to calculate the service-request delay 7070 as the difference between nominal response date 6160 and corresponding service-request send date 6170; uses differencer 7080 to calculate the service-respond delay 7090 as the difference between each service-receive date 6190 and the corresponding nominal response date; and uses differencer 7100 to calculate the service-response delay 7110 as the difference between each service-receipt date 6190 and the corresponding nominal response date. Service-model fetcher 7120 then fetches service-duration parameters 7130 for the service identified by service identifier 6020 from service models 5020.

In the simplest embodiment, the service-duration parameters used by the server-delay modeler comprise the mean duration of the service. Finally, request-delay modeler 7140 models the request delay for each server 6010 as a function of the service duration, which it outputs as request-delay model 7150; respond-delay modeler 7160 likewise models the respond delay for each server as a function of the service duration, which it outputs as respond-delay model 7170; and response-delay modeler 7180 likewise models the response delay for each server as a function of the service duration, which it outputs as response-delay model 7190; these three models comprising the server-delay model 6050. In the simplest embodiment, the server-delay modeler models the service-request, service-respond, and service-response delays as server-specific affine functions of the intrinsic service duration, computed by the least-squares best fit, each function specified by an additive bias parameter and a multiplicative rate parameter. In the preferred embodiment, the model for each of the three service-delay components also takes caching into account, by decomposing the observed data for each into two separate affine functions, one for when the service is cached, the other for when it is uncached.

In the preferred embodiment, the server-delay modeler and service-delay modeler account for the effect of encryption—such as TLS or SSL—on service timing implicitly, by considering the encrypted versus unencrypted versions as distinct services modeled separately. Ordinarily, this happens automatically as a result of the convention of giving securely encrypted services distinct URLs, such as "https: . . . " versus "http: . . . ".

Note that, since the bandwidth of the connection between the server timing modeler and the servers for a website is typically at least as great as that of any client, its effect on the serving duration is relatively insignificant.

Figure 8:
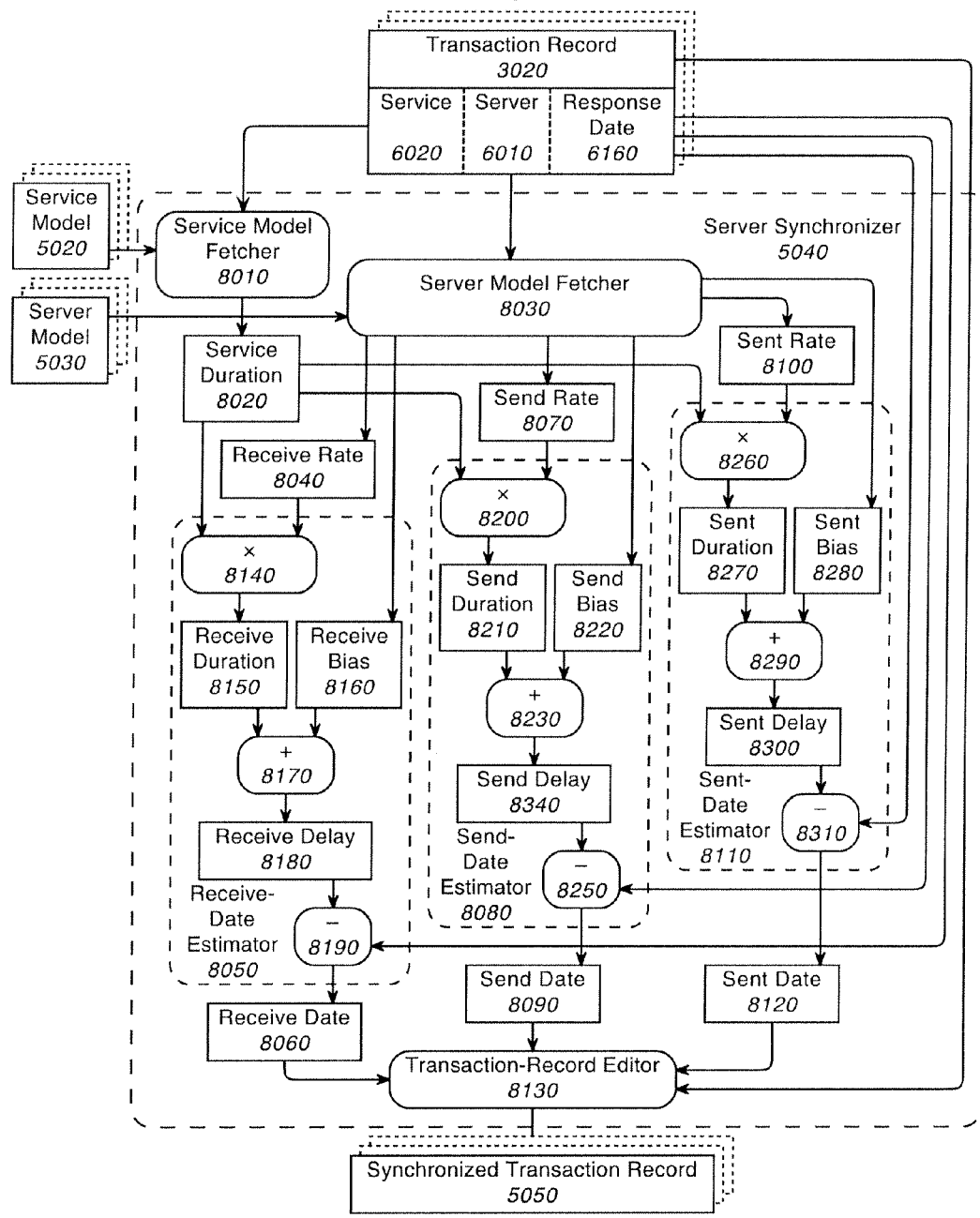
FIG. 8 is an information-flow diagram of the server synchronizer in FIG. 5.

As depicted in FIG. 8, server synchronizer 5040, for use in session reconstructor 3030 (See FIG. 5), adjusts the response date timestamp 6160 in each input website transaction record 3020 for inaccuracies in the clock settings of the server 6010 and for the indeterminacy of the phase of service, using receive-date estimator 8050, send-date estimator 8080, and sent-date estimator 8110 to accurately estimate the server's receive date 8060, send date 8090, and sent date 8120, respectively, for that transaction, and outputting those estimates in corresponding augmented server-synchronized output transaction record 5050. The server synchronizer bases these adjustments on the timing model 5020 for the service and the server timing model 5030 for the server.

For detecting man-in-the-browser attacks, man-in-the-middle attacks, repetitive robotic attacks, and similar types of website attacks, which are characterized by anomalously ordered transactions and anomalously quick transactions, accurate server timestamps are critical. By giving transaction sorter 5050 (See FIG. 5) accurate and precise dates by which to sort the transaction records, it can be determined whether the order of transactions in a session appear anomalous. By giving event comparator 18020 (See FIG. 18) accurate and precise event-duration estimates, it can be determined whether an event is anomalously quick.

Although for non-streaming data, websites usually communicate with clients via TCP/IP, which guarantees packet order, nevertheless a separate TCP socket session is created for each webpage, so if a client opens a plurality of pages concurrently, those requests may travel along different routes and be received by the website out of order, and they may be processed by servers of differing speeds and responded to out of order, and the responses may likewise travel along different paths and reach the client out of order. Note, however, that within a single processing thread, for example within a single browser window or tab, the client actions and website actions are necessarily strictly ordered, in the sense that the client has to receive each website action before being able to respond to it, while the website likewise has to receive each client action before being able to respond to it.

For each input transaction record 3020, service- and server-modeler 5010 extracts the service identifier 6020 and passes it to service model fetcher 8030, extracts server identifier 6010 and passes it to server model fetcher 8030, and extracts server response date timestamp 6160, which it passes directly to each of the server date estimators: receive-date estimator 8050, send-date estimator 8080, and sent-date estimator 8110.

Service-model fetcher 8010 uses service identifier 6020 to look up the appropriate service timing model 5020, which it outputs to receive-date estimator 8050, send-date estimator 8080, and sent-date estimator 8110. In the simplest embodiment, shown here, the service timing model comprises a mean service duration 8020.

Server-model fetcher 8030 uses server identifier 6010 to fetch the appropriate server timing model 5030, which it likewise outputs to the server date estimators. In the simplest embodiment, shown here, for each of the three server date estimators, receive-date estimator 8050, send-date estimator 8080, and sent-date estimator 8110, the server timing model comprises an affine function of the service duration, each affine function being specified by a multiplicative rate parameter (receive rate 8040, send rate 8070, and sent rate 8100) and an additive bias parameter (receive bias 8160, send bias 8220, and sent bias 8280), respectively.

Receive-date estimator 8050 estimates the server receive date 8060—the instant when the server received the service request—by adjusting the server's response date timestamp 6160 by the server receive bias 8160 and the product of the server receive rate 8040 and the service duration 8020.

In detail, multiplier 8140 multiplies the service duration estimate by the server receive rate estimate, outputting the result as receive duration estimate 8150. Adder 8170 then adds the receive duration estimate to the receive bias estimate, outputting the sum as total receive delay estimate 8180. Finally, subtractor 8190 subtracts the receive delay estimate from the recorded response date, outputting the difference as adjusted receive date estimate 8060.

Similarly, send-date estimator 8080 estimates the server send date 8090—the instant when the server began sending the service response—by adjusting the server's response date timestamp 6160 by the server send bias 8190 and the product of the server send rate 8070 and the service duration 8020. In detail, multiplier 8200 multiplies the service duration estimate by the server send rate estimate, outputting the result as send duration estimate 8210. Adder 8230 then adds the send lag estimate to the send bias estimate, outputting the sum as total send delay estimate 8240. Finally, subtractor 8250 subtracts the recorded response date from the receive delay estimate, outputting the difference as adjusted send date estimate 8090.

Similarly, sent-date estimator 8110 estimates the server sent date 8120 the instant when the server finished sending the service response—by adjusting the server's response date timestamp 6160 by the server sent bias 8280 and the product of the server sent rate 8100 and the service duration 8020. In detail, multiplier 8260 multiplies the service duration estimate by the server sent rate estimate, outputting the result as sent duration estimate 8270. Adder 8290 then adds the sent duration estimate to the sent bias estimate, outputting the sum as total sent delay estimate 8300. Finally, subtractor 8310 subtracts the recorded response date from the receive delay estimate, outputting the difference as adjusted receive date estimate 8120.

Finally, transaction-record editor 8130 augments the input transaction record 3020 to include server receive-date estimate 8060, server send-date estimate 8090, and server sent-date estimate 8120, outputting the augmented transaction record as synchronized transaction record 5050.

Often the response to a service request is assembled from a number of service components that may differ in service timing characteristics, provided by a number of servers that may differ in server timing characteristics. For example, a web page may include static text, dynamic client-specific text, images, and other materials, and may even include other web services, for example in separate HTML frames. In these cases, in the preferred embodiment, the receive-date estimator 8050, send-date estimator 8080, and sent-date estimator 8110 accumulate the receive delays 8180, send delays 8240, and sent delay 8300, respectively, before subtracting the response date, outputting a single receive-date estimate 8060, single send-date estimate 8090, and single sent-date estimate 8120, respectively, for the entire transaction.

It should be noted that relative (and possibly absolute) timing of events can be done as described herein or using conventional methods, if available.

Figure 9:
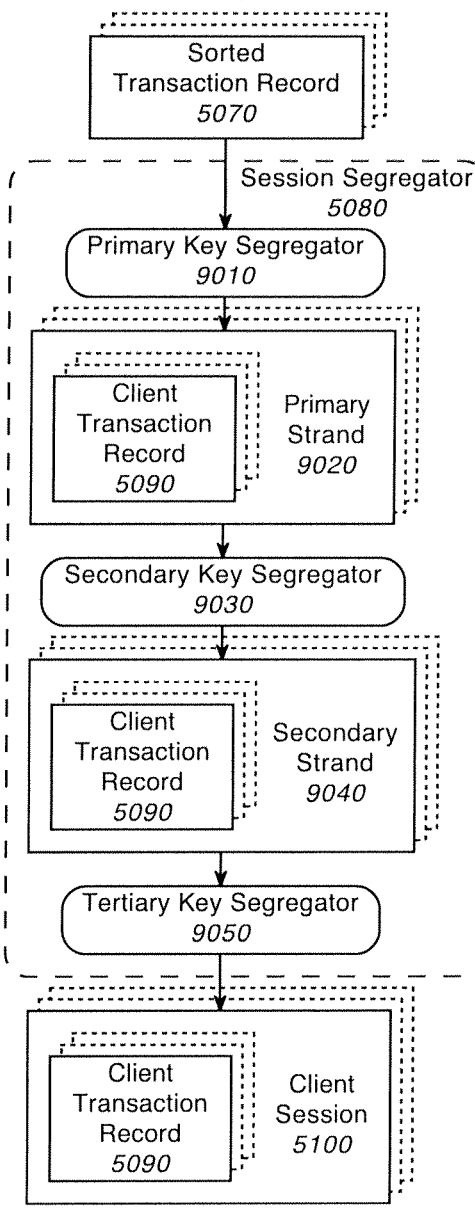
FIG. 9 is an information-flow diagram of the session segregator in FIG. 5.

FIG. 9 depicts session segregator 5080, for use in session reconstructor 3030 (See FIG. 5). To aggregate individual transactions into individual client sessions and segregate them from other client sessions, session segregator 5080 identifies clients chiefly on the basis of five specific types of information provided in transaction records 3020 from HTTP header and IP header information: the client and proxy IP addresses; the authorization login ID; the client's email address; the session cookie; the session query ID; and the current and referring URLs. Unfortunately, all five of these sources of information are unreliable, ambiguous, degenerate, or untrustworthy. In fact, except for the IP addresses, which are reliable, and the cookies, which are unambiguous in legitimate sessions, all four of these sources of identifying information suffer from all four of these deficiencies. At some websites, particularly for rearguard deployments, an internal account ID may also be available, which, though related to these other types of information, may be distinct from them.

The source IP address and destination IP address are required in all HTTP requests and responses as part of the IP packet header, making the IP address, alone among the five specific types of identifying information, reliably present in all transaction records. Nevertheless, the value of the IP address is an inadequate discriminant of client sessions, because in legitimate use the relation between IP addresses and clients is both ambiguous (one-to-many) and degenerate (many-to-one). On one hand, a single IP address is commonly shared by multiple clients, for example when clients share a router in a local area network, or when they share a proxy or a firewall. Although in such cases the clients are distinguished by the port number in the extended IP address, the mapping between client and port is ephemeral. In such cases the clients may also be distinguished by HTTP Forwarded-for field in the request header, but that field is optional. On the other hand, a single client may use multiple IP addresses within a single session, for example when a mobile client is automatically switched between cell towers while travelling, when a client is automatically switched or intentionally switched between wireless routers due to interference in a congested wireless environment, or when using a multihoming system with multiple public IP addresses. Furthermore, the IP address and Forwarded-for field in a client's request header are untrustworthy in that they may be spoofed by an attacker, for example in order to camouflage the client's response times and order of transactions.

In order to receive the website's responses, an attacker must of course have control of the bogus IP addresses, for example through legitimate ownership, hijacking the IP address through malware installed on the client's system at that IP address, or stealing the IP address by poisoning the network address translator in any router along the route to redirect traffic to the attacker's system, or poisoning the address resolution caches within a local area network to direct traffic to the attacker's system. For certain types of attacks, however, such as denial-of-service attacks on websites by flooding the websites with requests, denial-of-service attacks on clients by flooding the clients with responses, or attacks defaming or blacklisting clients by attributing unsavory or hostile actions to them, the attackers have no need to receive the website's responses. In man-in-the-browser attacks, the attacker automatically shares the client's the IP address.

The login ID specified in the HTTP Authorization request-header field, unlike the IP address, is unreliably present, because many websites make no use of it, instead communicating authorization information in the Cookie field or in a query string in the URL and because most websites permit clients to visit certain areas and perform certain types of actions without logging in. Many visitors to a website do not even have an account at the website to sign in to, and those clients with valid accounts at a website often avoid signing in, due to laziness or privacy concerns. Nevertheless, for websites that use HTTP Authorization to restrict access to privileged regions, the login ID is, when properly implemented by the website, reliably present in HTTP requests for services within those regions. Like IP addresses, login IDs are legitimately both ambiguous and degenerate client identifiers. On one hand, multiple clients commonly share the same login ID, for example in situations where one or more users are helping others with their accounts, one or more users are supervising others, or when multiple people in a firm or a family use the same login ID. On the other hand, a single client may use multiple login IDs, for example when a client has multiple independent accounts, or is serving a number of customers with independent accounts at the website. Login IDs are also untrustworthy, since they are often spoofed by attackers, for example in brute-force password-guessing attacks, in man-in-the-middle attacks, and for stolen accounts. In man-in-the-browser attacks, the attacker automatically shares the login ID.

The email address specified in the HTTP From request-header field is highly unreliable because, to protect users' privacy and to avoid spam, it is not implemented by most modern browsers, and is typically only supplied by scrupulous spiders and robots. The From email address is also legitimately both ambiguous and degenerate, since on the one hand, multiple users often share an email account, for example in a family or small business where one person is Internet-savvy or imperious; while on the other hand, a single user may often have multiple email accounts, for example for home versus office. If the email address were available, it would be roughly as untrustworthy as the IP address, in that it is easily spoofed, but in order to receive any responses sent to that email address, an attacker would need to have access to the email account.

The cookie specified in the HTTP Cookie request-header field is unreliably present, because clients can refuse to accept cookies from the website and thus not return the cookies to the website, and modern browsers make it easy for users to refuse cookies. On the other hand, websites can refuse to serve users who refuse cookies, and many security-conscious websites do so. Moreover, when present and properly implemented by the website to include a unique session ID, a cookie is the most specific client identifier that HTTP provides for, because the relation between clients and session cookies may be one to many, but not legitimately many-to-one: A single client may have multiple concurrent cookie sessions with a website by using multiple applications to access the website, for example, when using more than one browser to connect to the website because of website-browser incompatibilities, or when using automating applications to perform routine functions on the website. In contrast, a cookie can only be shared if it is deliberately stolen, for example by copying the cookie using malware installed on the intended recipient's system, by intercepting it through a counterfeit website, by side-jacking the cookie with a packet sniffer, or by forwarding the cookie by cross-site scripting; or if the cookie is deliberately planted or "fixed", for example by getting the victim's browser to store the cookie via cross-site cooking or cross-subdomain scripting.

On some websites, a query string specifying the session ID is appended to the current URL.

Query-string session IDs are susceptible to harvesting in a referred website from the URL query string in the HTTP Referrer field, and to session fixation by emailing the victim a hyperlink specifying a session ID in a URL query string, where the session ID may be generated by the attacker or by the target website.

Referring URLs, specified in the HTTP Referrer field, are unreliably present, because, to help protect users' privacy, some services, browsers, and browser extensions permit referrers to be disabled.

The timestamps, in addition to being used to sort the transactions in chronological order, are also used to help segregate sessions on the basis of overlapping transactions. Note, however, that a single client may legitimately have overlapping transactions, for example by concurrently opening or operating multiple browser windows opened to the same website.

Besides timestamps and these five specific types of information, the session segregator can also use generic types of information specified in HTTP Request headers, including Accept (acceptable content types), Accept-Charset (acceptable character sets), Accept-Encoding (acceptable encodings), Accept-Language (acceptable languages), Accept-Ranges (acceptable size ranges), User-Agent (name and details of web application), and Via (proxies through which the request was sent). All of these HTTP Request headers are optional and therefore unreliable. Moreover, they are all untrustworthy, being easily spoofed. Some browsers and freeware browser-plug-ins even exist to let ordinary users conveniently alter some of these headers during a session. However, spoofing such non-specific information during a session does not affect any of the specific session identifiers. Changes in any of these generic information types during a session can be flagged as potentially indicating that the session has been hijacked.

The session thus segregates 9010 the sorted transaction records 5070 according to cooke ID, if available, as the primary key, into primarys strands 9020; and segregates 9030 the primary strands according to account ID, login ID, query session ID, or email address, as available, as secondary keys, into secondary strands 9040; and segregates 9050 the secondary strands by IP address as the tertiary key into client sessions 5100.

Figure 10:
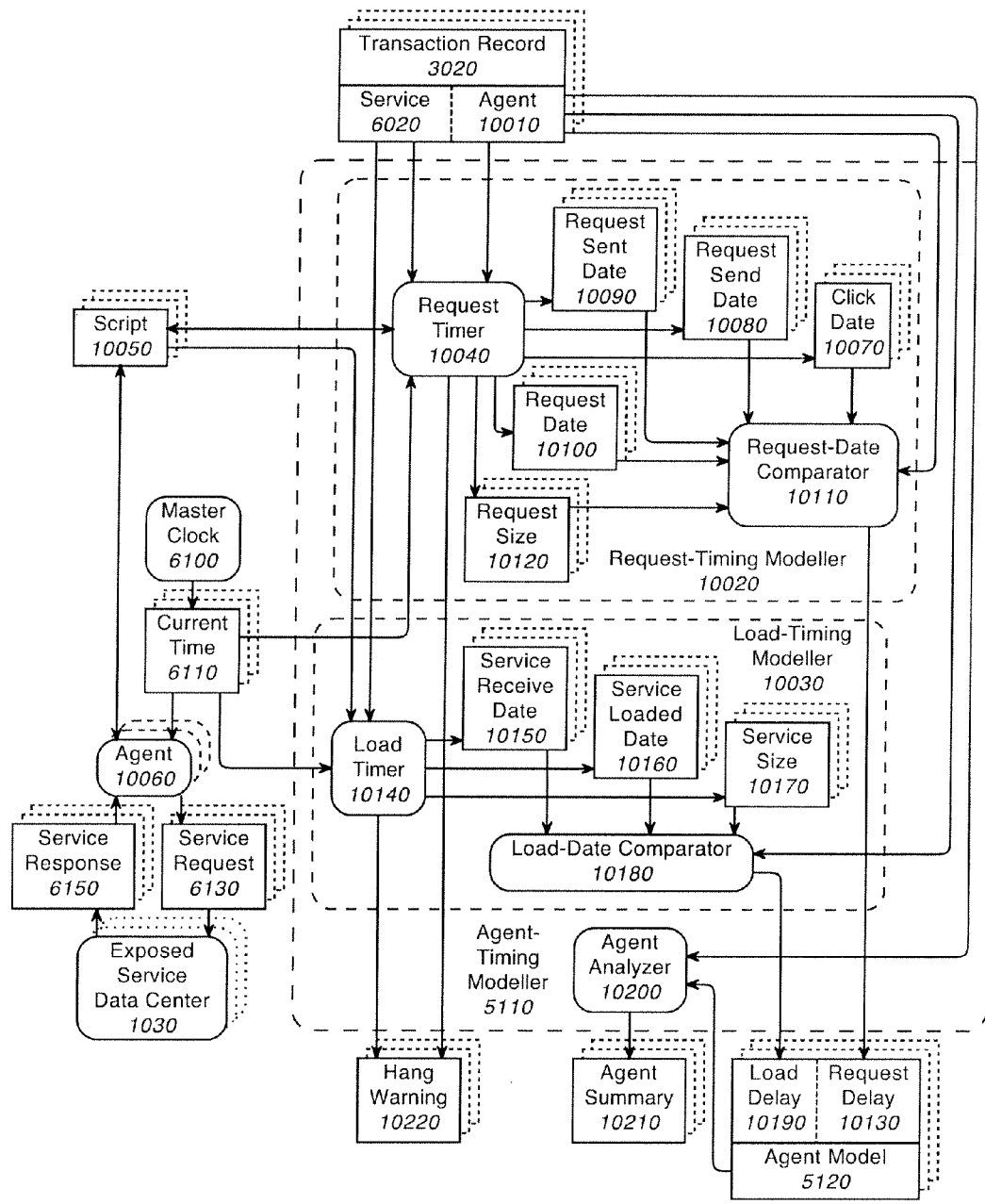
FIG. 10 is an information-flow diagram of the agent modeler in FIG. 5.

As depicted in information-flow diagram FIG. 10, agent modeler 5110, for use in session reconstructor 3030 (See FIG. 5), analyzes the timing characteristics of individual user agents by using agent request-timing modeler 10020 and load modeler 10030, and outputs agent timing models 5120. Agent modeling is done off-line in a laboratory testing environment, by running precisely timed scripts on the combinations of hardware, operating system, and application employed by clients to use the website's services, as recorded, in the case of HTML webpages, by the user-agent field 10010 in the HTTP request headers of the transaction records 3020 received by the website. Assume the bandwidth from the website data center 1030 to the agent test systems 10060 is arranged to be at least as great as that from the website data center to any actual client.

Agent modeler 5110 inputs transaction records 3020 and extracts the agent identifier 10010 to obtain a list of user agents used to visit the website; and extracts the service identifier 6020 to obtain a list of services provided by the website; and provides both these identifiers to agent request-timing modeler 10020.

For each available active user agent 10010, agent modeler uses agent request-timing modeler 10020 to model the agent request delay 10130, and uses agent load modeler 10030 to model the agent load delay 10190.

Agent request-timing modeler 10020 uses request timer 10040 to measure the timing characteristics of each available agent 10060 identified by agent identifier 10010, for each service used by that agent, as identified by service identifier 6020, or for a statistically significant number and variety of those services, and uses agent request-date comparator 10110 to model the statistical distribution of the agent's request timing characteristics.

Specifically, for each available active user agent and each service requested by that agent and to be tested with that agent, the agent request timer runs a script 10050 on that agent 10060 to issue a statistically significant number of requests 6130 for that service from the website 1030. The script reports back to the request timer the time at the instant it simulated a click on a hyperlink requesting the service through the agent or otherwise naturalistically caused the agent to issue a request for the service, which date the request timer records as click date 10070. The script then monitors the agent's system and reports back to the request timer the time at the instant the agent began to transmit the request, which the request timer records as request send date 10080; and the time at the instant the agent finished transmitting the request, which the timer records as request sent date 10090. The request timer also records the request size 10120. The click date, request send date, and request sent date are each given by the current time 6110 according to master clock 6100, to which all agents being timed are synchronized. The script also reports back the nominal request date recorded in the service request by the agent—in the Date field of the HTTP request header, in the case of HTML pages which the agent request timer records as service-request date 10100.

The service-request date is not always available for service requests; for HTTP requests, for example, the Date field in the HTTP Request header is optional, and some browsers and other web applications provide a user-interface control for blocking output of the request date.

For clients supplying a service-request date 10100 through their agent, agent request-date comparator 10110 models the distribution of the difference between the click date 10070 and the nominal request date, between the request-send date 10080 and the nominal request date, and between the request-sent date 10090 and the nominal request date. For clients blocking the service-request date, the request-date comparator also models the distribution of the difference between the request send date and the click date, and between the request sent date and the click date. The agent request-date comparator models each of these five models as a function of the request, and outputs the functions as request-delay model 10130, as part of agent-timing model 5120 for the agent identified by agent identifier 10010. In the simplest embodiment, the agent request-date-comparator models each of these delays as an agent-specific affine function of the request size 10120, computed by the least-squares best fit, each function specified by an additive bias parameter and a multiplicative rate parameter.

Agent-request timing modeler 10030 uses agent load timer 10140 to measure the timing characteristics of each available agent 10060 identified by agent identifier 10010, for each service tested by agent request-timing modeler 10020, and uses load-date comparator 10180 to model the statistical distribution of the agent's load timing characteristics.

Specifically, for each service request issued by agent request-timing modeler 10020, agent-timing script 10050 monitors the agent's system and reports back to agent load timer 10140 the time at the instant the agent's system begins to receive the service, which the load timer records as response receipt date 10150; and reports back to the load timer the instant the agent has finished loading the service—or, more precisely, the instant the client can respond to the service, for example by clicking on hyperlinks, in the case of an HTML webpage—which the load timer records as service loaded date 10160. The load timer also records the size of the service 10170.

In the preferred embodiment, if a single service request 6130 receives multiple service responses 6150, the load script and load timer track each such service separately for greater accuracy. The response receive dates and service loaded dates are given by the respective current times 6110 specified by master clock 6100.

Load-date comparator 10180 models the distribution of the difference between service-loaded date 10160 and response-receive date 10150 as a function of the service, and outputs the function as load-delay model 10190, as part of agent model 5120.

In the simplest embodiment, the load-date comparator models the distribution as an agent-specific affine function of the size of the service 10170, computed by the least-squares best fit, specified by an additive bias parameter and a multiplicative rate parameter. In the preferred embodiment, the load-delay model specifies separate affine parameters for plaintext versus encrypted services, and for service elements of differing load speeds, such as HTML, images using different compression formats, and timed messages that the client must attend before proceeding. In the preferred embodiment, the load-delay model also involves separate load-delay models for cached versus uncached services.

If either the request timer or load timer fails to receive a response from the script within a reasonable amount of time—typically a few seconds—then it outputs a notification 10220 to the test administrators warning that the agent is taking longer than expected, and specifying the agent and the service that elicited the problem.

In addition to outputting agent-timing models 5120 for use by client modeler 5130 and client synchronizer 5150 (See FIG. 5), agent modeler 5110 also uses agent analyzer 10200 to output agent summary 10210 summarizing the agents 10010 used to visit the website, along with their frequency of use. For those agents available for testing, the agent summary also summarizes their load times for different types of services; while those unavailable are marked for possible requisition for future testing. The agent summary is also useful for website-development research, for example to determine which agents the website should optimize for because of their popularity, or to determine whether alternate forms of certain services should be provided for agents that take too long; and for marketing research, for example to determine customer preferences.

For efficiency, agent-timing modeling may be integrated with normal quality-control testing of the website.

As depicted in information-flow diagram FIG. 11, client-timing modeler 5130, for use in session reconstructor 3030 (See FIG. 5), estimates and tracks the timing characteristics 5140 (See FIG. 5) for each website client accessing the website during the data-collection period, by using client service-delay modeler 11030 to measure and model the client's service delay statistics 11090, using echo-timing modeler 11040 to measure and model the client's echo delay statistics 11180, or, if the echo fails, using trace-timing modeler 11050 to measure and model the client's trace-delay statistics 11260, or, if the trace also fails, applying the echo-delay modeler or trace-delay modeler to the closest responding proxy to the client located by close-proxy finder 11020; and comparing the service delay estimate with the null-service echo delay or trace delay.

Many Internet service providers block ping and traceroute requests to prevent their network from being mapped out by malicious clients, and some individual clients also block ping requests to reduce the visibility of their systems and thus reduce the number of network attacks on their systems.

Client-timing modeler 5130 inputs client transaction records 5090 and extracts the client identifier 11010 to obtain a list of all clients active during the data-collection period, which it provides to client service-timing modeler 11030, client echo-timing modeler 11040, client trace-timing modeler 11060, and close-proxy finder 11020. For each client transaction, the client-timing modeler uses the service-timing modeler to estimate the service delay based on service-request date 10100 (if available), user-agent identifier 10010, request size 10120, and service identifier 6020, which are obtained from the transaction record. The client identifier consists of the IPv6 or IPv4 address and port number in the TCP or UDP packet-header, the port number being necessary for clients in a private network behind a router, firewall, or other proxy. In the case of HTML webpages, the service-request date is originally from the Date field in the HTTP Request header, and the user-agent is from the User-Agent field. The request size is obtained either from the sum of the HTTP header lengths and the value of the Content-Length field, or from the TCP or UDP length fields.

During the data-collection period, client service-timing modeler 11030 uses client service timer 11060 to measure the timing characteristics of each active client identified by client identifier 11010, and uses client service date comparator 11080 to model the statistical distribution of the client's service delay characteristics 11090. Specifically, at the moment each client action 1020 (See FIG. 1) is received by website traffic processor 2010 (See FIG. 2), client service timer 11060 outputs service receipt date timestamp 11070 from the current time 6110 given by master clock 6100.

For each service transaction, client service-date comparator 11080 calculates the client's service-request delay from the service-request date timestamp 10100 (if available), the user-agent identifier 10010, the request size 10120, the server traffic processor's service receipt date timestamp 11070, and the user-agent model 5120 identified by the client identifier, and outputs a model of the distribution as client service-delay model 11090. The client service-date comparator is detailed under FIG. 12.

During the same measurement period, client echo-timing modeler uses echo timer 11100 to measure the null-agent timing characteristics of each active client 11010, and uses echo date comparator 11170 to model the statistical distribution of the null-agent timing characteristics. Specifically, for an active client, the echo timer issues a statistically significant number of echo requests 11110 of various sizes to the client or a close proxy 11120, outputting echo send date timestamp 11140 the moment it sends the echo request, and outputting echo-receipt date timestamp 11150 the moment it has received the echo response 11130 back from the client, each timestamp being given by the respective current time 6110 given by master clock 6100. The echo timer also records the echo request size 11160.

When echo response 11130 is delayed by more than a reasonable threshold—typically no more than a few seconds, dependent on the distance to the client and on current network conditions—then echo-timing modeler 11040 aborts the ping attempt, under the assumption that the client is blocking ping requests, and the client-timing modeler 5130 attempts trace timing instead.

For each active client, echo-date comparator 11170 calculates the difference between each echo receipt time 11150 and corresponding echo send time 11140 for a statistically significant sample of echo requests of various sizes 11160, and outputs a model of the distribution of the result as echo delay 11180.

In the simplest embodiment, the client-specific echo-delay model comprises half the mean echo time for each direction and half the echo time variance for each direction, each as an affine function of the size of the echo request, computed by the least-squares best fit, where the function is specified by an additive bias parameter and a multiplicative rate parameter.

The preferred embodiment also takes into account any known speed and bandwidth asymmetries in the transmission rate of the Internet connection on either end, as determined for some clients from the client's IP address 11010, by partitioning the roundtrip echo time into two portions inversely proportional to the throughput in that direction, and likewise proportionately scaling the variance for each direction.

Trace-timing modeler 11050 has traceroute timer 11190 issue traceroute requests 11200 to the same client 11010 or close proxy, with stepwise increasing time-to-live values until either the target node is reached or trace route response 11210 is delayed by more than a reasonable threshold—again, typically no more than a few seconds, dependent on the distance to the client and on current network conditions. If the last response occurs within a plausible delay considering the distance and network conditions, then the trace timer outputs echo-send date timestamp 11220 corresponding to the moment it sent the last successful traceroute request, and outputs trace-receipt date timestamp 11230 corresponding to the moment it received the last successful traceroute response back from the client, each timestamp being given by the respective current time 6110 according to master clock 6100. The trace timer also records the trace request size 11240.

Analogously to echo-date comparator, trace-date comparator 11250 calculates the difference between each final trace-receipt time 11230 and corresponding trace-send time 11220 for a statistically significant sample of trace requests of various sizes 11240, and outputs a model of the distribution of the result as trace delay 11260.

In the simplest embodiment, the client-specific trace-delay model comprises half the mean trace time for each direction and half the trace-time variance for each direction, each as an affine function of the size of the trace request, computed by the least-squares best fit, where the function is specified by an additive bias parameter and a multiplicative rate parameter. Again, the preferred embodiment also takes into account any known speed and bandwidth asymmetries in the transmission rate of the Internet connection on either end, as determined for some clients from the client's IP address 11010.

If neither the echo-timing modeler 11040 nor the trace-timing modeler 11060 succeeds in fixing the roundtrip delay to the actual client 11010, then the client-timing modeler uses close-proxy finder 11020 to find the IP address 11310 of a nearby ping proxy. The close proxy finder first uses address locator 11280 to look up the node location 11290 of the actual client from the client's IP address 11010. Then proxy finder 11300 finds the ping proxy closest to that node location, outputting its IP address as target address 11310. The client-timing modeler 5130 then substitutes the ping proxy's IP address for use by echo-timing modeler 11040 and trace-timing modeler 11060. In case the selected ping proxy also fails, the client-timing modeler uses the close-proxy finder iteratively to find another ping proxy until one succeeds.

Finally, for each active client (or at least some clients), client delay comparator 11270 compares the distribution of the client's service-request delay 11090 with the distribution of the client's echo delay 11180 or traceroute delay 11260, outputting a model of the distribution of the result as client timing model 5140. In the simplest embodiment, the client timing model comprises the echo-request delay or trace-request delay, as a pair of affine functions of request size 10120, one for the transmit direction and one for the receive direction, each function specifying the mean behavior with an additive bias parameter and a multiplicative rate parameter, as well as the variance in the transmit direction; and, if the request dates are supplied by the client, the difference between the client's service-request delay and the echo-request delay or trace-request delay, giving the mean client clock bias and its variance. For websites with more than one data center, the client timer generates a separate model for each geographically separate data center.

In addition to outputting client-timing models 5140 for use by client synchronizer 5150 (See FIG. 5), client-timing modeler 5130 also uses client analyzer 11280 to output client summary 11290 summarizing the clients 11010 visiting the website, along with their IP addresses, geographic locations, and timing characteristics, including whether they supply request dates and respond to ping requests. The client summary is also useful for website-development research, for example to determine whether to provide more-lavish services for clients with large connection bandwidths and short connection lags, or more-meager services for clients with small connection bandwidths and long connection lags; and for marketing research, to determine where customers are located and what kind of connections they have.

Figure 12:
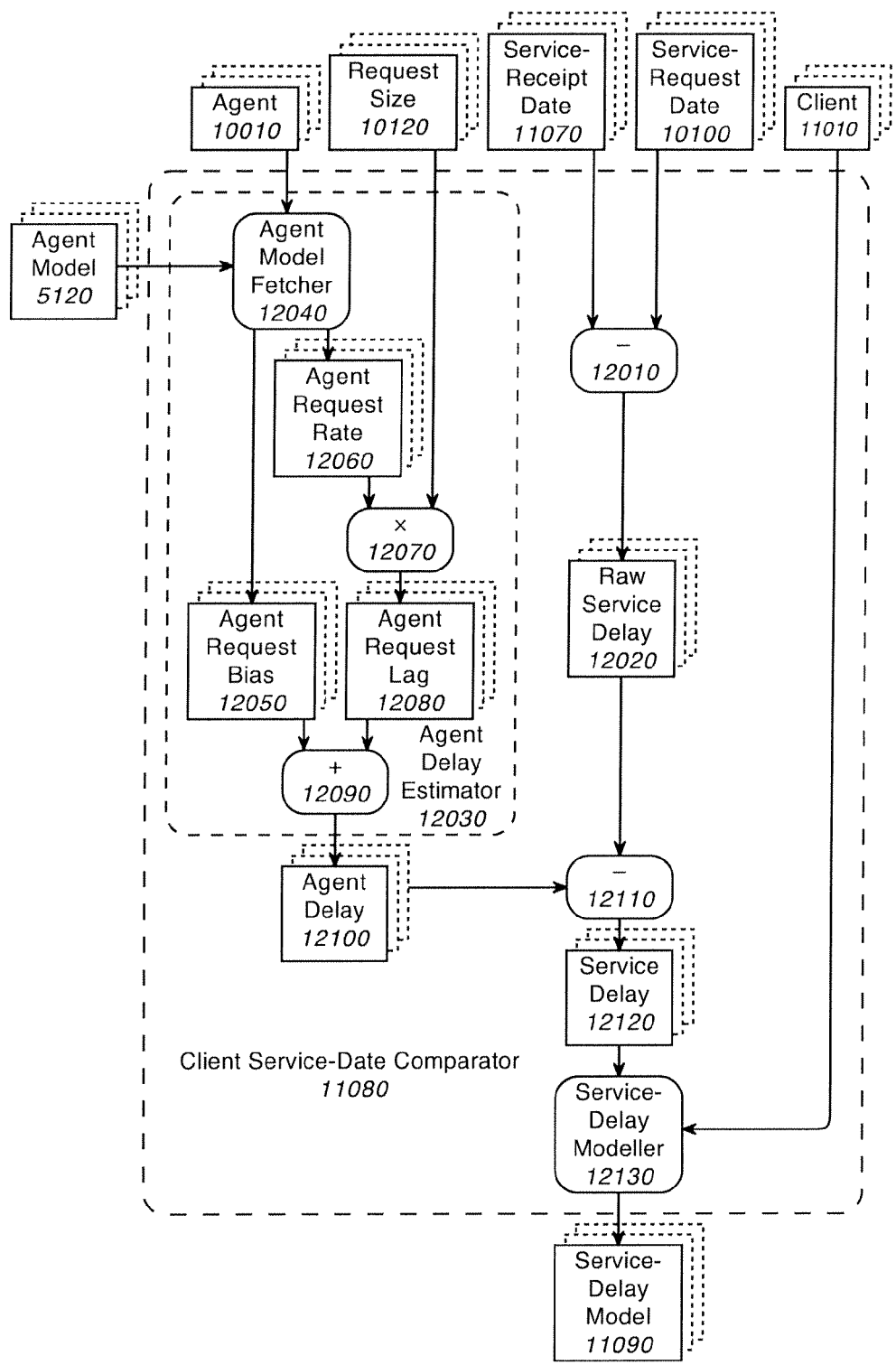
FIG. 12 is an information-flow diagram of the service-date comparator for FIG. 11.

Information-flow diagram FIG. 12 depicts client service-date comparator 11080 (See FIG. 11), which uses agent-delay estimator 12030 to estimate the agent delay 12100; differencer 12010 to measure the raw service delay; differencer 12110 to compare these two estimates, and service-delay modeler 12130 to model the service delay 11090.

For each service transaction, agent-delay estimator 12030 uses agent-model fetcher 12040 to fetch the agent model identified by agent identifier 10010 from agent models 5120. If the transaction record does not specify the agent, the agent delay estimator uses the default agent model, whose parameters are set to the modal values of the known agents active during the data-collection period.

In the simplest embodiment, shown here, the agent request-timing model comprises agent-specific request-bias parameter 12050 and agent-specific request-rate parameter 12060. Multiplier 12070 then multiplies the agent request rate by the request size 10120, outputting the product as agent request lag 12080. Adder 12090 then adds the agent request bias to the agent request lag, outputting the sum as total agent delay 12100.

Likewise, for each service transaction, differencer 12010 calculates the difference between service-receipt date timestamp 11070 and service-request date timestamp 10100, outputting the difference as raw service delay 12020. Differencer 12110 then computes the difference between the raw service delay and the agent delay 12100 output by agent-delay estimator 12030 for the same request, outputting the difference as service delay model 12120.

Finally, for each client, as identified by client-identifier 11010, service-delay modeler 12130 models the distribution of the service, and outputs a model of the distribution of this difference as service-delay model 11090. In the simplest embodiment, the service-delay model gives the service-request delay as the mean service delay for that client, which is the least-squares best-fit model.

Figure 13:
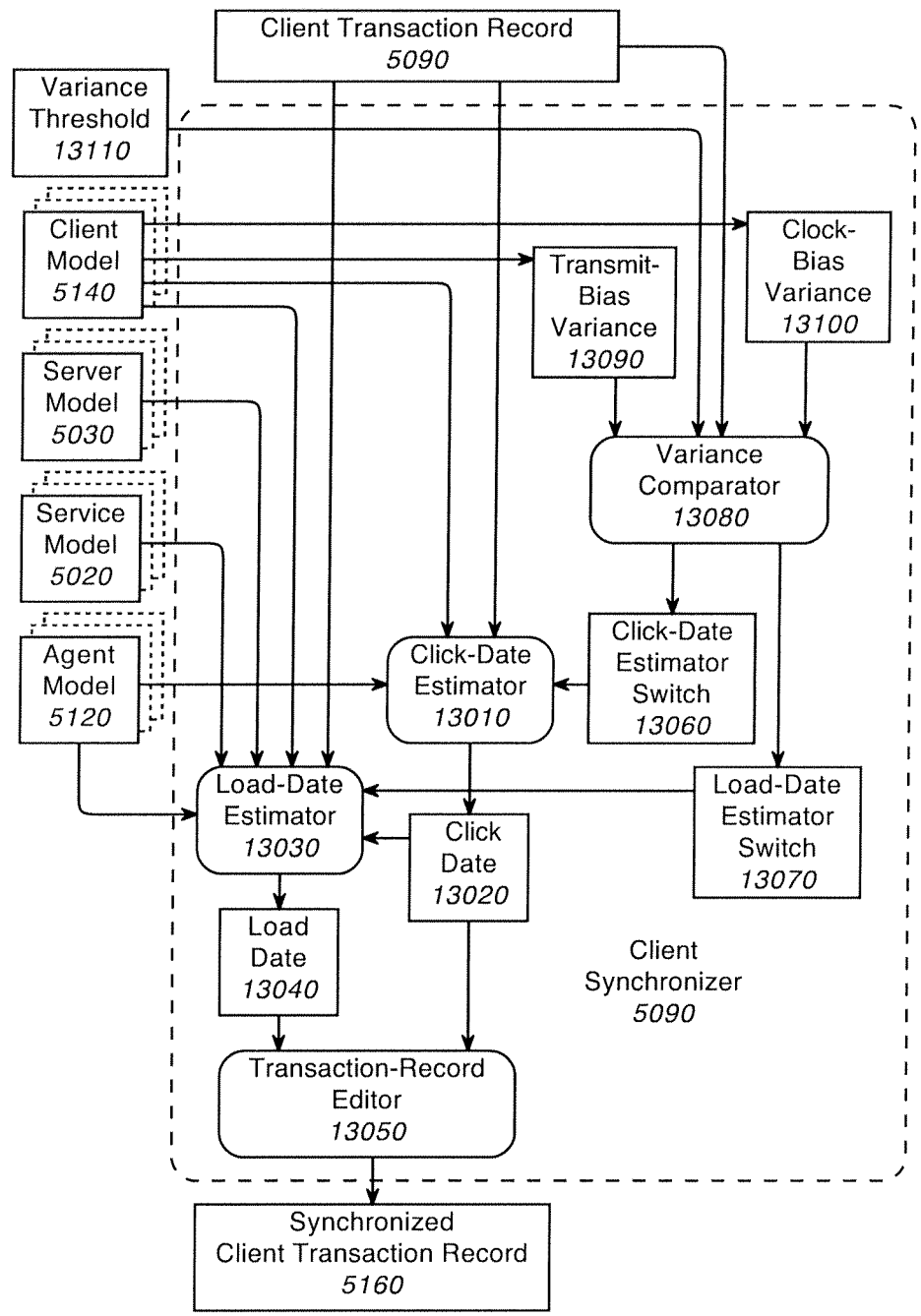
FIG. 13 is an information-flow diagram of the client synchronizer in FIG. 5.

As depicted in information-flow diagram FIG. 13, client synchronizer 5090, for use in session reconstructor 3030 (See FIG. 5), inputs one client transaction record 5090 at a time, and uses variance comparator 13080, click-date estimator 13010 and load-date estimator 13030, and transaction-record editor 13050 to synchronize the transaction with load-date and click-date estimates, outputting corresponding synchronized client transaction record 5160.

Click-date estimator 13010, using information from the input client transaction record 5090, the client model 5140 identified by the client identifier in the input transaction record, and the agent model 5120 identified by the agent identifier in the input transaction record, outputs click-date estimate, accurately estimating the instant that the client requested the target service from the website, such as by clicking on a hyperlink in the source service, according to the network-service threat detector's master clock. The click-date estimator is detailed under FIG. 14.

Similarly, load-date estimator 13030, using information from the client model 5140, the server model 5030, the service model 5020, and the agent model 5120, as identified by the client identifier, the server identifier, the service identifier, and the agent identifier, respectively, in the input transaction record, in addition to the click date 13020 output by click-date estimator 13010 for the same transaction record, outputs load-date estimate 13040, accurately estimating the instant at which the client's agent finished loading the source service to the point when the client was able to act upon it, for example by clicking on a hyperlink, according to the network-service threat detector's master clock. The load-date estimator is detailed under FIG. 15.

The click-date estimator 13010 can estimate the click date based either on the request-date timestamp recorded by the client, when available, or on the server's request-receive date recorded by the server synchronizer. The client-based click-time estimate is ordinarily more accurate because it depends only on the ordinarily constant client clock bias and brief agent click delay, whereas the server-based estimate depends on highly variable transmission time from the client and server, which cannot be estimated as accurately. Similarly, the load-date estimator 13030 can estimate the load date based either on the load-date timestamp recorded by the client using an embedded load timer, when available, or on the server's service send date timestamp recorded by the server synchronizer. Again, the client-based load-time estimate is ordinarily much more accurate because it depends only on the ordinarily constant client clock and brief agent click delay, whereas the server-based estimate depends on highly variable transmission time from the server to the client, and on highly variable load time by the client, neither of which can be estimated as accurately. On the other hand, the date timestamps issued by the client are both unreliably present, being optional, for example, in the HTTP Request header specification; and untrustworthy, in that fraudsters can tamper with them directly.

Variance comparator 13080 first checks whether the client request date and the client load date are available in input client transaction record 5090. If either one is available, the variance comparator compares the variance in the client's transmission bias 13090 to the variance in the client's clock bias 13100, as determined by the client model 5140 identified by the client identifier in the input transaction record. If the difference between the clock-bias variance and the transmission-bias variance is greater than variance threshold 13110, then the client's clock is deemed untrustworthy, otherwise it is deemed trustworthy, where the variance threshold is typically set to a value between zero and a few centiseconds.

If the client request date is available and the client's clock is deemed trustworthy, then the variance comparator sets click-date estimator switch 13060 to use the request-based click-date estimator; else it sets it to use the receive-based click-date estimator. Similarly, if the client load date and the client request date are available and the client's clock is deemed trustworthy, then the variance estimator sets load-date estimator switch 13070 to use the request-based load-date estimator; else it sets it to use the send-based load-date estimator.

Figure 14:
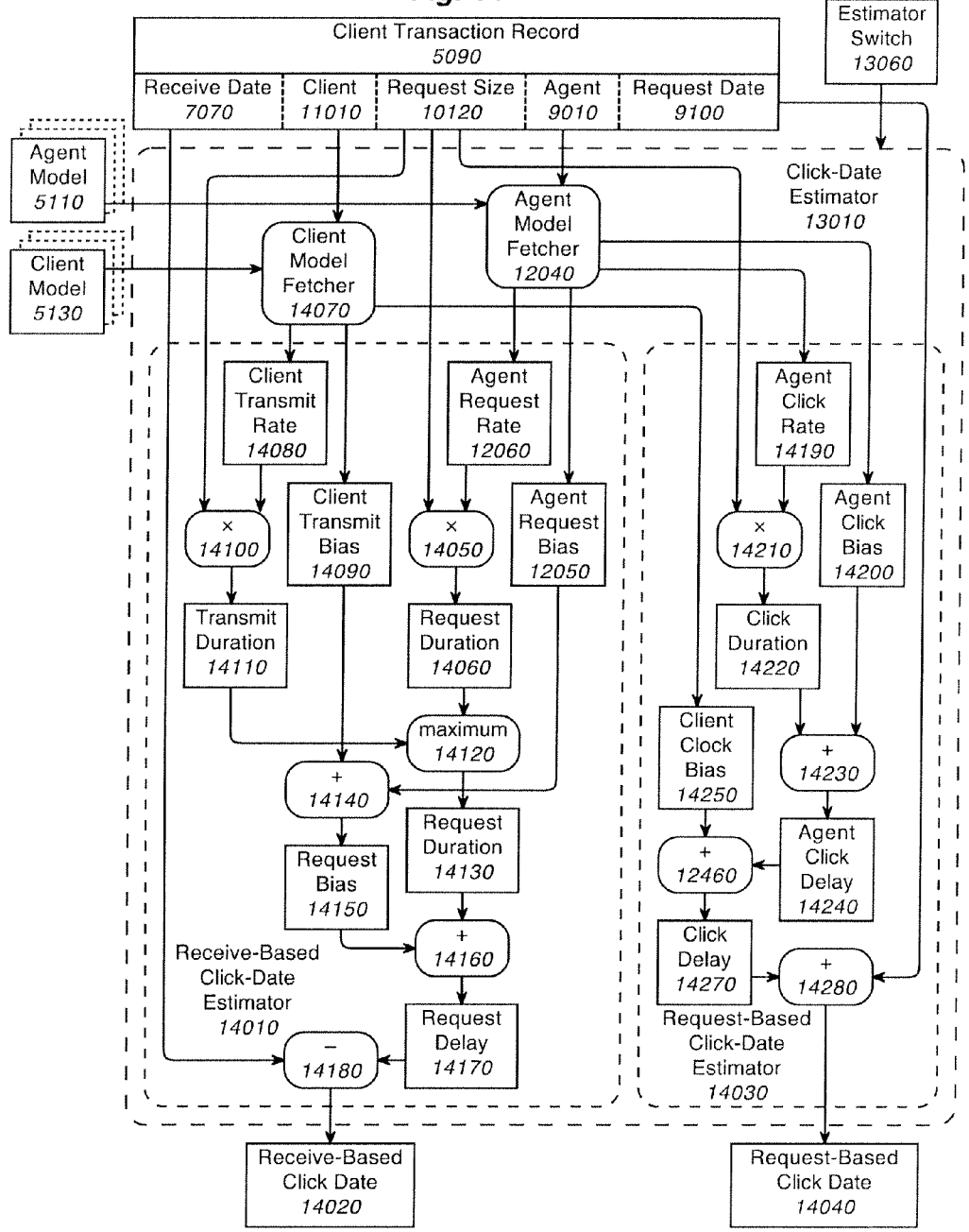
FIG. 14 is an information-flow diagram of the click-date estimator in FIG. 13.

As depicted in information-flow diagram FIG. 14, for each input client transaction record, click-date estimator 13010, for use in client synchronizer 5090 (See FIG. 13), either uses receive-based click-date estimator 14010 to output receive-based click-date estimate 14020, or uses request-based click-date estimator 14030 to output request-based click-date estimate 14040, depending on the value of the click-date-estimator switch 13060.

For receive-based click-date estimator 14010, agent-model fetcher 12040 looks up the agent model 5110 identified by agent identifier 10010 in transaction record 5090, outputting agent request rate 12060 and agent request bias 12050, modeling the delay between the instant the client requests a service, for example by clicking on a hyperlink in the source service, and the instant the client begins transmitting the request. Likewise, client-model fetcher 14070 looks up the client model 5130 identified by client identifier 11010 in the transaction record, outputting client-transmission rate 14080 and client transmission bias 14090, modeling the delay between the instant the client begins transmitting a request and the instant the server receives it.

Multiplier 14050 multiplies agent request rate 12060 by the size of the request 10120, obtained from transaction record 5090, outputting the product as request-duration estimate 14060. Multiplier 14100 multiplies the client transmit rate by request size 10120, outputting the product as transmit-duration estimate 14110. Maximum operator 14120 then computes the maximum of these two values, outputting the result as total request-duration estimate 14130. Adder 14140 adds agent request bias 12050 and client transmission bias 14090, outputting the sum as total request-bias estimate 14150. Adder 14160 then adds the request duration to the request bias, outputting the sum as request-delay estimate 14170. Finally, subtractor 14180 subtracts the request delay from the server request-receive date 8060 obtained from the client transaction record, outputting the difference as receive-based click-date estimate 14020.

For request-based click-date estimator 14030, agent-model fetcher 12040 looks up the agent model 5110 identified by agent identifier 10010 in transaction record 5090, outputting agent click rate 14190 and agent click bias 14200, modeling the delay between the instant the client requests a service, for example by clicking on a hyperlink in the source service, and the request date 10100 recorded by the agent in the client transaction record with a synchronized clock. Client-model fetcher 14070 looks up the client model 5130 identified by client identifier 11010 in the transaction record, outputting client clock bias 14250, modeling the difference between the client's clock setting and the network-service threat detector's master clock.

Multiplier 14210 multiplies agent click rate 14190 by request size 10120, outputting the product as agent click-duration estimate 14220. Adder 14230 then adds the click duration to agent click bias 14200, outputting the sum as agent click-delay estimate 14240. Adder 12460 then adds the agent click delay to client clock bias 14250, outputting the sum as total click-delay estimate 14270. Finally, adder 14280 adds the click delay to request date 10100, outputting the result as request-based click-date estimate 14040.

Figure 15:
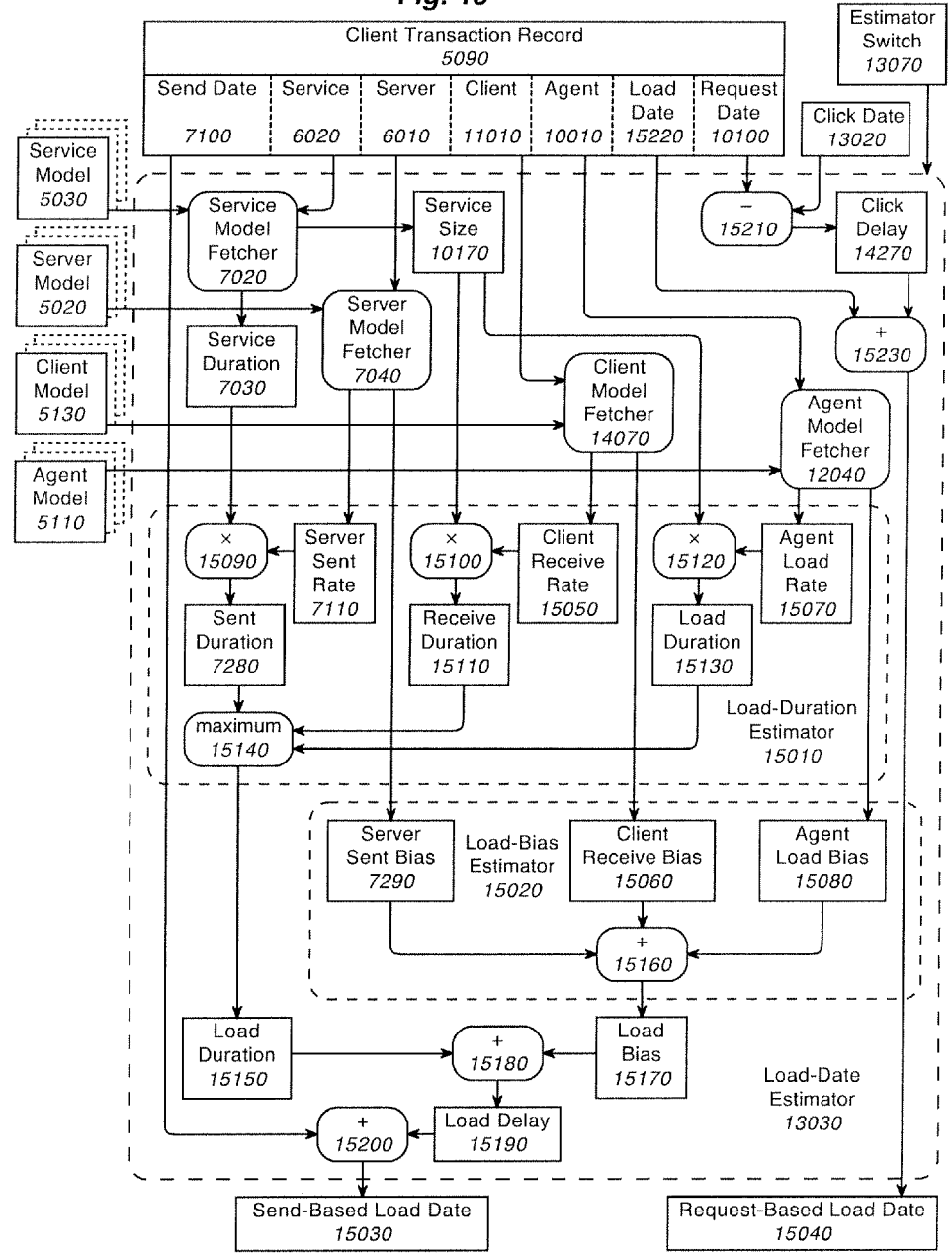
FIG. 15 is an information-flow diagram of the load-date estimator in FIG. 13.

As depicted in information-flow diagram FIG. 15, for each input client transaction record, load-date estimator 13030, for use in client synchronizer 5090 (See FIG. 13), either uses load-duration estimator 15010 and load-bias estimator 15020 to output send-based load-date estimate 15030, or outputs request-based load-date estimate 15040, depending on the value of load-date estimator switch 13070.

Service-model fetcher 7020 looks up the service model 5030 identified by service identifier 6020 in client transaction record 5090, outputting service duration 7030 to the server sent-duration estimator, multiplier 15090; and outputting service size 10170 to the client receive-duration estimator, multiplier 15100 and agent load-duration estimator, multiplier 15120.

Server-model fetcher 7040 looks up the server model 5020 identified by server identifier 6010 in client transaction record 5090, outputting server service-sent rate 7110 and server service-sent bias 7290, modeling the delay between the instant the server begins sending a service to the instant it finishes sending it. Likewise, client model fetcher 14070 looks up the client model 5130 identified by client identifier 11010 in the transaction record, outputting client service-receive rate 15050 and client service-receive bias 15060, modeling the transmission delay between the instant the server begins sending a service and the instant the client finishes receiving it. Likewise, agent-model fetcher 12040 looks up the agent model 5110 identified by agent identifier 10010 in the transaction record, outputting agent service-load rate 15070 and agent service-load bias 15080, modeling the delay between the instant the agent begins receiving the service and the instant the agent finishes loading the service to the extent that the client can act on it.

Load-duration estimator 15010 uses multiplier 15090 to multiply server sent rate 7110 by service duration 7030, outputting the product as sent duration estimate 7280; uses multiplier 15100 to multiply client receive rate 15050 by service size 10170, outputting the product as receive duration estimate 15110; and uses multiplier 15120 to multiply agent load rate 15070 by service size 10170, outputting the product as load duration 15130. The load-duration estimator then uses maximum operator 15140 to compute the maximum value among the sent duration, receive duration, and load duration, outputting the maximum as load duration estimate 15150.

Load-bias estimator 15020 uses adder 15160 to add server sent bias 7290, client receive bias 15060, and agent load bias 15080, outputting the result as total load bias 15170.

Load-date estimator 13030 then adds load duration 15150 to load bias 15170, outputting the sum as total load-delay estimate 15190. Finally, adder 15200 adds the load delay to server send date 7100 in client transaction record 5090, outputting the result as send-based load-date estimate 15030.

Differencer 15210 subtracts request date 10100 specified in client transaction record 5090 from click date 13020 output by request-based click-date estimator 14030 (See FIG. 14), outputting the difference as click delay 14270. Alternatively, the click-date estimator could pass the click delay directly to the load-date estimator. Adder 15230 then adds the click delay to the load date 15220 obtained from the client transaction record, outputting the sum as request-based load-date estimate 15040.

Figure 16:
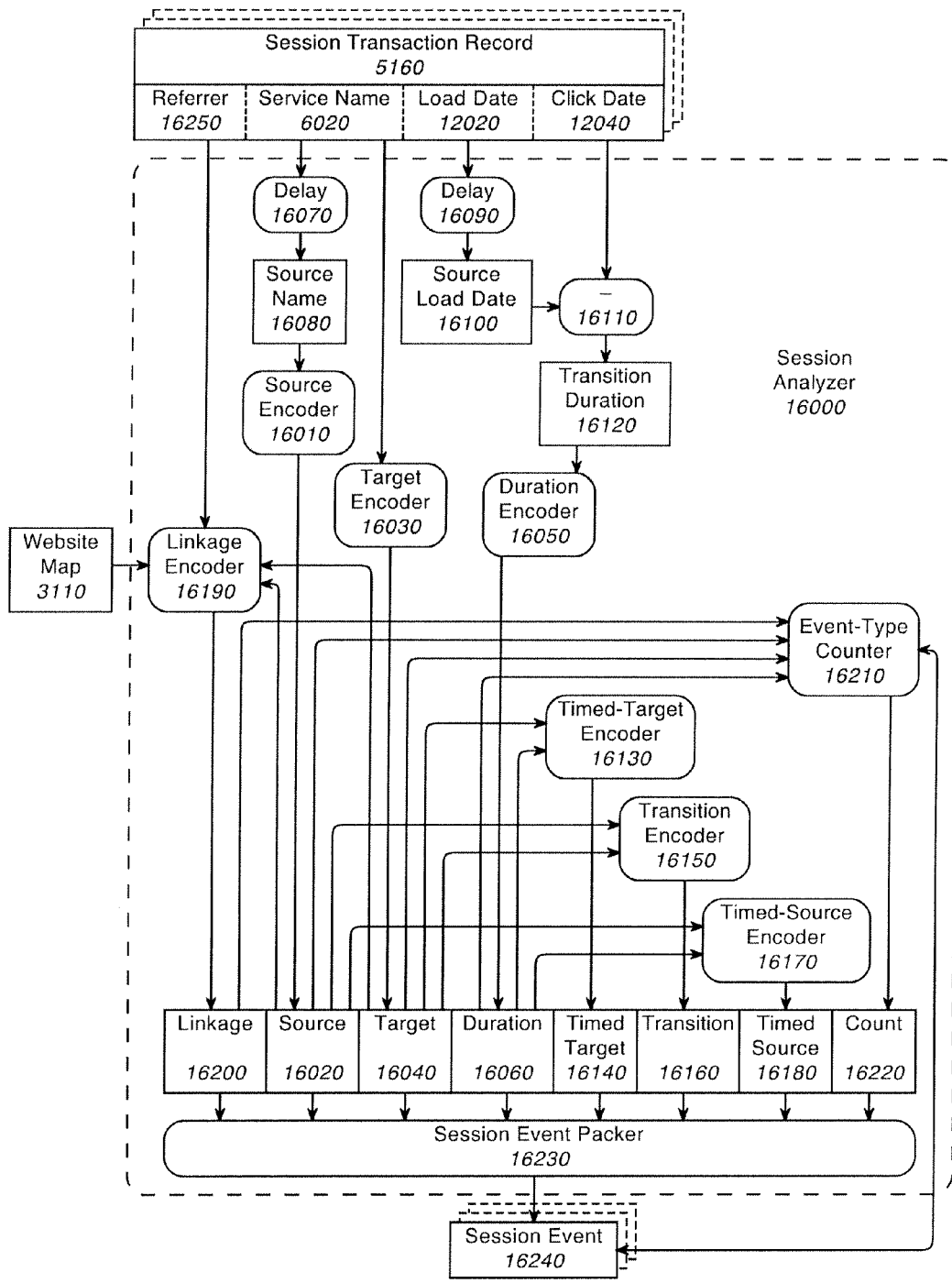
FIG. 16 is an information-flow diagram of the session analyzer in FIG. 3.

Information-flow diagram FIG. 16 depicts timed-transition event analyzer 16000, a particularly simple exemplary type of session analyzer 3050 for use in network-service threat detector 1060 (See FIG. 3) which analyzes client transaction sessions 3040 into atomic session events or elemental session events, comprising timed transitions, and repackages them as client event sessions 16240, for efficient processing by session modeler 3120 and session comparator 3070 of FIG. 3. In a more-complex embodiment, the session analyzer analyzes client sessions into overlapping trigrams or larger chunks when there are sufficient statistics, and includes other client-distinguishing information.

The source names 16080 and target names 16030 may be either URLs from HTTP transaction records, or internal service names provided by the website in a rearguard deployment. In the embodiment shown, service names are tokenized for efficiency in session analyzer 16000. In an alternative embodiment, they are tokenized earlier, in session reconstructor 3030 or even in both website analyzer 3100 and record augmenter 3010 (See FIG. 3).

Source encoder 16010 tokenizes source name 16080 to output source identifier 16020, where the source name is the service name 6020 held over 16070 from the previous 16070 session transaction record. Similarly, target encoder 16030 tokenizes target service name 6020 to output target identifier 16040. The source encoder and target encoder encode a service name by looking up the name in a dictionary and returning the corresponding token, typically a hash of the name, inserting the name in the dictionary and thereby generating a token for it if the service name was not already entered in the dictionary. The token has the precision of a standard binary word in the machines embodying the threat detector, for efficient lookup, comparison, and other manipulation.

Duration encoder 16050 encodes transition duration 16120 to output transition duration identifier 16060, where the transition duration is computed as the difference 16110 between the click date 12040 (the estimated instant when the client requested the target service) and the source load date 16100, the load date 12020 held over 16090 from the previous 16090 session transaction record (the estimated instant when the client was first able to request the service). In one embodiment, the duration encoder simply outputs the quantitative transition time to the precision of a standard binary word. In an alternative embodiment, the duration encoder coarsely quantizes the transition time on an exponential scale, and tokenizes the quantized intervals for efficient access in a sparse array. A sample exponential scale is [0 . . . 1116), [1/16 . . . 1/8), [1/8 . . . 1/4), [1/4 . . . 1/2), [112 . . . 1), [1.2), [2 . . . 0.4), [4 . . . 8), [8 . . . ∞) seconds. A quantitative representation is preferable for atomic session analysis, where each individual event in each session is considered separately for accuracy. A tokenized representation is preferable for elemental session analysis, where all events of a type within a session are lumped together and treated as a group.

Transition encoder 16150 encodes the ordered pair comprising source identifier 16020 and target identifier 16040 (as shown), or, equivalently, comprising source name 11040 and target name 11060, to output a single transition identifier 16160 identifying the transition from the source to the target.

Timed-source encoder 16170 encodes the combination of source identifier 16020 and time-interval identifier 16060 (as shown), or, equivalently, the combination of source name 16080 and transition time 16020, to output timed-source identifier 16180. Similarly, timed-target encoder 16130 encodes the combination of target identifier 16040 and time-interval identifier 16060 (as shown), or, equivalently, the combination of target name 6020 and transition time 16020, to output timed-target identifier 16180.

Optional linkage encoder 16190 looks up source identifier 16020 and target identifier 16040 (as shown), or, equivalently, source name 16080 and target name 6020, in website map 3110 to determine the linkage type, and encodes the linkage type as linkage identifier 16200.

Extrinsic transitions within a session may indicate a hijacking attack. However, certain extrinsic links are provided by web browsers and similar applications, typically accessed by buttons or menu items in the application user interface, including a "back" feature to return to the previous service in the session, a history function to return to other services recently visited by the client, and a bookmarks function to return to services previously marked by the client. In the simplest embodiment, the linkage encoder classifies links into one of three categories: intrinsic, back-step, and extrinsic. In a more complex embodiment, the linkage encoder also recognizes back-skips to previous services within the current session as a fourth category. Extrinsic links can also be provided by external sources such as websites and email messages, and the linkage encoder recognizes such inbound links by the referrer 16250, when present in the client action record, and classifies them as yet another linkage type.

For elemental session analysis, session analyzer 16000 uses event-type counter 16210 to first check whether an existing session event 16240 has matching identifiers—in this case matching source identifier 16020, matching target identifier 16040, and matching duration identifier 16060 and, if available, matching linkage identifier 16200—and, if so, merely increments the event-type count 16220 for that event type, rather than encoding the derivative identifiers and packing a separate session event.

Session-event-record packer 16230 assembles source identifier 16020, target identifier 16040, transition-duration identifier 16060, timed source identifier 16180, transition identifier 16160, and timed-source identifier 16140, into session event record 16240. If available, the session-event packer also records linkage-type identifier 16200 in the session event record. For elemental session events, the session-event packer also stores the event-type instance count 16220 in the session event record.

Output client event session 16240 may be either an atomic-event session, listing each individual event as a separate record, or an elemental-event session digest, grouping equivalent events into a single record. For atomic session analysis, session event packer 16230 simply appends each session event record 16240 to the current atomic client event session on the fly. For elemental session analysis, the event-type counter 16210 merges equivalent event records within a session, maintaining an instance count in the event record for each event type.

In the exemplary embodiment shown, the compound attributes service transition 16160, timed-source 16180, and timed-target 16140 are encoded in session analyzer 16000, saving time later in session modeler 3120 and session comparator 3070 of FIG. 3, but at the expense of the space required to store the additional identifiers in the session event records. In an alternative embodiment, compound attributes are encoded on the fly whenever needed, saving space at the expense of time.

Figure 17:
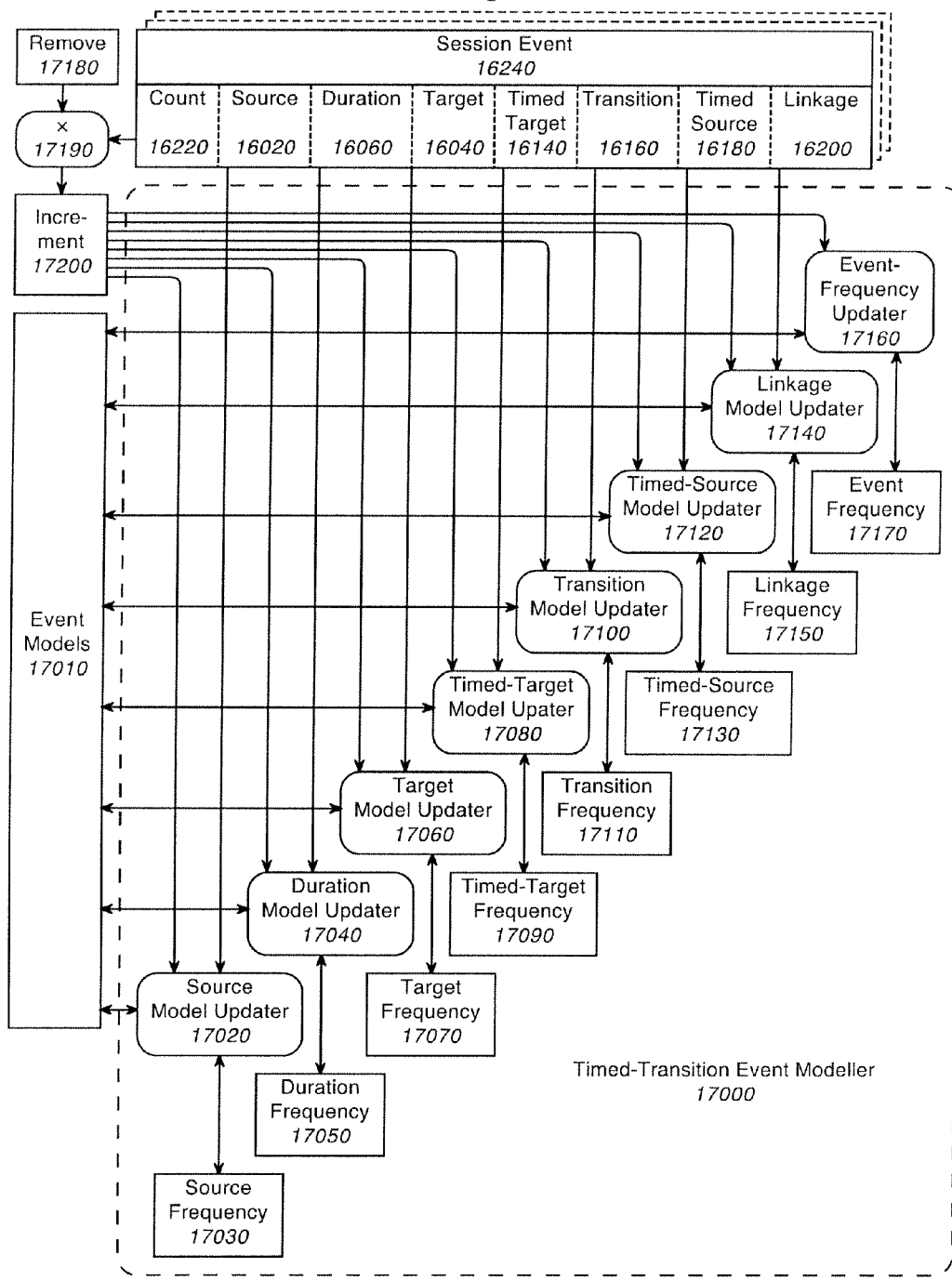
FIG. 17 is an information-flow diagram of an event modeler for FIG. 3.

Information-flow diagram FIG. 17 depicts timed-transition event modeler 17000, a particularly simple type of session modeler 3120 for use in network-service threat detector 1060 (See FIG. 3) whose session models 3130 comprise event models 17010 modeling not entire sessions, but only the atomic or elemental transition events of which sessions are composed, and modeling only the global statistics of the most rudimentary characteristics of those events: the identities of the constituent services of a transition and the duration of the transition—along with joint combinations of those characteristics.

In particular, event modeler 17000 models the global statistics, during the data-collection period, of a transition's source, transition duration, and target, as well as of joint source and target pairs, joint transition-duration and target pairs, and joint source and transition-duration pairs. When linkage information from a website map is available, the event modeler also models the global statistics of linkage types during the data-collection period. In detail, for each session-event record or session-type record 16240, source-model updater 17020 updates the source frequency 17030 corresponding to the source identifier 16020, transition-duration-model updater 17040 updates the transition-duration frequency 17050 corresponding to transition-duration identifier 16060, target-model updater 17060 updates the target frequency 17070 corresponding to target identifier 16040, timed-target-model updater 17080 updates the timed-target frequency 17090 corresponding to timed-target identifier 16140, transition-model updater 17100 updates the transition frequency 17110 corresponding to service-transition identifier 16160, timed-source-model updater 17120 updates the timed-source frequency 17130, and linkage-model updater 17140 optionally updates linkage-type frequency 17150 corresponding to linkage-type identifier 16200, where the source identifier, duration identifier, target identifier, timed-target identifier, transition identifier, timed-source identifier, and linkage-type identifier are obtained from the session-event record 16240, and the corresponding models are updated in event models database 17010. In addition, event-frequency updater 17160 updates event frequency 17170 in the event models database.

Source frequencies 17030 are modeled separately from target frequencies 17070 because the distribution of source frequencies is not in general identical to the distribution of target probabilities, because, for example, a login page is relatively unlikely to be a target, and a logout page is unlikely to be a source, since client sessions often begin with a login page and end with a logout page.

Event modeler 17000 is designed to operate on either atomic session-event records, or on elemental session-event-type records, where each event-type record contains an instance count 16220 in addition to the identifiers. When operating on atomic session-event records, the event modeler updates source frequency 17030, duration frequency 17050, target frequency 17070, timed-target frequency 17090, transition frequency 17110, timed-source frequency 17130, linkage frequency 17150, and event frequency 17170 by simply incrementing each frequency by one, the default value of increment 17200. When operating on elemental session-event records, the event modeler updates these frequencies by incrementing each one by the session count 16220, input as increment 17200.

Moreover, the event modeler is designed to operate either in batch mode, for example for processing from scratch the entire set of website transactions during a data-collection period such as one hour; or in continual mode, for incrementally updating the models on the fly with a sliding window, for example by adding each transaction or each minute's worth of transactions as it occurs, and removing each transaction or increment of transactions as it ages beyond the data-collection period of, say, one hour. When operating in continual mode, switch 17190 changes the increment to negative one to remove an atomic event record, and changes the increment to the negative of the instance count 16220 to remove an event-type record from the running frequencies, as specified by remove flag 17180.

In an alternative embodiment, the joint keys—transition identifier 16160, timed-source identifier 16180, and timed-target identifier 16140—are not directly stored in session event 16240, but are constructed from the elemental keys—source identifier 16020, transition time 16060, and target identifier 16040, as appropriate—on the fly by transition-model updater 22010, timed-source-model updater 23010, and timed-target-model updater 24010, respectively. This alternative is preferable when the storage space available to store keys in session event records is more critical than the time required to generate the joint keys.

Figure 18:
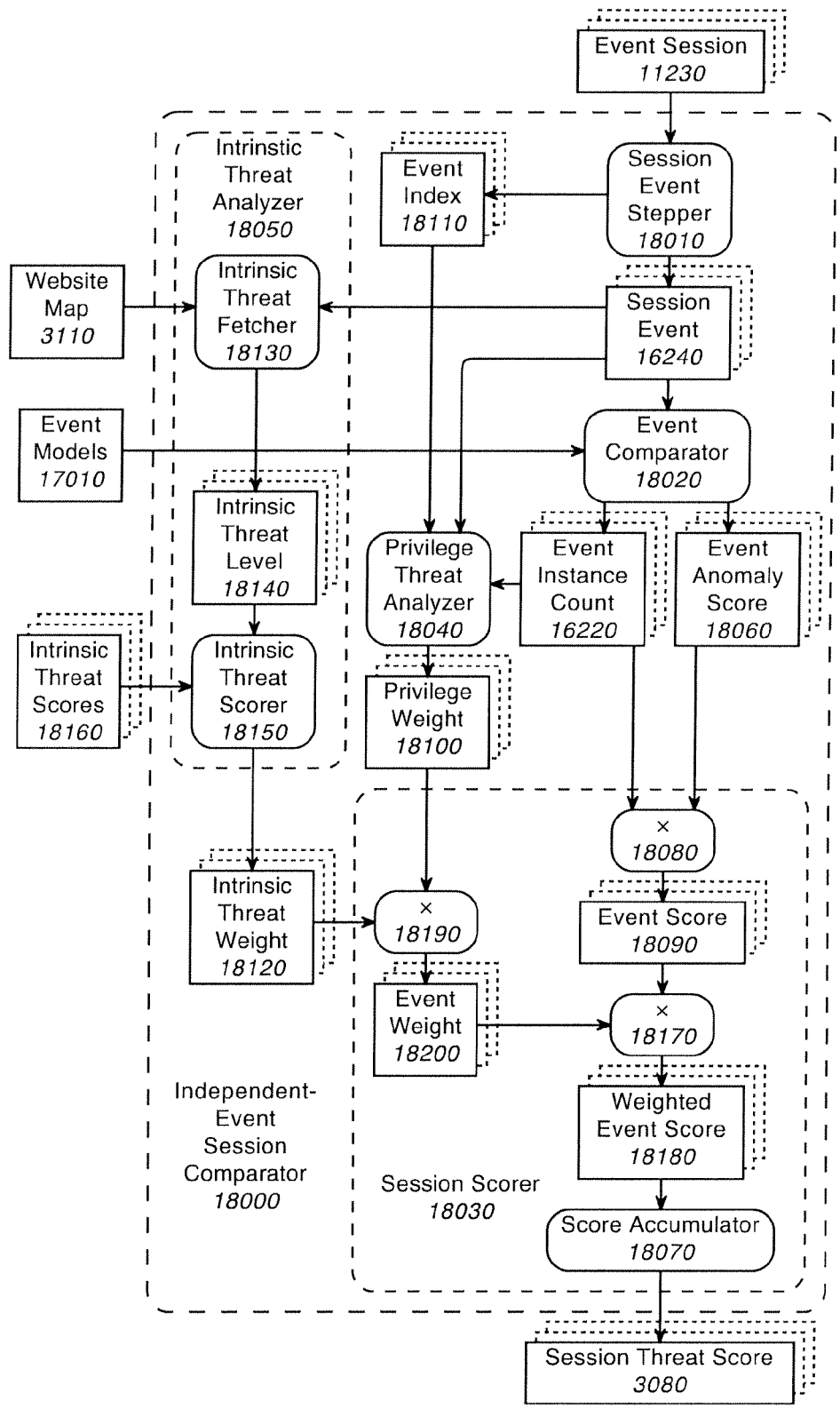
FIG. 18 is an information-flow diagram of an independent-event session comparator for FIG. 3.

Information-flow diagram FIG. 18 depicts an independent-event session comparator 18000, a particularly simple type of session comparator 3070 for use in network-service threat detector 1060 (See FIG. 3), which scores each event in a client event session 16240 independently, using session-event stepper 18010 and event comparator 18020, and uses session scorer 18030 to combine the event scores into session threat score 3080. The session comparator also optionally uses privilege-threat analyzer 18040 to weight each event score according to the client's privilege level for the event; and also optionally uses intrinsic-threat analyzer 18050 to weight each event score according to the intrinsic threat level of the event.

Session event stepper 18010 steps through the elemental event-type records or chronologically sorted atomic event records in client session 16240, outputting them one at a time as session events 16240 to event comparator 18020.

Event comparator 18020 compares each event or event type to the model 17010 for that event type, outputting event anomaly score 18060 for that event. For elemental events, the event comparator also outputs the number of instances 16220 of that event type from the event-type record. The event comparator is discussed further in connection with FIG. 20.

For atomic events, session scorer 18030 uses score accumulator 18070 to accumulate the individual event anomaly scores 18060, outputting threat score 3080 for the session as a whole. In the preferred embodiment, the event anomaly scores are additive, rather than multiplicative (See FIG. 27), to facilitate accumulating the scores for the many events in a long session without overflow. In the simplest embodiment, the session scorer simply adds all the event anomaly scores to produce the session threat score. For elemental events, the session scorer uses multiplier 18080 to multiply the anomaly score for each event type by the number of instances 16220 of that event type, outputting the result as event score 18090, in which case score accumulator 18070 sums the events scores instead of the event anomaly scores to compute the session threat score.

In the preferred embodiment, for evaluating session-hijacking threats such as man-in-the-browser threats and man-in-the-middle threats, where—to avoid detection, to complete their fraudulent privileged transactions before the client closes the session, and to maximize the number of sessions hijacked under human supervision—attackers are motivated to hijack a session as quickly and soon as possible after the client has successfully gained privileged access to a website, session comparator 18000 uses privilege threat analyzer 18040 to compute a time-damped weight 18100 according to how soon after login the corresponding anomalous event has occurred. This computation may be based on the session-event records 16240, and, in some embodiments, event index 18110 output by session-event stepper 18010, and, for elemental events, event-instance count 16220. For websites offering multiple echelons of privilege, the privilege-threat analyzer also weights the event score according to the privilege level. Privilege threat analyzer 18040 is discussed in connection with FIG. 19.

When using privilege-threat analyzer 18040, session scorer 18030 uses multiplier 18170 to multiply the score 18090 for each event or event type by corresponding privilege weight 18100, outputting the result as weighted event score 18180, in which case the session scorer sums the weighted event scores, rather than unweighted event scores 18090, to produce session threat score 3080.

If website map 3110 containing information concerning intrinsic threat levels is available (See FIG. 4), then the session comparator also takes intrinsic threat levels into account, using intrinsic threat analyzer 18050 to determine the intrinsic threat weight 18120 for each event or event-type, in order to weight different intrinsic threat levels according to the preferences of the website security personnel.

In detail, intrinsic threat analyzer 18050 uses intrinsic threat fetcher 18130 to look up the intrinsic threat level associated with session event 16240 in website map 3110, outputting the result as intrinsic threat level 18140. Intrinsic threat scorer 18150 then looks up the intrinsic threat score corresponding to the intrinsic threat level in table of intrinsic threat scores 18160, outputting the result as intrinsic weight 18120.

When using intrinsic threat analyzer 18050, session scorer 18030 uses multiplier 18170 to multiply the score 18090 for each event or event type by corresponding intrinsic threat weight 18100, outputting the result as weighted event score 18180. When using both the intrinsic threat analyzer and privilege-threat analyzer 18040, the session scorer first uses multiplier 18190 to multiply the intrinsic threat weight by the privilege weight 18100, outputting the result as event weight 18200. It then multiplies the event weight by the event score to yield the weighted event score. In either case, the session scorer then sums the weighted event scores, rather than the unweighted event scores, to produce session threat score 3080.

Figure 19:
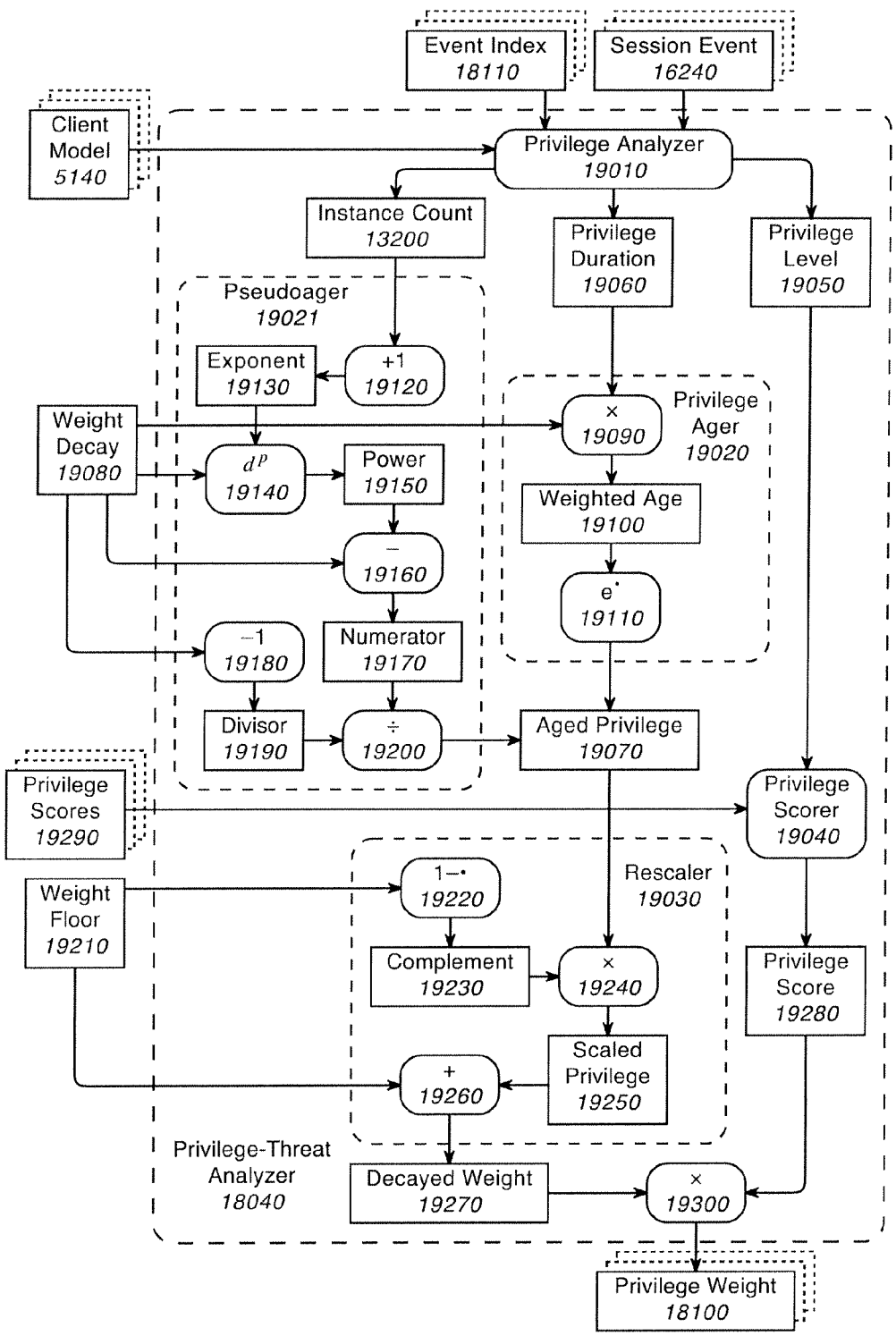
FIG. 19 is an information-flow diagram of the privilege threat analyzer in FIG. 18.

As depicted in information-flow diagram FIG. 19, privilege-threat analyzer 18040 analyzes the privilege-related threat of each input session event or session-event type 16240, using privilege analyzer 19010, privilege ager 19020, aged-privilege rescaler 19030, and privilege scorer 19040, and outputting privilege weight 18100.

Specifically, for atomic session events 16240, privilege-threat analyzer uses privilege analyzer 19010 to monitor the chronologically sorted input events for privilege-altering events such as login and logout events, secondary authentication events, and HTTP Upgrade events, outputting the current privilege level 19050 at the time of each event and the privilege duration 19060, which characterizes the duration since the client last acquired that privilege level within the session.

In the preferred embodiment, the privilege duration for a particular privilege level is the total client response delay, computed by summing the transition durations 16060 in each session event since the acquisition of that level of privilege, thereby discounting the phases when the client would ordinarily be waiting, rather than acting, including the transmission time, the serve time, and the load time. In an alternative embodiment, the privilege duration is the elapsed time since the instant of acquisition of that level of privilege, calculated as the difference between the time of the current event and the time of the privilege-acquisition event. In another alternative embodiment, the privilege duration is the number of client transactions since acquiring that privilege level, calculated as the difference in event index 18110 output by session event stepper 18010 (See FIG. 18) since the privilege was acquired.

Privilege ager 19020 converts the privilege duration 19060 to a time-damped weight, outputting it as aged privilege 19070, where the damping is governed by weight decay 19080. Specifically, when the privilege duration is measured as elapsed time, the privilege ager uses multiplier 19090 to multiply the privilege duration by the weight decay, outputting the product as weighted age 19100; and then uses exponentiator 19110 to take the exponential value of the weighted age, outputting the result as aged privilege 19070, where for time measured in seconds, the weight decay is typically around the natural logarithm of two, so that the weight drops from 1 at the instant of privilege acquisition to ½ a second later, to ¼ at the end of 2 seconds. When the privilege duration is measured in terms of the number of transition events, the aged privilege may alternatively be calculated recursively, by initializing it to 1 at the privilege-acquisition event, and multiplying the result by the weight decay at each subsequent event.

For elemental session events, although neither the date nor the chronological event index is known for individual events, nevertheless if session analyzer 16000 (See FIG. 16) includes the privilege level in its event classification, then event types repeated within a session can be effectively aged by the minimal duration implied by the number of instances 16220 of that event type in the session. Thus for elemental session events, privilege pseudo-ager 19021 effectively ages each repeated event type by the number of instances that must have preceded it, in the simplest embodiment by multiplying the weight decay 19080 by itself as often as the event instance count, and summing the partial products, outputting the sum as pseudo-aged privilege 19070. The preferred embodiment implements the closed-form formula for the geometric series, $(d^{n+1}-d)/(d-1)$, by using incrementer 19120 to add 1 to the event instance count n 13220, outputting the result as exponent p=n+1 19130; using power operator 19140 to raise the weight decay 19080 to that exponent, outputting the result as power 19150; using subtractor 19160 to subtract the weight decay from the power, outputting the result as numerator 19170; and using divider 19200 to divide the numerator by divisor 19190; where the divisor is computed by using decrementer 19180 to subtract one from the weight decay; the final result being output as pseudo-aged privilege 19070.

Rescaler 19030 rescales the damped series of aged-privilege weights to a minimum specified by weight floor 19210, by using complementer 19220 to subtract the weight floor from 1, outputting the difference as floor complement 19230; using multiplier 19240 to multiply the floor complement by aged privilege 19070, outputting the result as scaled privilege 19250; and using adder 19260 to add the scaled privilege to the weight floor, outputting the result as decayed weight 19270. A positive weight floor ensures that hijackers will continue be detected even if they change their behavior to postpone their fraudulent transactions later in a session.

Privilege scorer 19040 looks up privilege score 19280 corresponding to privilege level 19050 in table of privilege scores 19290 to weight different privilege levels according to the preferences of the website security personnel. Typical privilege score values for a website using logins with both password and secondary authorization are 0.1 for unlogged-in, 0.9 for logged in with a password, and 1.0 for secondarily authorized, but other score values could be used.

Finally, multiplier 19300 multiplies the privilege score 19280 by the decayed weight 19270, outputting the result as privilege weight 18100.

In an alternative embodiment, privilege level 19050 is determined beforehand by session analyzer 16000 and stored in session event records 16240 (See FIG. 16).

Figure 20:
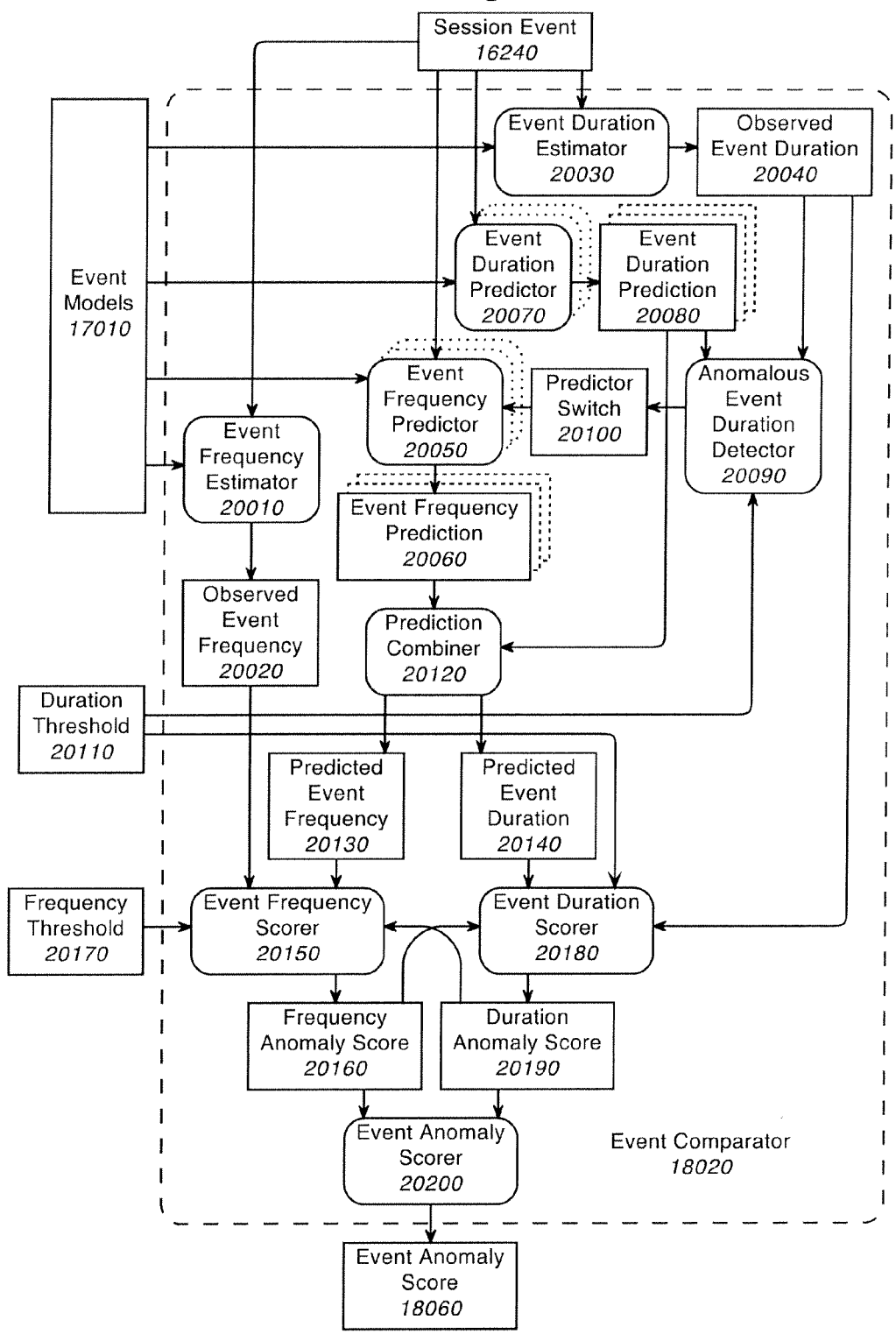
FIG. 20 is an information-flow diagram of the event comparator in FIG. 18.

As depicted in information-flow diagram FIG. 20, event comparator 18020 compares a session event 16240, which is either an atomic session event or an elemental session-event type, to the event models 17010 for that type of event, and outputs corresponding event anomaly score 18060. In MiB, MiM, and similar types of hijacking attacks, a fraudster uses a website account concurrently with a legitimate client of the account. The hijacker's website actions are thus interspersed with the legitimate client's actions.

In order to maximize the chance of completing the fraudulent transactions and minimize the chance of being discovered, the fraudster's actions need to be executed quickly and early in the login session. Therefore, the hijacker does not have the leisure to insert actions at appropriate junctures in the legitimate client's flow. As a result, the combined flow of the client's and fraudster's actions shortly after login is likely to exhibit transitions which are anomalous, often not intrinsic to the website, and anomalously quick for normal sessions in general and especially for normal sessions of the victim. Moreover, the flow of the fraudster's actions alone is likely to exhibit transitions which are anomalous, non-intrinsic, and anomalously quick for normal sessions in general and especially for normal sessions of the victim, because the hijacker is likely to use a streamlined flow skipping normal but strictly unnecessary intermediate steps, and is likely to automate that flow.

Thus, event comparator 18020 examines both the relative frequency and the relative duration of the event, comparing the observed frequency 20020 of the event type with the predicted frequency 20130 of the event type, as well as comparing the observed duration 20040 of the event or event type with the predicted duration 20140 of the event type.

In detail, event frequency estimator 20010 estimates the relative frequency of session event type 16240 from event models 17010, outputting observed event frequency 20020.

Event duration estimator 20030 estimates the duration of the event, outputting observed event duration 20040. When session event 16240 is provided by atomic session stepper 8200 (See FIG. 18), duration estimator 20030 merely extracts the event duration, as adjusted by transaction synchronizer 5140 (See FIG. 6), from the session event record. When, on the other hand, the session event is provided by session event-type stepper 24010 (See FIG. 16) and the duration of individual events in the session is not known but the event type 24010 is specific to a coarsely quantized time interval, then the event duration estimator estimates the event duration as the mean duration of the event type, or, if that information is unavailable, the event duration is estimated as the mean duration of the quantized time interval, either of which is retrieved from event models 17010.

The event comparator uses one or more event frequency predictors 20050 to predict the event frequency from marginal event frequencies retrieved from event models 17010, each event frequency predictor outputting a corresponding event frequency prediction 20060. Exemplary individual event frequency predictors are described under FIG. 21 through FIG. 24, and a combined event frequency predictor factoring out common operations among these four exemplary individual predictors is described under FIG. 25.

Corresponding to each event frequency predictor 20050 is an event duration predictor 20070 which predicts the duration of the event or event type 16240 from event models 17010 corresponding to those used in the event frequency predictors, each event duration predictor outputting a corresponding event duration prediction 20080.

Optional anomalous event duration detector 20090 compares each individual event duration prediction 20080 with observed event duration 20040, outputting predictor switch signal 20100 to turn individual event frequency predictors 20050 off for computational efficiency when the observed event duration is determined not to be anomalously brief by a particular event duration prediction.

The anomalous event duration detector determines an event to be anomalously brief if the observed duration is less than the predicted duration minus a duration threshold 20110 or by another test. In the preferred embodiment, the duration threshold is zero, in order to postpone threat decisions until the anomaly of the entire session can be compared to the anomaly of all other sessions. Alternatively, if the number of detected attacks is expected to be substantially greater than threat processors 1080 (See FIG. 1) can handle, then the duration threshold can be adjusted upwards to throttle the least threatening events. The anomalous event duration detector is used as an efficiency optimization in embodiments where it reduces the computation time or other resource demands.

Prediction combiner 20120 combines the individual event frequency predictions 20060 and corresponding event duration predictions 20080 into a single predicted event frequency 20130 and a single corresponding predicted event duration 20140. The prediction combiner is detailed under FIG. 26.

Event frequency scorer 20150 compares predicted event frequency 20130 with observed event frequency 20020, taking frequency threshold 20170 into account, and outputs frequency anomaly score 20160. In one embodiment, the event frequency scorer is switched off if duration anomaly score 20190 is below duration threshold 20110, for computational efficiency. The event frequency scorer is discussed in greater detail under FIG. 27.

Event duration scorer 20180 compares predicted event duration 20140 with observed event duration 20040, taking duration threshold 20110 into account, and outputs duration anomaly score 20190. In one embodiment, the event duration scorer is switched off if the frequency anomaly score is below frequency threshold 20170, for computational efficiency. The event duration scorer is discussed in greater detail under FIG. 28.

Event anomaly scorer 20200 inputs frequency anomaly score 20160 and duration anomaly score 20190, and outputs event anomaly score 18060. If either the frequency anomaly score or the duration anomaly score is non-positive, the event anomaly scorer outputs an event anomaly score of zero. In the preferred embodiment, the event anomaly scorer combines the frequency anomaly score and duration anomaly score by multiplying them together, where the resulting product can be interpreted as the point-wise mutual information between the terms of the event, weighted by the anomalousness briefness of the event.

Figure 23:
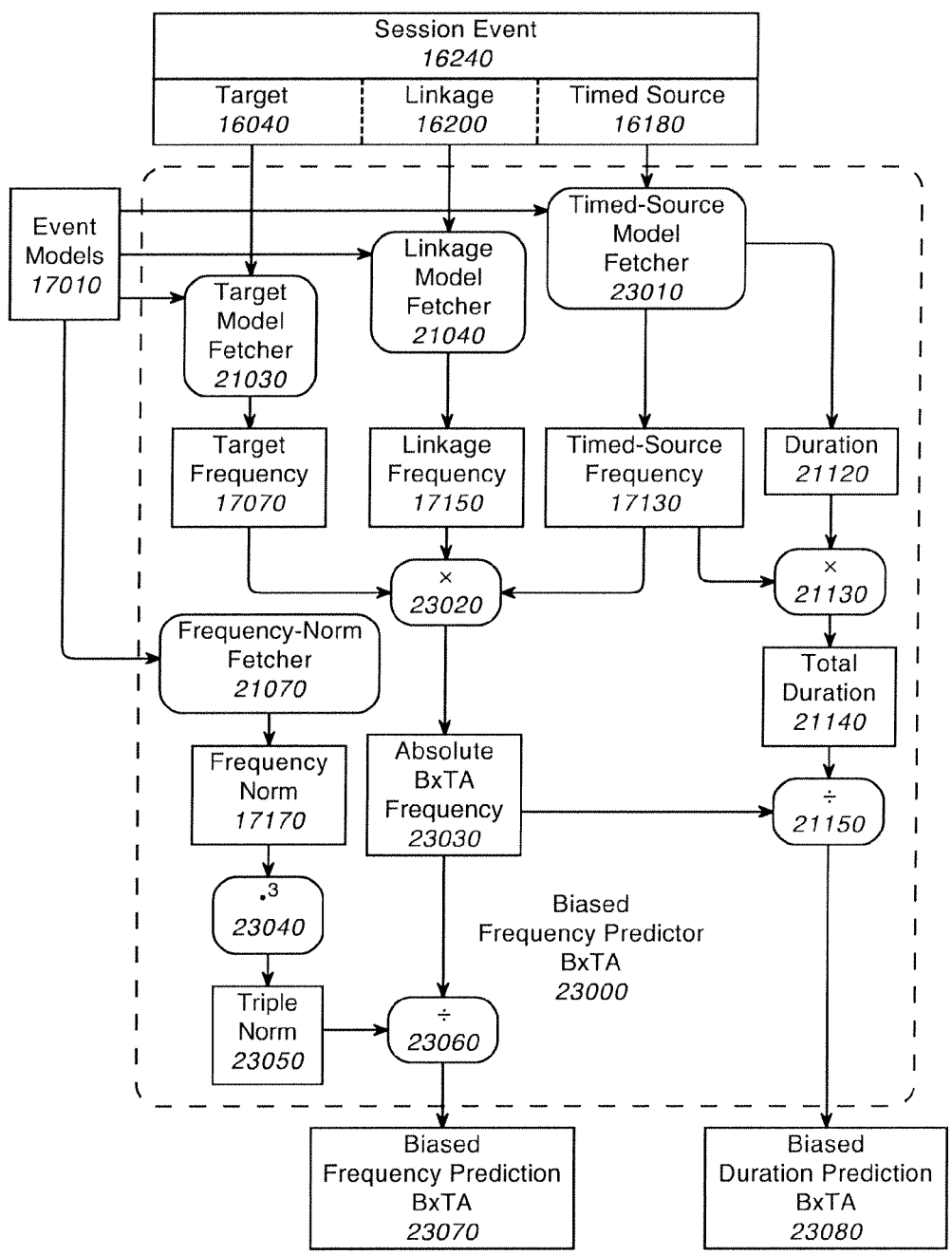
FIG. 23 is an information-flow diagram of a biased event frequency predictor BxTA for FIG. 20.
Figure 24:
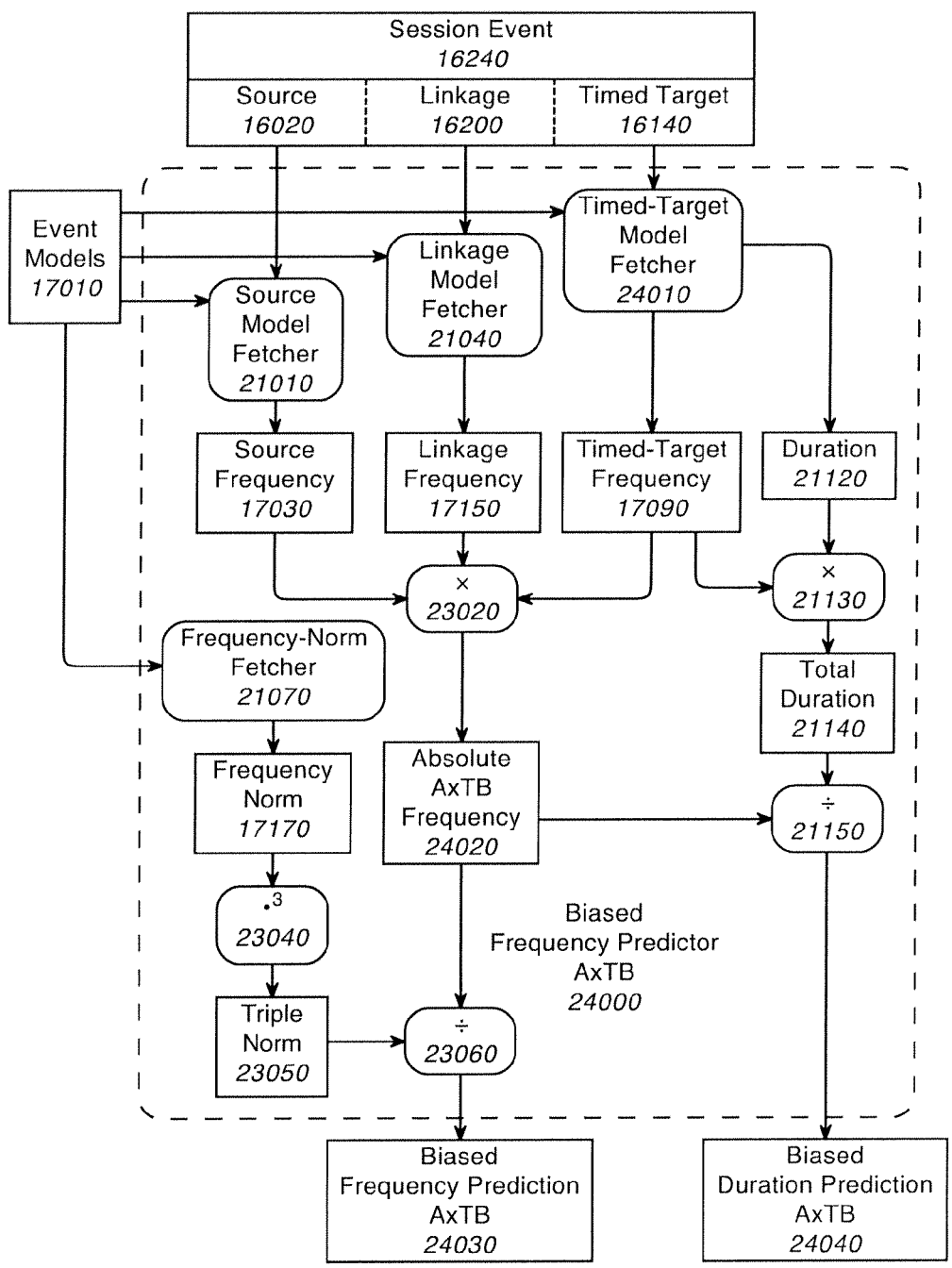
FIG. 24 is an information-flow diagram of a biased event frequency predictor AxTB for FIG. 20.
Figure 25:
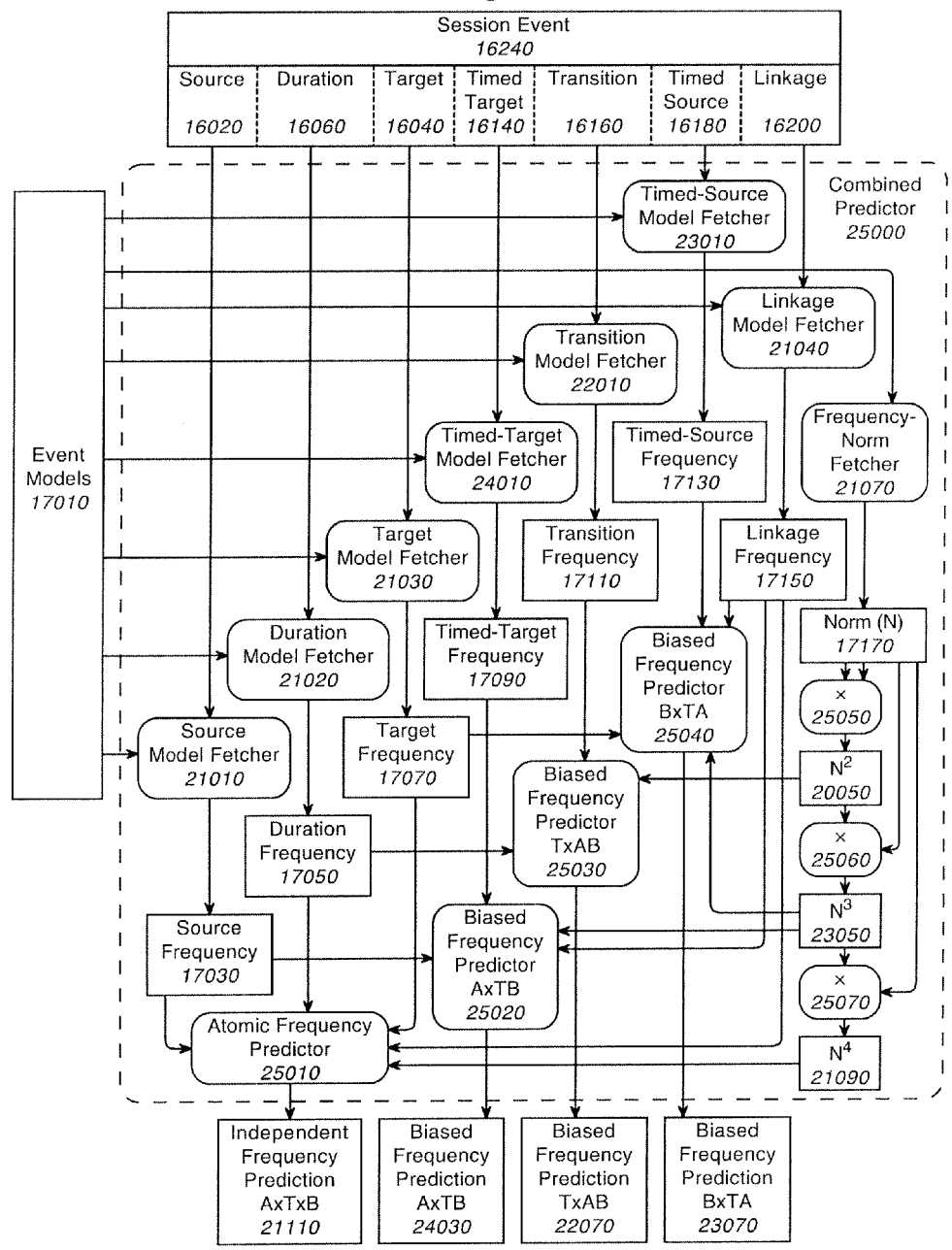
FIG. 25 is an information-flow diagram of a combined event frequency predictor for FIG. 20.

FIG. 21 through FIG. 25 depict exemplary event frequency predictors for a simple timed-transition event—that is, an event comprising three variables: a first source web service viewed by a client, a second target next viewed by the client, and the transition time between the services, where the transition time is ideally measured as the interval between the client's receipt of the source and the client's requesting the target. The frequency and duration of a timed transition can be predicted from the independent marginal frequencies of the source, transition time, and target, as in atomic predictor 21000 in FIG. 21; or from a biased predictor in which any dependence between two of the three variables is taken into account: from the sub-marginal joint frequency of the source-to-target transition and the marginal frequency of the transition, as in biased frequency predictor TxAB 22000 in FIG. 22; from the sub-marginal joint frequency of the timed source and the marginal frequency of the target, as in timed source predictor 23000 in FIG. 23; or from the marginal frequency of the source and the sub-marginal joint frequency of the timed target, as in timed target predictor 24000 in FIG. 24. For those predictors which do not refer to the frequency of the specific transition—the AxTxB, BxTA, and AxTB predictors—the prediction can optionally be refined by the frequency of the linkage type, if that information is available. FIG. 25 combines all four of these predictors for computational efficiency when all four predictors are executed by the same processor. It should be noted that some embodiments include fewer than all four predictors.

Figure 21:
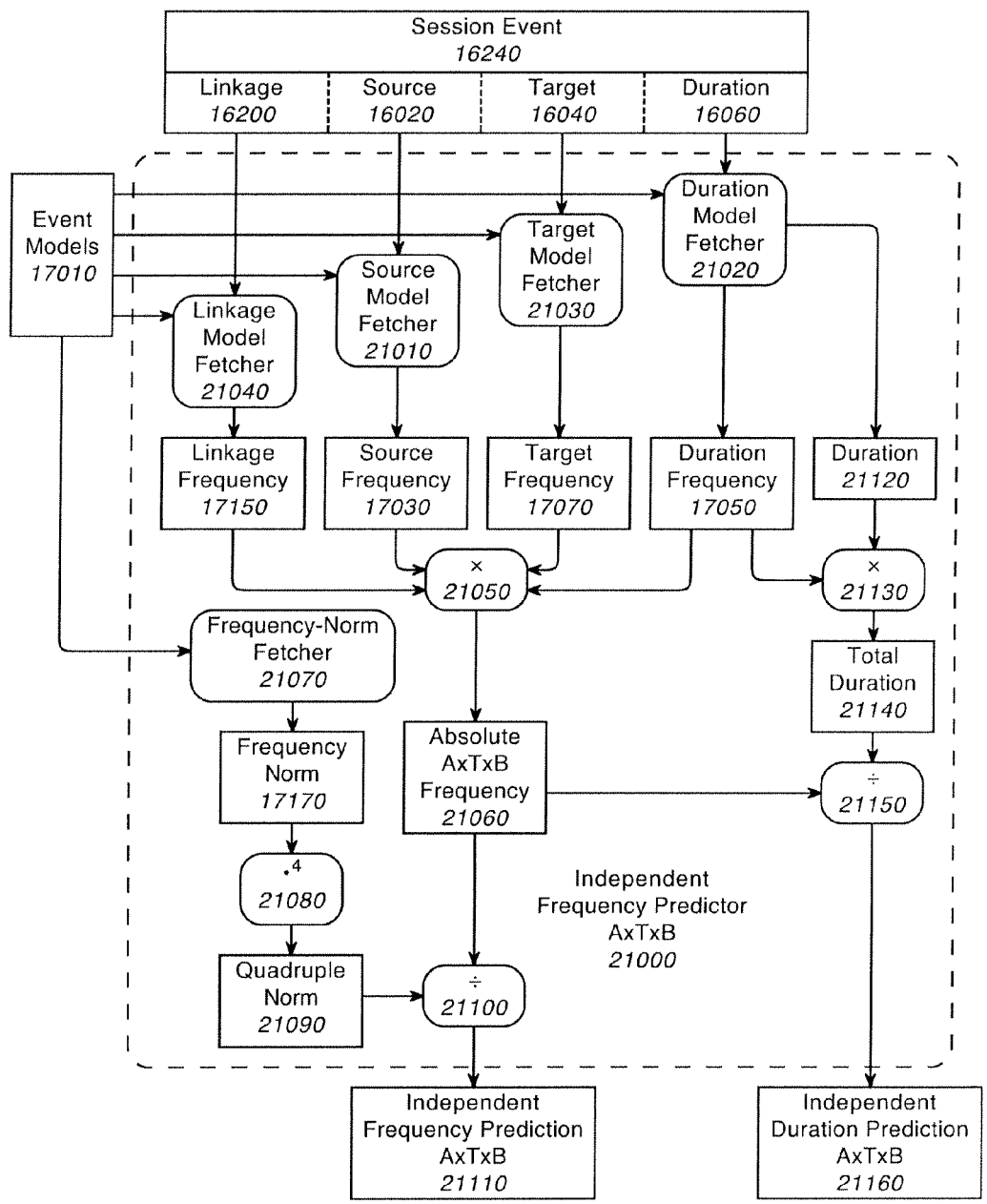
FIG. 21 is an information-flow diagram of an atomic event frequency predictor for FIG. 20.

As depicted in FIG. 21, atomic timed-transition predictor 21000 uses source-model fetcher 21010 to look up source frequency 17030 corresponding to source identifier 16020, transition-duration-model fetcher 21020 to look up transition-duration frequency 17050 corresponding to transition-duration identifier 16060, target-model fetcher 21030 to look up target frequency 17070 corresponding to target identifier 16040, optional linkage-model fetcher 21040 to look up linkage-type frequency 17150 corresponding to linkage identifier 16200, and frequency-norm fetcher 21070 to look up event-frequency norm 17170, where the source identifier, duration identifier, target identifier, and linkage-type identifier are input from session event 16240, and the corresponding models and the frequency norm are retrieved from event models 17010. Multiplier 21050 then multiplies together the source frequency, the duration frequency, the target frequency, and optionally the linkage frequency 17150, outputting the product as absolute AxTxB frequency 21060. Power operator 21080 multiplies the frequency norm to the fourth power, outputting the result as quadruple norm 21090. Finally, normalizer 21100 divides the absolute AxTxB frequency by the quadruple norm, outputting the relative frequency as independent frequency prediction AxTxB 21110. If the linkage frequency is not included in the combined frequency computation, then the power operator only raises the norm to the third power.

In atomic timed-transition predictor 21000, duration model fetcher 21020 also looks up duration 21120 corresponding to duration identifier 16060 in session event record 16240, which it outputs as duration 21120. Multiplier 21130 multiplies the duration by the duration frequency 17050, outputting the product as total duration 21140. Divider 21150 then divides the total duration by the absolute atomic frequency 21060, outputting the quotient as independent duration prediction 21160.

Figure 22:
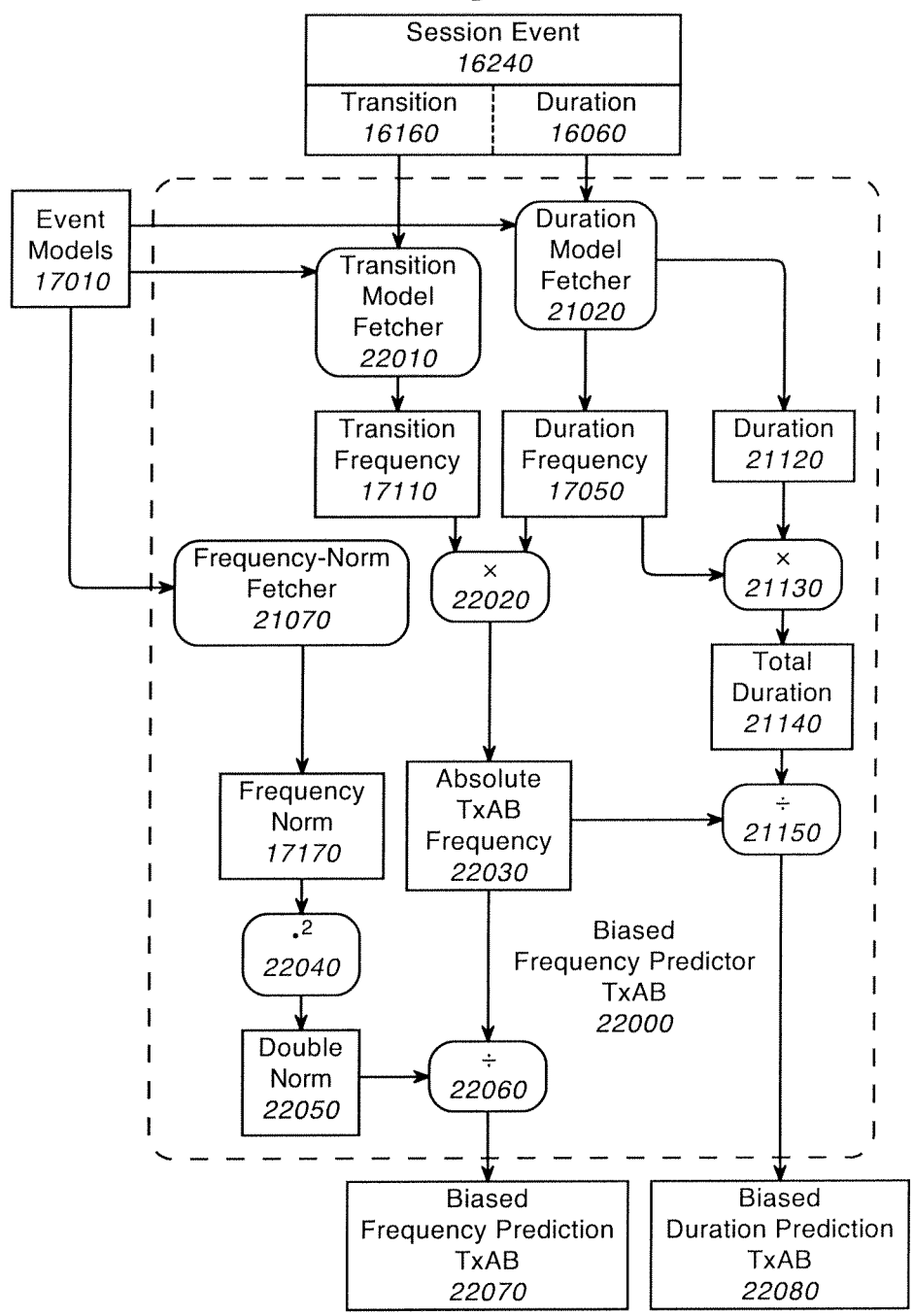
FIG. 22 is an information-flow diagram of a biased event frequency predictor TxAB for FIG. 20.

As depicted in FIG. 22, biased frequency predictor TxAB 22000 uses transition-duration-model fetcher 21020 to look up transition-duration frequency 17050 corresponding to transition-duration identifier 16060, transition-model fetcher 22010 to look up transition frequency 17110 corresponding to transition identifier 16160, and frequency-norm fetcher 21070 to look up event-frequency norm 17170, where the duration identifier and transition identifier are input from session event 16240, and the corresponding models and the frequency norm are retrieved from event models 17010. Multiplier 22020 then multiplies together the duration frequency and the transition frequency, outputting the product as absolute TxAB frequency 22030. Power operator 22040 squares the frequency norm, outputting the result as double norm 22050. Finally, normalizer 22060 divides the absolute TxAB frequency by the double norm, outputting the relative frequency as biased frequency prediction TxAB 22070.

In biased predictor TxAB 22000, duration-model fetcher 21020 also looks up duration 21120 corresponding to duration identifier 16060 in session event record 16240, which it outputs as duration 21120. Multiplier 21130 multiplies the duration by the duration frequency 17050, outputting the product as total duration 21140. Divider 21150 then divides the total duration by the absolute TxAB frequency 22030, outputting the quotient as biased duration prediction TxAB 22080.

As depicted in FIG. 23, biased frequency predictor BxTA 23000 uses target-model fetcher 21030 to look up target frequency 17070 corresponding to target identifier 16040, timed-source-model fetcher 23010 to look up timed-source frequency 17130 corresponding to timed-source identifier 16180, optional linkage-model fetcher 21040 to look up linkage-type frequency 17150 corresponding to linkage identifier 16200, and frequency-norm fetcher 21070 to look up event-frequency norm 17170, where the target identifier, timed-source identifier, and linkage-type identifier are input from session event 16240, and the corresponding models and the frequency norm are retrieved from event models 17010. Multiplier 23020 then multiplies together the target frequency, the timed-source frequency, and optionally the linkage frequency 17150, outputting the product as absolute BxTA frequency 23030. Power operator 23040 multiplies the frequency norm to the third power, outputting the result as triple norm 23050. Finally, normalizer 23060 divides the absolute BxTA frequency by the triple norm, outputting the relative frequency as biased frequency prediction BxTA 23070. If the linkage frequency is not included in the combined frequency computation, then the power operator only raises the norm to the second power.

In biased predictor BxTA 23000, timed-source-model fetcher 23020 also looks up duration 21120 corresponding to timed-source identifier 16180 in session event record 16240, which it outputs as duration 21120. Multiplier 21130 multiplies the duration by the timed-source frequency 17130, outputting the product as total duration 21140. Divider 21150 then divides the total duration by the absolute BxTA frequency 23030, outputting the quotient as biased duration prediction BxTA 23080.

Similarly, as depicted in FIG. 24, biased frequency predictor AxTB 24000 uses source-model fetcher 21010 to look up source frequency 17030 corresponding to source identifier 16020, timed-target-model fetcher 24010 to look up timed-target frequency 17090 corresponding to timed-target identifier 16140, optional linkage-model fetcher 21040 to look up linkage-type frequency 17150 corresponding to linkage identifier 16200, and frequency-norm fetcher 21070 to look up event-frequency norm 17170, where the source identifier, timed-target identifier, and linkage-type identifier are input from session event 16240, and the corresponding models and the frequency norm are retrieved from event models 17010. Multiplier 23020 then multiplies together the source frequency, the timed-target frequency, and optionally the linkage frequency 17150, outputting the product as absolute AxTB frequency 24020. As in AxTB frequency predictor 23000 (See FIG. 23), power operator 23040 multiplies the frequency norm to the third power, outputting the result as triple norm 23040. Finally, normalizer 23060 divides the absolute AxTB frequency by the triple norm, outputting the relative frequency as biased frequency prediction AxTB 24030. If the linkage frequency is not included in the combined frequency computation, then the power operator only raises the norm to the second power.

In biased predictor AxTB 24000, timed-target-model fetcher 24010 also looks up duration 21120 corresponding to timed-target identifier 16140 in session event record 16240, which it outputs as duration 21120. Multiplier 21130 multiplies the duration by the timed-target frequency 17090, outputting the product as total duration 21140. Divider 21150 then divides the total duration by the absolute AxTB frequency 24020, outputting the quotient as biased duration prediction AxTB 24040.

As depicted in FIG. 25, combined timed-transition predictor 25000 uses source-model fetcher 21010 to look up source frequency 17030 corresponding to source identifier 16020, transition-duration-model fetcher 21020 to look up transition-duration frequency 17050 corresponding to transition-duration identifier 16060, target-model fetcher 21030 to look up target frequency 17070 corresponding to target identifier 16040, timed-target-model fetcher 24010 to look up timed-target frequency corresponding to timed-target identifier 16140, transition-model fetcher 22010 to look up transition frequency 17110 corresponding to transition identifier 16160, timed-source-model fetcher 23010 to look up timed-source frequency 17130 corresponding to timed-source identifier 16180, optional linkage-model fetcher 21040 to look up linkage-type frequency 17150 corresponding to linkage identifier 16200, and frequency-norm fetcher 21070 to look up event-frequency norm 17170, where the source identifier, transition-duration identifier, target identifier, timed-target identifier, transition identifier, timed-source identifier, and linkage-type identifier are input from session event 16240, and the corresponding models and the frequency norm are retrieved from event models 17010.

Multiplier 25050 squares the frequency norm 17170, outputting the result as double norm 20050; multiplier 25060 multiplies the double norm again by the norm, outputting the result as triple norm 23050; and multiplier 25070 multiplies the triple norm yet again by the norm, outputting the result as quadruple norm 21090.

As in independent frequency predictor AxTxB 21000, atomic frequency predictor AxTxB 25010 multiplies together the source frequency 17030, the duration frequency 17050, the target frequency 17070, and optionally the linkage frequency 17150, dividing the resulting absolute AxTxB frequency 21060 by quadruple norm 21090 and outputting the resulting relative frequency as independent frequency prediction AxTxB 21110. As in biased frequency predictor AxTB 24000, biased frequency predictor AxTB 25020 multiplies together the source frequency, the timed-target frequency, and optionally the linkage frequency, dividing the resulting absolute AxTB frequency by triple norm 23050, and outputting the resulting relative frequency as biased frequency prediction AxTB 24030. As in biased frequency predictor TxAB 22000, biased frequency predictor TxAB 25030 multiplies together the duration frequency, and the transition frequency, dividing the resulting absolute TxAB frequency by double norm 20050, and outputting the resulting relative frequency as biased frequency prediction TxAB 22070. And as in biased frequency predictor BxTA 23000, biased frequency predictor BxTA 25040 multiplies together the target frequency, the timed-source frequency, and optionally the linkage frequency, dividing the resulting absolute BxTA frequency by triple norm 23050, and outputting the resulting relative frequency as biased frequency prediction BxTA 23070. If the linkage frequency is not included in the combined frequency computations, then the AxTxB predictor 25010 uses the triple norm instead of the quadruple norm, and the AxTB predictor 25020 and BxTA predictor 25040 use the double norm instead of the triple norm.

Combined predictor 25000 also outputs the respective duration predictions as in FIG. 21 though FIG. 24.

In an alternative embodiment, the joint keys—transition identifier 16160, timed-source identifier 16180, and timed-target identifier 16140—are not directly stored in session event 16240, but are constructed from the elemental keys—source identifier 16020, transition time 16060, and target identifier 16040, as appropriate—on the fly by transition-model fetcher 22010, timed-source-model fetcher 23010, and timed-target-model fetcher 24010, respectively. This alternative is preferable when the storage space available to store keys in session event records is more critical than the time required to regenerate the joint keys.

In an alternative embodiment, double frequency norm 20050, triple frequency norm 23050, and quadruple frequency norm 21090 are pre-computed and stored in event models 17010, rather than being computed in the event predictor. This alternative is preferable when memory access is quicker than multiplication.

In an alternative embodiment, the marginal frequencies (source frequency 17030, duration frequency 17050, and target frequency 17070) and sub-marginal frequencies (transition frequency 17110, timed-source frequency 17130, and timed-target frequency 17090 are not pre-computed and stored in event models database 17010, but are instead computed on the fly from atomic events or from elemental frequencies by the marginal frequency fetchers (source-frequency fetcher 21010, duration-frequency fetcher 21020, and target-frequency fetcher 21030) and intermediate frequency fetchers (transition-frequency fetcher 22010, timed-source-frequency fetcher 23010, and timed-target-frequency fetcher 24010, respectively. This alternative embodiment is preferable when the storage space available for event models is more critical than the time available to compute the marginal and sub-marginal frequencies on the fly.

The marginal frequencies (source frequency 17030, duration frequency 17050, and target frequency 17070) and sub-marginal frequencies (transition frequency 17110, timed-source frequency 17130, and timed-target frequency 17090 as stored in event models database 17010 and output by the respective frequency fetchers may be either absolute, in which case they can be represented exactly as integers; or relative, in which case they must be represented as approximate fractions or as space-inefficient rational numbers.

However, whereas atomic prediction 21110 is a product of three marginal frequencies, the sub-marginal predictions (transition prediction 22070, timed-source prediction 23070, and timed-target prediction 24030), are products of only two frequencies, so if these products are computed from absolute frequencies, then to make the atomic frequency commensurate with the sub-marginal frequencies, either the sub-marginal frequencies must be multiplied by the norm, permitting the products to continue to be represented exactly as integers; or the atomic prediction must be divided by the norm, in which case the product must be approximated as a fraction or maintained as a rational number. This commensuration may be implemented at any stage between the end of event frequency predictors 20050 and the beginning of prediction combiner 20120. Note that, at least for straightforward relative frequency estimation, all the atomic, marginal, and sub-marginal frequencies have the same norm, which is the total timed-transition frequency, obtained from the event models database.

In some embodiments, the event models 17010 are stored in a sparse array such as a heap, rather than as a complete array or complete tree, in order to conserve memory. For a large website, the number of observed transition types would otherwise require an impractically large complete array.

Figure 26:
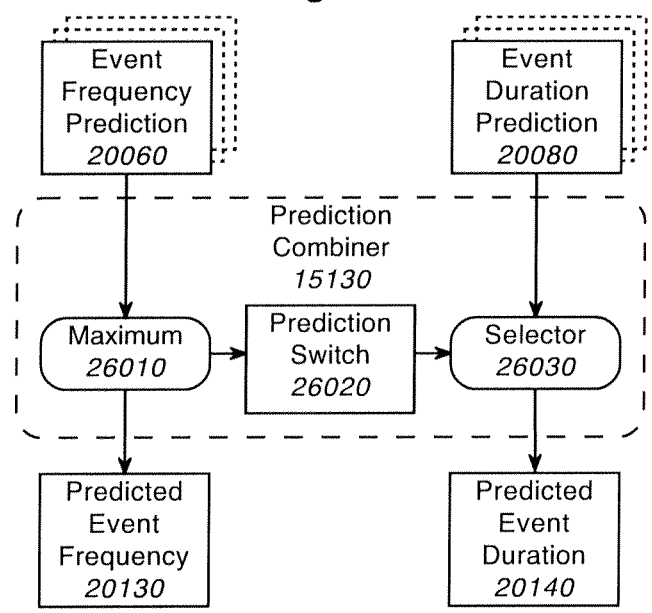
FIG. 26 is an information-flow diagram of the prediction combiner in FIG. 20.

As depicted in information-flow diagram FIG. 26, prediction combiner 15130 inputs the individual event frequency predictions 20060 and the individual event duration predictions 20080, combining them to output predicted event frequency 20130 and predicted event duration 20140, respectively.

In a preferred embodiment, the prediction combiner uses maximum selector 26010 to select the maximum event frequency prediction for output as the predicted event frequency, and, via prediction switch 26020, uses selector 26030 to select the corresponding event duration prediction for output as the predicted event duration. The use of the maximum here implies that that an event is not to be considered unusual if any of a set of equally credible predictors shows that it is not unusual. In an alternative embodiment (not shown), prediction combiner computes the Bayesian mean of the input frequency predictions and duration predictions, and outputs the means as the predicted event frequency and predicted event duration, respectively.

Figure 27:
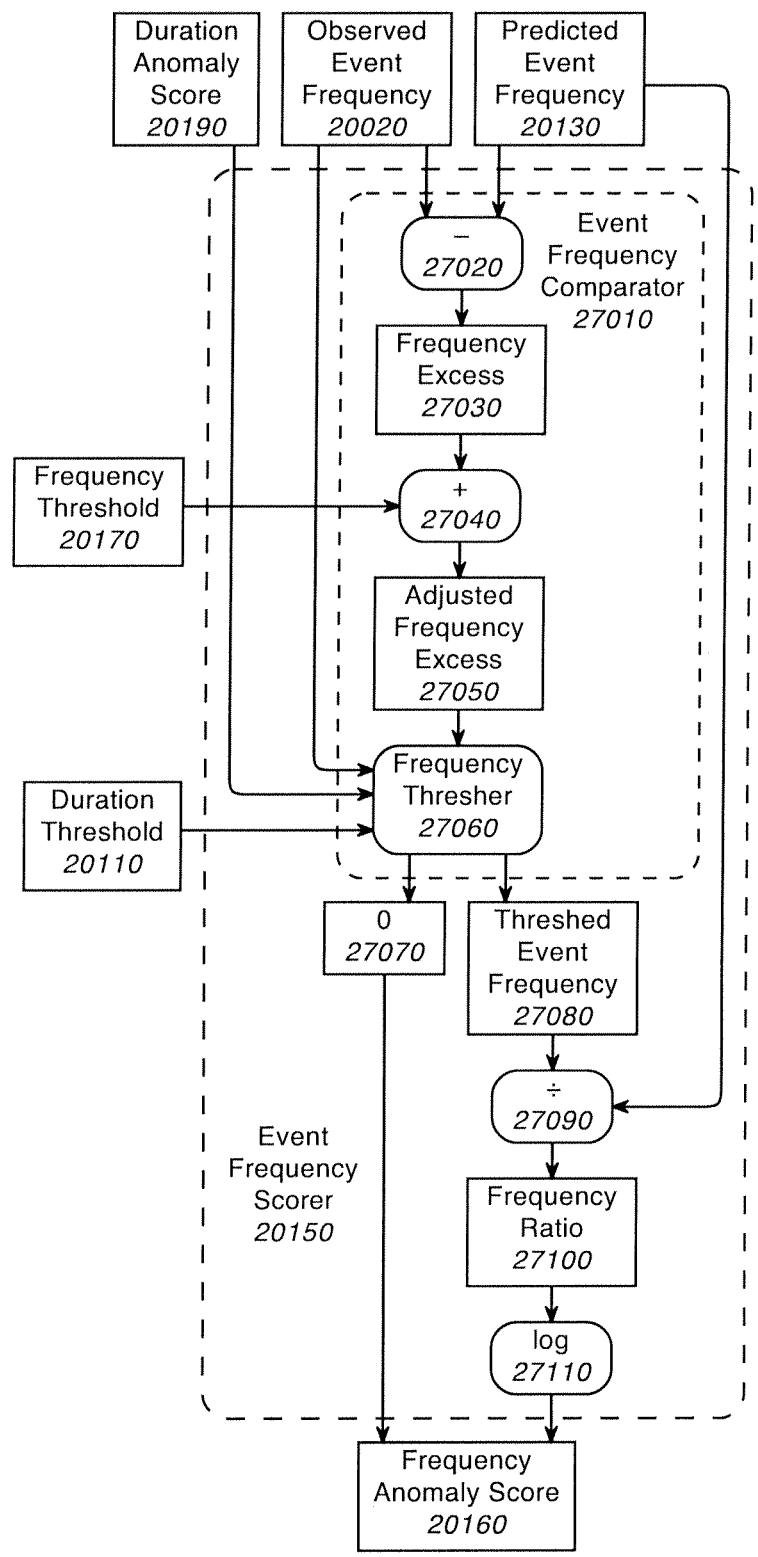
FIG. 27 is an information-flow diagram of the event frequency scorer in FIG. 20.

As depicted in FIG. 27, event frequency scorer 20150 inputs observed event frequency 20020 and predicted event frequency 20130, compares them using event frequency comparator 27010, normalizes the result, and outputs frequency anomaly score 20160.

Event frequency comparator 27010 uses differencer 27020 to compare observed event frequency 20020 to predicted event frequency 20130, outputting the difference as frequency excess 27030. Next, adder 27040 adds frequency threshold 20170 to the frequency excess, outputting adjusted frequency excess 27050. Frequency thresher 27060 then tests whether the adjusted frequency excess is greater than zero, indicating that the event is not anomalous, in which case it outputs a zero 27070 as the frequency-anomaly score 20160. For computational efficiency, the thresher may also optionally input duration anomaly score 20190. If the duration anomaly score is below duration threshold 20110, then the event is likewise determined not to be anomalous, and the thresher likewise outputs a frequency anomaly score of zero.

In a preferred embodiment, the frequency threshold is omitted or set to zero, in order to postpone threat decisions until the anomaly of the entire session can be compared to the anomaly of all other sessions. Alternatively, if the number of detected attacks is expected to be substantially greater than threat processors 1080 (See FIG. 1) can handle, then the frequency threshold can be adjusted upwards to throttle the least threatening events.

If, on the other hand, frequency thresher 27060 determines the event to be anomalous, then it passes the observed event frequency 20020 through as threshed event frequency 27080.

Event frequency normalizer then divides 27090 the threshed event frequency by predicted event frequency 20130, outputting the result as frequency ratio 27100. Outputting the frequency ratio rather than the absolute observed frequency ensures that the observed frequency of each event is evaluated only with respected to the predicted frequency of that event, and independently of the absolute frequencies of unrelated events.

Since the observed event frequency 20020 is a simple frequency, whereas the predicted event frequency 20130 is a frequency product, if the frequencies are represented as absolute frequencies, then in order to make the observed event frequency commensurate with the predicted frequency, either the observed event frequency is multiplied by the norm, or the predicted event frequency is divided by the norm. This commensuration may be implemented at any stage between the end of event frequency estimator 20010 or event frequency predictor 20050 and prior to comparison in the event frequency comparator or normalization in event frequency normalizer 27090. Postponing this commensuration until the end of prediction combiner 20120 can reduce the amount of computation.

Finally, log 27110 calculates the logarithm of frequency ratio 27100, outputting the result as frequency anomaly score 20160. Using the logarithm rather than the ratio itself as the event score permits session comparator 3070 (See FIG. 3) to sum the event anomalies rather than multiplying them, thus avoiding overflow.

As logarithms of the ratio of the relative joint frequency to the product of the relative marginal frequencies, frequency anomaly scores 20160 can be interpreted as measuring the point-wise mutual information between the marginal dimensions. In the preferred embodiment, 27110 calculates the base-2 logarithm, so that the score is measured in bits. In particular, in the case of timed transitions, independent frequency predictor AxTxB 21000 measures the point-wise mutual information between the source, transition time, and target; biased frequency predictor TxAB 21050 measure the point-wise mutual information between the transition time and the service transition; biased frequency predictor BxTA 23000 measures the point-wise mutual information between the target and the timed source; and biased frequency predictor 24000 measures the point-wise mutual information between the source and the timed target. Although point-wise mutual information can be non-positive, event anomaly scorer 20200 ensures that only positive scores are output. That is, the session anomaly is determined only by anomalous events, so that no number of normal events can compensate for anomalous ones. This is in accordance with the fact that man-in-the-browser, man-in-the-middle, and similar attacks characteristically comprise a few brief events, typically near the beginning of a session, irrespective of how long the session lasts.

Figure 28:
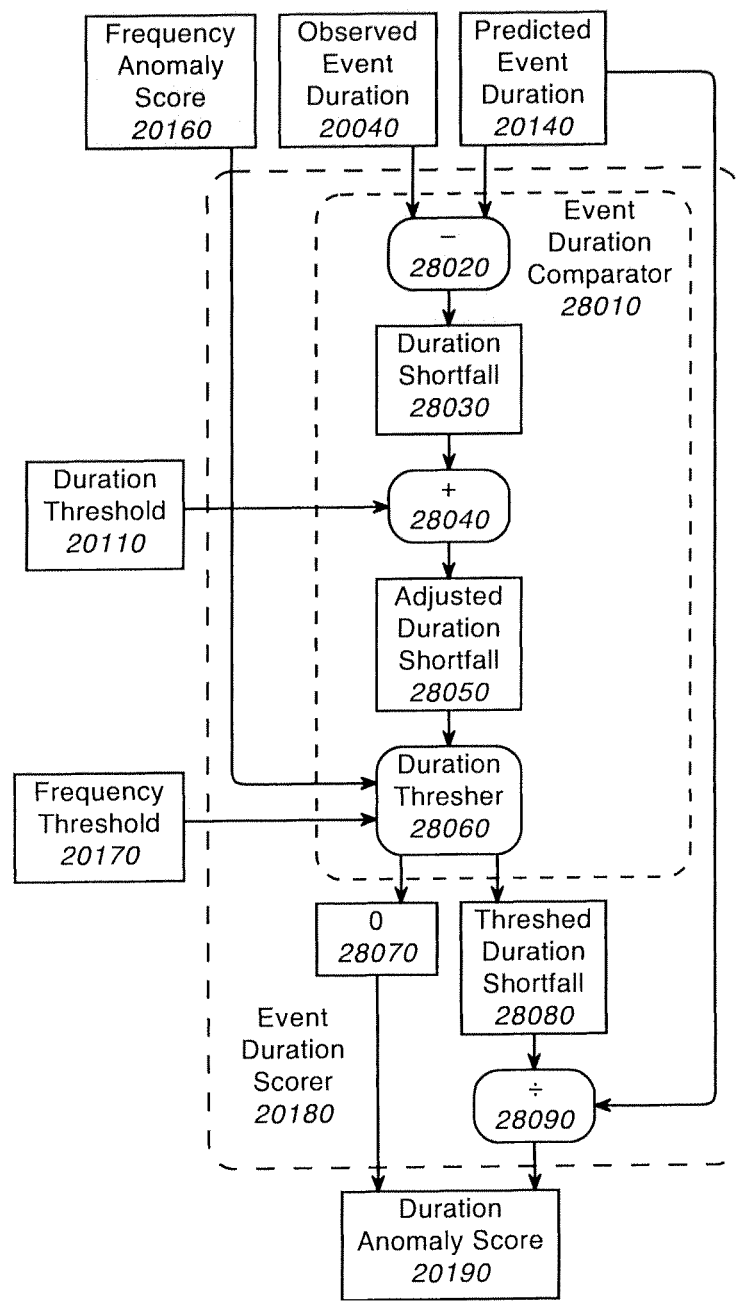
FIG. 28 is an information-flow diagram of the event duration scorer in FIG. 20.

As depicted in FIG. 28, event duration scorer 20180 inputs predicted event duration 20140 and observed event duration 20040, compares them using event duration comparator 28010, normalizes the result, and outputs duration anomaly score 20190.

Event duration comparator 28010 uses differencer 28020 to compare observed event duration 20040 to predicted event duration 20140, outputting the difference as duration shortfall 28030. Next, adder 28040 adds duration threshold 20110 to the duration shortfall, outputting adjusted duration shortfall 28050. Duration thresher 28060 then tests whether the adjusted duration shortfall is greater than zero, indicating that the event is not anomalous, in which case it outputs a zero 28070 as the duration-anomaly score 20190. For computational efficiency, the thresher may also optionally input frequency-anomaly score 20160; if the frequency-anomaly score is less than frequency threshold 20170, then the event is likewise determined not to be anomalous, and the thresher likewise outputs a duration-anomaly score of zero. In the preferred embodiment, the duration threshold is omitted or set to zero, in order to postpone threat decisions until the anomaly of the entire session can be compared to the anomaly of all other sessions. Alternatively, if the number of detected attacks is expected to be substantially greater than threat processors 1080 (See FIG. 1) can handle, then the duration threshold can be adjusted upwards to throttle the least threatening events. If, on the other hand, the event duration comparator determines that the event is anomalous, then it passes the adjusted duration shortfall through as threshed duration shortfall 28080.

Event duration normalizer 28090 then divides the threshed duration shortfall 28080 by the predicted event duration 20140 to yield duration anomaly score 20190, ranging from zero if the event duration is not anomalous at all, to one if the event duration is as anomalously brief as possible.

As has now been explained, a network security system can include detection of man-in-the-browser attacks and other attacks using a variety of tools and approaches. Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a network security system implemented in an electronic device, coupled to secured online resources for detecting unauthorized accesses of those secured online resources, a method comprising:

monitoring, by the electronic device, a current user activity session in which a client device sends a series of access requests to a server device which is constructed and arranged to provide access to the secured online resources, from the series of access requests sent by the client device, providing a set of current frequency measurements, each of the set of current frequency measurements indicating a number of times the client device (i) receives a first webpage from the server device and (ii) sends a request to the server device for a second webpage within a predefined range of time after receiving the first webpage from the server device, and comparing the set of current frequency measurements to a set of average frequency measurements from an average user activity session model to produce an anomaly score which indicates whether the current user activity session is indicative of a hidden session by an attacker;

wherein providing the set of current frequency measurements includes:

providing a first frequency value indicating a number of times the client device (i) receives the first webpage from the server device and (ii) sends a request to the server device for the second webpage within a first range of time after receiving the first webpage from the server device, and providing a second frequency value indicating a number of times the client device (i) receives the first webpage from the server device and (ii) sends a request to the server device for the second webpage within a second range of time after receiving the first webpage from the server device, the first range of time and the second range of time being nonoverlapping and finite; and wherein comparing the set of current frequency measurements to the set of average frequency measurements includes:

outputting the anomaly score based on the first frequency value and the second frequency value.

2. The method of claim 1 further comprising collecting average parameter values during a data collection period.

3. The method of claim 2 wherein the average parameter values include an average time between clicks for an average user activity session, wherein determining whether the current user activity session is indicative of a hidden session by an attacker includes comparing user time between clicks for the current user activity session to the average time between clicks for the average user activity session.

4. The method of claim 2 wherein the average parameter values include a website page view order in an average user activity session, wherein determining whether the current user activity session is indicative of a hidden session by an attacker includes comparing website page view order for the current user activity session with the website page view order in the average user activity session.

5. The method of claim 2 wherein the average parameter values include an average time between clicks for a specified page, wherein determining whether the current user activity session is indicative of a hidden session by an attacker includes comparing the time between clicks for the specified page during the current user activity session to the average time between clicks for the specified page.

6. The method of claim 1 further comprising synchronizing transaction records.

7. The method of claim 6 wherein synchronizing transaction records includes correcting for errant clock settings among all active clients using a website during a data collection period.

8. The method of claim 6 wherein synchronizing transaction records includes adjusting for transmission time between clients and servers.

9. The method of claim 6 wherein synchronizing transaction records includes adjusting for client service load time.

10. The method of claim 6 wherein synchronizing transaction records includes estimating service timing characteristics for each service provided by a website during a data collection period.

11. The method of claim 10 wherein synchronizing transaction records includes estimating server delay statistics for each service provided by a server during the data collection period.

12. The method of claim 10 wherein synchronizing transaction records includes measuring and modeling echo delay statistics.

13. The method of claim 6 wherein synchronizing transaction records includes forming a server timing model with an affine function of service duration.

14. The method of claim 13 wherein the server timing model includes a multiplicative rate parameter selected from receive rate, send rate and sent rate.

15. The method of claim 13 wherein the server timing model includes an additive bias parameter selected from a receive bias, send bias and sent bias.

16. The method of claim 1, further comprising:
    adding anomaly scores to produce an overall threat score.

17. A network security system coupled to secured online resources, the network security system being constructed and arranged to detect unauthorized accesses of those secured online resources, the network security system comprising:
  memory; and
  a controller including controlling circuitry constructed and arranged to:
    monitor a current user activity session in which a client device sends a series of access requests to a server device which is constructed and arranged to provide access to the secured online resources,
    from the series of access requests sent by the client device, provide a set of current frequency measurements, each of the set of current frequency measurements indicating a number of times the client device (i) receives a first webpage from the server device and (ii) sends a request to the server device for a second webpage within a predefined range of time after receiving the first webpage from the server device, and
    compare the set of current frequency measurements to a set of average frequency measurements from an average user activity session model to produce an anomaly score which indicates whether the current user activity session is indicative of a hidden session by an attacker;
  wherein the controlling circuitry constructed and arranged to provide the set of current frequency measurements is further constructed and arranged to:
    provide a first frequency value indicating a number of times the client device (i) receives the first webpage from the server device and (ii) sends a request to the server device for the second webpage within a first range of time after receiving the first webpage from the server device, and
    provide a second frequency value indicating a number of times the client device (i) receives the first webpage from the server device and (ii) sends a request to the server device for the second webpage within a second range of time after receiving the first webpage from the server device, the first range of time and the second range of time being nonoverlapping and finite; and
  wherein the controlling circuitry constructed and arranged to compare the set of current frequency measurements to the set of average frequency measurements is further constructed and arranged to:
    output the anomaly score based on the first frequency value and the second frequency value.

18. A computer program product having a non-transitory, computer-readable storage medium which stores instructions which, when executed by a computer coupled to secured online resources, cause the computer to perform a method of detecting unauthorized accesses of those secured online resources, the method comprising:
  monitoring a current user activity session in which a client device sends a series of access requests to a server device which is constructed and arranged to provide access to the secured online resources,
  from the series of access requests sent by the client device, providing a set of current frequency measurements, each of the set of current frequency measurements indicating a number of times the client device (i) receives a first webpage from the server device and (ii) sends a request to the server device for a second webpage within a predefined range of time after receiving the first webpage from the server device, and
  comparing the set of current frequency measurements to a set of average frequency measurements from an average user activity session model to produce an anomaly score which indicates whether the current user activity session is indicative of a hidden session by an attacker;
  wherein providing the set of current frequency measurements includes:
    providing a first frequency value indicating a number of times the client device (i) receives the first webpage from the server device and (ii) sends a request to the server device for the second webpage within a first range of time after receiving the first webpage from the server device, and
    providing a second frequency value indicating a number of times the client device (i) receives the first webpage from the server device and (ii) sends a request to the server device for the second webpage within a second range of time after receiving the first webpage from the server device, the first range of time and the second range of time being nonoverlapping and finite; and
  wherein comparing the set of current frequency measurements to the set of average frequency measurements includes:
    outputting the anomaly score based on the first frequency value and the second frequency value.

* * * * *